US012810016B2

(12) United States Patent
Chalk et al.

(10) Patent No.: US 12,810,016 B2
(45) Date of Patent: *Nov. 24, 2026

(54) SYSTEMS AND METHODS FOR ALGORITHM VALIDATION IN A ZERO-TRUST ENVIRONMENT

(71) Applicant: BeeKeeperAI, Inc., Austin, TX (US)

(72) Inventors: Mary Elizabeth Chalk, Austin, TX (US); Robert Derward Rogers, Oakland, CA (US); Alan Donald Czeszynski, Pleasanton, CA (US)

(73) Assignee: BeeKeeperAI, Inc., Austin, TX (US)

( * ) Notice: Subject to any disclaimer, the term of this patent is extended or adjusted under 35 U.S.C. 154(b) by 482 days.

This patent is subject to a terminal disclaimer.

(21) Appl. No.: 18/147,668

(22) Filed: Dec. 28, 2022

(65) Prior Publication Data

US 2024/0211588 A1 Jun. 27, 2024

Related U.S. Application Data

(63) Continuation of application No. 18/146,994, filed on Dec. 27, 2022, now Pat. No. 12,361,166, which is a (Continued)

(51) Int. Cl.

*G06F 21/62* (2013.01)
*G06F 18/10* (2023.01)

(Continued)

(52) U.S. Cl.

CPC .......... *G06F 21/6245* (2013.01); *G06F 18/10* (2023.01); *G06F 21/53* (2013.01);

(Continued)

(58) Field of Classification Search

CPC ...... G06F 21/6245; G06F 18/10; G06F 21/53; G06F 21/602; G06F 21/6218;

(Continued)

(56) References Cited

U.S. PATENT DOCUMENTS 10,049,185 B2 * 8/2018 Wolniewicz ........... G16H 10/60
10,460,235 B1 * 10/2019 Truong .................. G06F 9/547

(Continued)

OTHER PUBLICATIONS

Choi et al.; "Deep Learning Approach to Generate a Synthetic Cognitive Psychology Behavioral Dataset", Oct. 2021, IEEE, pp. 142489-142505. (Year: 2021).*

(Continued)

*Primary Examiner* — Pramila Parthasarathy

(74) *Attorney, Agent, or Firm* — IP Strategy Consulting; Daniel Maffeo

(57) ABSTRACT

Systems and methods for validating algorithms across different parties' systems by generating synthetic data for operation on algorithms is provided. The synthetic data may include real data that has been de-identified, data that had been altered by pseudo-random deviations (range and distribution bound), or via generation by a ML algorithm that has been trained on real datasets. The synthetic data is shared between the various parties and run on their individual substantiations of the algorithm. The resulting output should be identical, thereby validating the algorithm. If there are differences in the outputs, then it can be determined that the algorithm is behaving in an unexpected manner. Annotation validation can also be performed. This may include salting annotations with known elements or ML trend identification and collecting the results from the annotators. By redundant comparison between annotators activity, the accuracy and consistency of annotations can be ascertained.

14 Claims, 38 Drawing Sheets

Related U.S. Application Data continuation of application No. PCT/US2022/053740, filed on Dec. 21, 2022, and a continuation of application No. 18/069,210, filed on Dec. 20, 2022.

(60) Provisional application No. 63/293,723, filed on Dec. 24, 2021.

(51) Int. Cl.

| | |
|---|---|
| ***G06F 18/21*** | (2023.01) |
| ***G06F 21/53*** | (2013.01) |
| ***G06F 21/60*** | (2013.01) |

(52) U.S. Cl.
CPC ........ *G06F 21/602* (2013.01); *G06F 21/6218* (2013.01); *G06F 21/6254* (2013.01); *G06F 18/217* (2023.01); *G06F 2221/033* (2013.01)

(58) Field of Classification Search
CPC ............... G06F 21/6254; G06F 18/217; G06F 2221/033; G06F 18/2113; G06F 18/211
See application file for complete search history.

(56) References Cited

U.S. PATENT DOCUMENTS

| | | | | |
|---|---|---|---|---|
| 11,250,876 | B1 * | 2/2022 | McCloskey | G06N 20/10 |
| 11,449,797 | B1 * | 9/2022 | Kurniawan | G06N 20/00 |
| 11,562,323 | B2 * | 1/2023 | Eberhardt, III | G16H 50/50 |
| 11,568,174 | B2 * | 1/2023 | Harrison | G06V 20/64 |
| 11,901,080 | B1 * | 2/2024 | Matt | G06T 7/0012 |
| 12,099,629 | B2 * | 9/2024 | Dror | G06F 21/6209 |
| 12,361,166 | B2 * | 7/2025 | Chalk | G06F 21/602 |
| 12,530,489 | B2 * | 1/2026 | Chalk | G06F 21/602 |
| 2008/0208677 | A1 | 8/2008 | Mayr et al. | |
| 2014/0330583 | A1 * | 11/2014 | Madhavan | G16B 50/00 705/3 |
| 2015/0134594 | A1 | 5/2015 | Sethumadhavan et al. | |
| 2017/0243028 | A1 * | 8/2017 | LaFever | G06F 21/6254 |
| 2018/0004893 | A1 * | 1/2018 | Vaske | G16B 35/00 |
| 2018/0018590 | A1 * | 1/2018 | Szeto | G16H 50/20 |
| 2018/0144244 | A1 * | 5/2018 | Masoud | G06N 3/105 |
| 2019/0065637 | A1 * | 2/2019 | Bogdoll | G06F 30/20 |
| 2020/0012890 | A1 * | 1/2020 | Watson | G06F 11/3628 |
| 2020/0210884 | A1 * | 7/2020 | Hadash | G06N 3/006 |
| 2020/0311300 | A1 * | 10/2020 | Callcut | G06F 16/256 |
| 2020/0311911 | A1 * | 10/2020 | Poole | G06N 3/045 |
| 2020/0320417 | A1 * | 10/2020 | Corning | G06F 21/85 |
| 2020/0320439 | A1 * | 10/2020 | Lee | G06N 3/09 |
| 2020/0327252 | A1 | 10/2020 | Mcfall et al. | |
| 2021/0112101 | A1 * | 4/2021 | Crabtree | H04L 63/1425 |
| 2021/0141940 | A1 | 5/2021 | Naqvi et al. | |
| 2021/0158129 | A1 * | 5/2021 | Srivastava | G06N 3/0499 |
| 2021/0173854 | A1 | 6/2021 | Wilshinsky | |
| 2021/0232662 | A1 * | 7/2021 | Corning | H04L 67/34 |
| 2021/0240853 | A1 * | 8/2021 | Carlson | G16H 10/20 |
| 2021/0243162 | A1 * | 8/2021 | Farchy | H04L 63/0263 |
| 2021/0256000 | A1 | 8/2021 | Von Niederhausern et al. | |
| 2021/0256160 | A1 * | 8/2021 | Hachey | G06N 20/20 |
| 2021/0398676 | A1 * | 12/2021 | Evans | G16H 30/40 |
| 2022/0215241 | A1 * | 7/2022 | Fang | G06N 5/01 |
| 2022/0215242 | A1 * | 7/2022 | Shalev | G06V 10/751 |
| 2022/0215243 | A1 * | 7/2022 | Narayanaswami | G06F 18/2193 |
| 2022/0215262 | A1 * | 7/2022 | Narayanaswami | G06V 10/82 |
| 2022/0335328 | A1 * | 10/2022 | Frosch | G16H 50/70 |
| 2022/0344049 | A1 * | 10/2022 | Hall | G06N 3/048 |
| 2023/0010686 | A1 * | 1/2023 | Lesh | G16H 50/70 |
| 2023/0118341 | A1 * | 4/2023 | Erramilli | G06N 3/0455 706/12 |
| 2023/0137378 | A1 * | 5/2023 | LaTerza | G06F 40/40 726/26 |
| 2023/0368070 | A1 * | 11/2023 | Bhargava | G16H 50/20 |
| 2024/0105336 | A1 * | 3/2024 | Liao | G16B 20/00 |

OTHER PUBLICATIONS

Song et al.; "Machine Learning Models that Remember Too Much", 2017, ACM, pp. 587-601. (Year: 2017).*

Jacquez et al.; "Geospatial cryptography: enabling researchers to access private, spatially referenced, human subjects data for cancer control and prevention", 2017, Journal of Geographical Systems, vol. 19, No. 3, pp. 197-220. (Year: 2017).*

Nowling et al.; "A Domain-Driven, Generative Data Model for BigPetStore", 2014, IEEE, pp. 49-55. (Year: 2014).*

Fernandes et al.; "Automatic Searching and Pruning of Deep Neural Networks for Medical Imaging Diagnostic", Dec. 2021, IEEE Transactions on Neural Networks and Learning Systems, vol. 32, No. 12, pp. 5664-5674. (Year: 2021).*

Melamud et al.; "Towards Automatic Generation of Shareable Synthetic Clinical Notes Using Neural Language Models", May 2019, arXiv:1905.07002v2, pp. 1-11. (Year: 2019).*

Danu et sl.; "Deep learning based generation of synthetic blood vessel surfaces", 2019, International Conference on System Theory, Control and Computing (ICSTCC). pp. 662-667. (Year: 2019).*

ISA/US, "Notification of Transmittal of the ISR and the Written Opinion of the International Searching Authority, or the Declaration," in PCT Application No. PCT/US2022/053740, Jul. 6, 2023, 12 pages.

Azimi et al., "Structural health monitoring using extremely compressed data through deep learning"; Computer-Aided Civil and Infrastructure Engineering; wileyonlinelibrary.com/journal/mice; First published: Nov. 22, 2019; https://doi.org/10.1111/mice.12517; retrieved on [May 22, 2023]; retrieved from the internet <URL:https://mohsen-azimi.github.io/publications/j6/assets/j6.pdf> entire document.

* cited by examiner

2270B

SYSTEMS AND METHODS FOR ALGORITHM VALIDATION IN A ZERO-TRUST ENVIRONMENT

CROSS-REFERENCE TO RELATED APPLICATIONS

This application is a Continuation and claims the benefit of U.S. patent application Ser. No. 18/069,210, filed Dec. 20, 2022 entitled "SYSTEMS AND METHODS FOR DATA VALIDATION AND TRANSFORMATION OF DATA IN A ZERO-TRUST ENVIRONMENT" which claims the benefit and is a non-provisional of U.S. Provisional Application No. 63/293,723, filed Dec. 24, 2021 entitled "SYSTEMS AND METHODS FOR DATA VALIDATION AND TRANSFORM, DATA OBFUSCATION, AND ALGORITHM VALIDATION IN A ZERO-TRUST ENVIRONMENT", which Applications are incorporated in their entirety by this reference.

This application also claims the benefit and is a Continuation of PCT Application No. PCT/US22/53740, filed Dec. 21, 2022 entitled "SYSTEMS AND METHODS FOR DATA VALIDATION AND TRANSFORM, DATA OBFUSCATION, ALGORITHM VALIDATION, AND DATA AMALGAMATION IN A ZERO-TRUST ENVIRONMENT", which Application is incorporated in its entirety by this reference.

This application also claims the benefit and is a Continuation of U.S. patent application Ser. No. 18/146,994 filed Dec. 27, 2022 entitled "SYSTEMS AND METHODS FOR DATA OBFUSCATION IN A ZERO-TRUST ENVIRONMENT", which Application is incorporated in its entirety by this reference.

BACKGROUND

The present invention relates in general to the field of zero-trust computing, and more specifically to methods, computer programs and systems for the transformation, annotation and validation of datasets and algorithms within such systems. Such systems and methods are particularly useful in situations where algorithm developers wish to maintain secrecy of their algorithms, and the data being processed is highly sensitive, such as protected health information. For avoidance of doubt, an algorithm may include a model, code, pseudo-code, source code, or the like.

Within certain fields, there is a distinguishment between the developers of algorithms (often machine learning of artificial intelligence algorithms), and the stewards of the data that said algorithms are intended to operate with and be trained by. On its surface this seems to be an easily solved problem of merely sharing either the algorithm or the data that it is intended to operate with. However, in reality, there is often a strong need to keep the data and the algorithm secret. For example, the companies developing their algorithms may have the bulk of their intellectual property tied into the software comprising the algorithm. For many of these companies, their entire value may be centered in their proprietary algorithms. Sharing such sensitive data is a real risk to these companies, as the leakage of the software base code could eliminate their competitive advantage overnight.

One could imagine that instead, the data could be provided to the algorithm developer for running their proprietary algorithms and generation of the attendant reports. However, the problem with this methodology is two-fold. Firstly, often the datasets for processing and extremely large, requiring significant time to transfer the data from the data steward to the algorithm developer. Indeed, sometimes the datasets involved consume petabytes of data. The fastest fiber optics internet speed in the US is 2,000 MB/second. At this speed, transferring a petabyte of data can take nearly seven days to complete. It should be noted that most commercial internet speeds are a fraction of this maximum fiber optic speed.

The second reason that the datasets are not readily shared with the algorithm developers is that the data itself may be secret in some manner. For example, the data could also be proprietary, being of a significant asset value. Moreover, the data may be subject to some control or regulation. This is particularly true in the case of medical information. Protected health information, or PHI, for example, is subject to a myriad of laws, such as HIPAA, that include strict requirements on the sharing of PHI, and are subject to significant fines if such requirements are not adhered to.

Healthcare related information is of particular focus of this application. Of all the global stored data, about 30% resides in healthcare. This data provides a treasure trove of information for algorithm developers to train their specific algorithm models (AI or otherwise), and allows for the identification of correlations and associations within datasets. Such data processing allows advancements in the identification of individual pathologies, public health trends, treatment success metrics, and the like. Such output data from the running of these algorithms may be invaluable to individual clinicians, healthcare institutions, and private companies (such as pharmaceutical and biotechnology companies). At the same time, the adoption of clinical AI has been slow. More than 12,000 life-science papers described AI and ML in 2019 alone. Yet the U.S. Food and Drug Administration (FDA) has only approved only slightly more than 30 AI/ML-based medical technologies to date. Data access is a major barrier to clinical approval. The FDA requires proof that a model works across the entire population. However, privacy protections make it challenging to access enough diverse data to accomplish this goal.

To make the situation even more complicated, there is often errors in PHI (or most datasets for that matter). These errors can cause significant problems for the processing by an algorithm. Traditionally, the algorithm developer would validate data before running it in the algorithm to limit the impact of such errors. In these situations where the data will not (or cannot) be shared, another method (beyond exhaustive manual review) must be employed to ensure proper algorithm operation.

Conversely, as the data stewards do not have access to the algorithm, it is often very difficult to validate the proper operation of the algorithm. Without assurances that the algorithm is operating as intended, healthcare providers, researchers, and biotechnology companies, and rightfully hesitant to make important decisions based upon algorithm outputs.

Given that there is great value in the operation of secret algorithms on data that also must remain secret, and yet the need to verify and transform the data being operated upon, and validation of the algorithm employed, there is a significant need for systems and methods that allow for such zero-trust operations while providing validations and when needed, alterations of the inputted data. Such systems and methods enable sensitive data to be analyzed in a secure environment, providing the needed outputs, while maintaining secrecy of both the algorithms involved, as well as the data itself.

SUMMARY

The present systems and methods relate to the processing of secret data by secret algorithms in a secure and zero-trust environment.

Some embodiments relate to systems and methods for validating algorithms across different parties' systems by generating synthetic data for operation on algorithms. The synthetic data may include real data that have been de-identified, data that had been altered by pseudo-random deviations (range and distribution bound), or via generation by a ML algorithm that has been trained on real datasets. The synthetic data is shared between the various parties and run on their individual substantiations of the algorithm. The resulting output should be identical, thereby validating the algorithm. If there are differences in the outputs, then it can be determined that the algorithm is behaving in an unexpected manner.

In yet other embodiments, annotation validation can be performed. This may include salting annotations with known elements and collecting the results from the annotators. Likewise, ML may be employed to look for larger trends in the annotations between divergent datasets and different data stewards. Lastly, by redundant comparison between annotators' activity, the accuracy and consistency of annotations can be ascertained.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to systems and methods for the zero-trust application on one or more algorithms processing sensitive datasets. Such systems and methods may be applied to any given dataset, but may have particular utility within the healthcare setting, where the data is extremely sensitive. As such, the following descriptions will center on healthcare use cases. This particular focus, however, should not artificially limit the scope of the invention. For example, the information processed may include sensitive industry information, payroll or other personally identifiable information, or the like. As such, while much of the disclosure will refer to protected health information (PHI) it should be understood that this may actually refer to any sensitive type of data. Likewise, while the data stewards are generally thought to be a hospital or other healthcare entity, these data stewards may in reality be any entity that has and wishes to process their data within a zero-trust environment.

In some embodiments, the following disclosure will focus upon the term "algorithm". It should be understood that an algorithm may include machine learning (ML) models, neural network models, or other artificial intelligence (AI) models. However, algorithms may also apply to more mundane model types, such as linear models, least mean squares, or any other mathematical functions that convert one or more input values, and results in one or more output models.

Figure 1A:
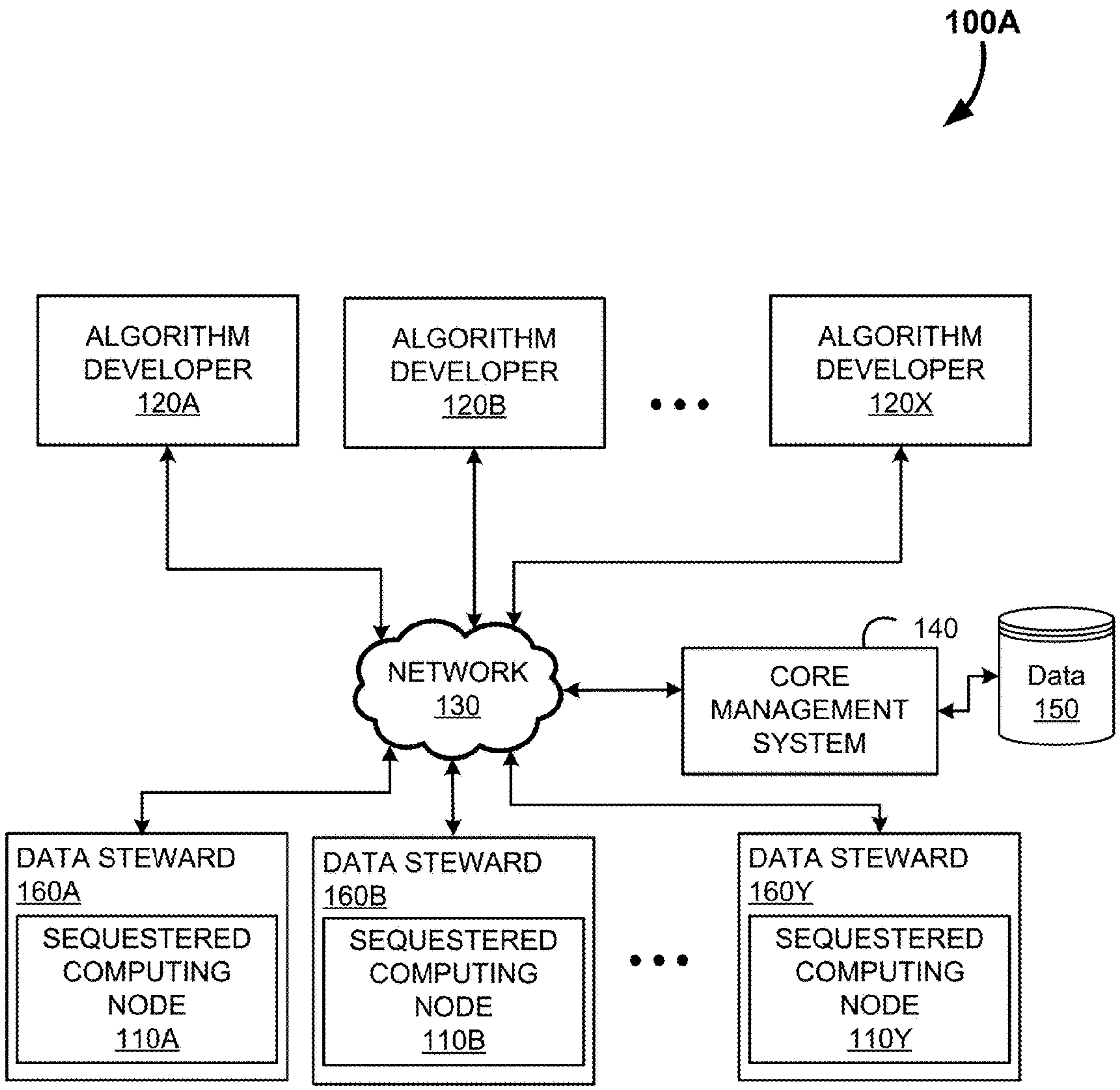
FIGS. 1A and 1B are example block diagrams of a system for zero trust computing of data by an algorithm, in accordance with some embodiment.

Also, in some embodiments of the disclosure, the terms "node", "infrastructure" and "enclave" may be utilized. These terms are intended to be used interchangeably and indicate a computing architecture that is logically distinct (and often physically isolated). In no way does the utilization of one such term limit the scope of the disclosure, and these terms should be read interchangeably. To facilitate discussions, FIG. 1A is an example of a zero-trust infrastructure, shown generally at 100*a*. This infrastructure includes one or more algorithm developers 120*a-x* which generate one or more algorithms for processing of data, which in this case is held by one or more data stewards 160*a-y*. The algorithm developers are generally companies that specialize in data analysis, and are often highly specialized in the types of data that are applicable to their given models/algorithms. However, sometimes the algorithm developers may be individuals, universities, government agencies, or the like. By uncovering powerful insights in vast amounts of information, AI and machine learning (ML) can improve care, increase efficiency, and reduce costs. For example, AI analysis of chest x-rays predicted the progression of critical illness in COVID-19. In another example, an image-based deep learning model developed at MIT can predict breast cancer up to five years in advance. And yet another example is an algorithm developed at University of California San Francisco, which can detect pneumothorax (collapsed lung) from CT scans, helping prioritize and treat patients with this life-threatening condition—the first algorithm embedded in a medical device to achieve FDA approval.

Likewise, the data stewards may include public and private hospitals, companies, universities, governmental agencies, or the like. Indeed, virtually any entity with access to sensitive data that is to be analyzed may be a data steward.

The generated algorithms are encrypted at the algorithm developer in whole, or in part, before transmitting to the data stewards, in this example ecosystem. The algorithms are transferred via a core management system 140, which may supplement or transform the data using a localized datastore 150. The core management system also handles routing and deployment of the algorithms. The datastore may also be leveraged for key management in some embodiments that will be discussed in greater detail below.

Each of the algorithm developer 120*a-x*, and the data stewards 160*a-y* and the core management system 140 may be coupled together by a network 130. In most cases the network is comprised of a cellular network and/or the internet. However, it is envisioned that the network includes any wide area network (WAN) architecture, including private WAN's, or private local area networks (LANs) in conjunction with private or public WANs.

In this particular system, the data stewards maintain sequestered computing nodes 110*a-y* which function to actually perform the computation of the algorithm on the dataset. The sequestered computing nodes, or "enclaves", may be physically separate computer server systems, or may encompass virtual machines operating within a greater network of the data steward's systems. The sequestered computing nodes should be thought of as a vault. The encrypted algorithm and encrypted datasets are supplied to the vault, which is then sealed. Encryption keys 390 unique to the vault are then provided, which allows the decryption of the data and models to occur. No party has access to the vault at this time, and the algorithm is able to securely operate on the data. The data and algorithms may then be destroyed, or maintained as encrypted, when the vault is "opened" in order to access the report/output derived from the application of the algorithm on the dataset. Due to the specific sequestered computing node being required to decrypt the given algorithm(s) and data, there is no way they can be intercepted and decrypted. This system relies upon public-private key techniques, where the algorithm developer utilizes the public key 390 for encryption of the algorithm, and the sequestered computing node includes the private key in order to perform the decryption. In some embodiments, the private key may be hardware (in the case of Azure, for example) or software linked (in the case of AWS, for example).

In some particular embodiments, the system sends algorithm models via an Azure Confidential Computing environment to two data steward environments. Upon verification, the model and the data entered the Intel SGX sequestered enclave where the model is able to be validated against the protected information, for example PHI, data sets. Throughout the process, the algorithm owner cannot see the data, the data steward cannot see the algorithm model, and the management core can see neither the data nor the model.

The data steward uploads encrypted data to their cloud environment using an encrypted connection that terminates inside an Intel SGX-sequestered enclave. Then, the algorithm developer submits an encrypted, containerized AI model which also terminates into an Intel SGX-sequestered enclave. A key management system in the management core enables the containers to authenticate and then run the model on the data within the enclave. The data steward never sees the algorithm inside the container and the data is never visible to the algorithm developer. Neither component leaves the enclave. After the model runs, the developer receives a performance report on the values of the algorithm's performance along with a summary of the data characteristics. Finally, the algorithm owner may request that an encrypted artifact containing information about validation results is stored for regulatory compliance purposes and the data and the algorithm are wiped from the system.

Figure 1B:
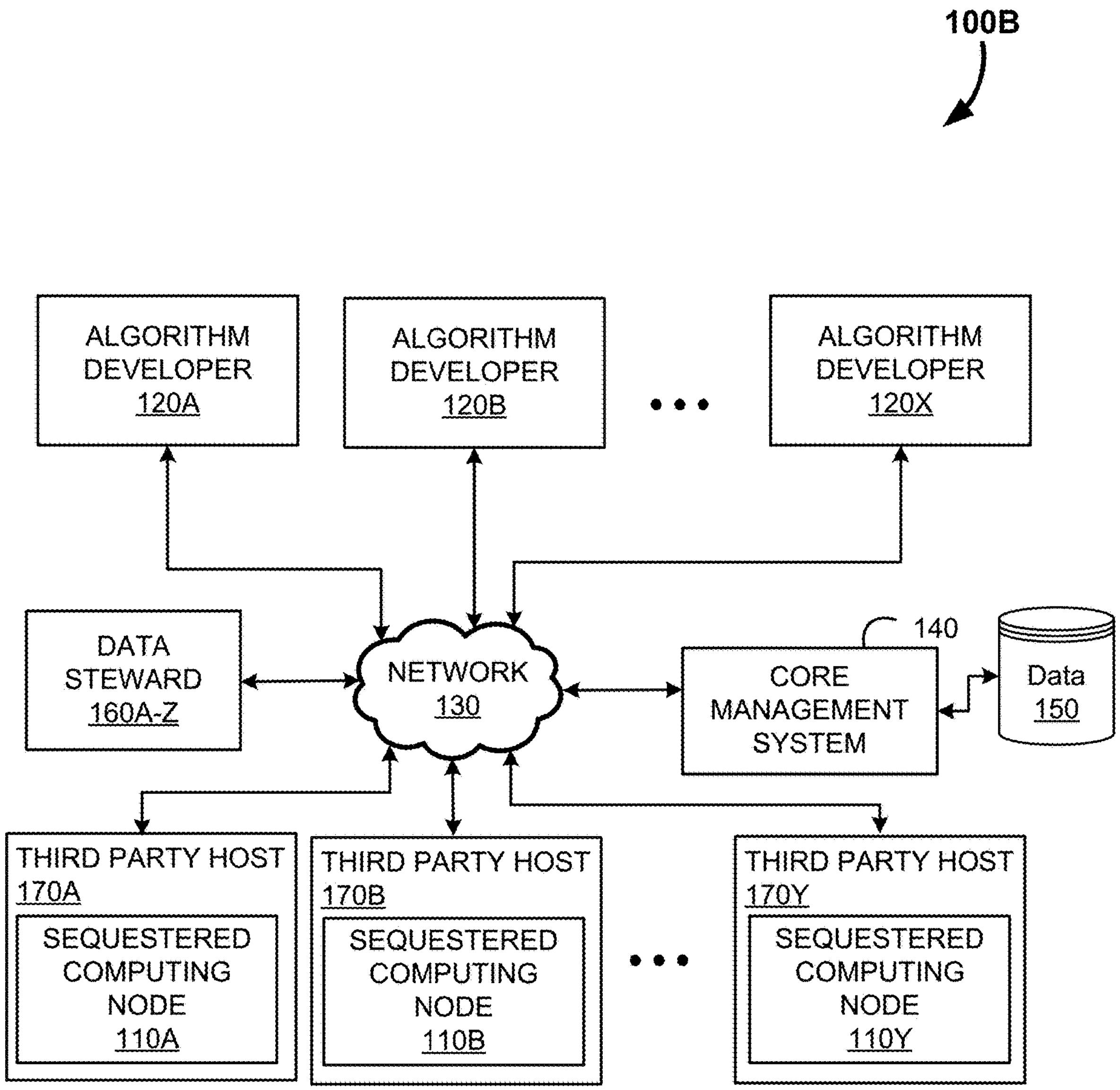

FIG. 1B provides a similar ecosystem 100*b*. This ecosystem also includes one or more algorithm developers 120*a-x*, which generate, encrypt and output their models. The core management system 140 receives these encrypted payloads, and in some embodiments, transforms or augments unencrypted portions of the payloads. The major difference between this substantiation and the prior figure, is that the sequestered computing node(s) 110*a-y* are present within a third party host 170*a-y*. An example of a third-party host may include an offsite server such as Amazon Web Service (AWS) or similar cloud infrastructure. In such situations, the data steward encrypts their dataset(s) and provides them, via the network, to the third party hosted sequestered computing node(s) 110*a-y*. The output of the algorithm running on the dataset is then transferred from the sequestered computing node in the third-party, back via the network to the data steward (or potentially some other recipient).

In some specific embodiments, the system relies on a unique combination of software and hardware available through Azure Confidential Computing. The solution uses virtual machines (VMs) running on specialized Intel processors with Intel Software Guard Extension (SGX), in this embodiment, running in the third party system. Intel SGX creates sequestered portions of the hardware's processor and memory known as "enclaves" making it impossible to view data or code inside the enclave. Software within the management core handles encryption, key management, and workflows.

In some embodiments, the system may be some hybrid between FIGS. 1A and 1B. For example, some datasets may be processed at local sequestered computing nodes, especially extremely large datasets, and others may be processed at third parties. Such systems provide flexibility based upon computational infrastructure, while still ensuring all data and algorithms remain sequestered and not visible except to their respective owners.

Figure 2:
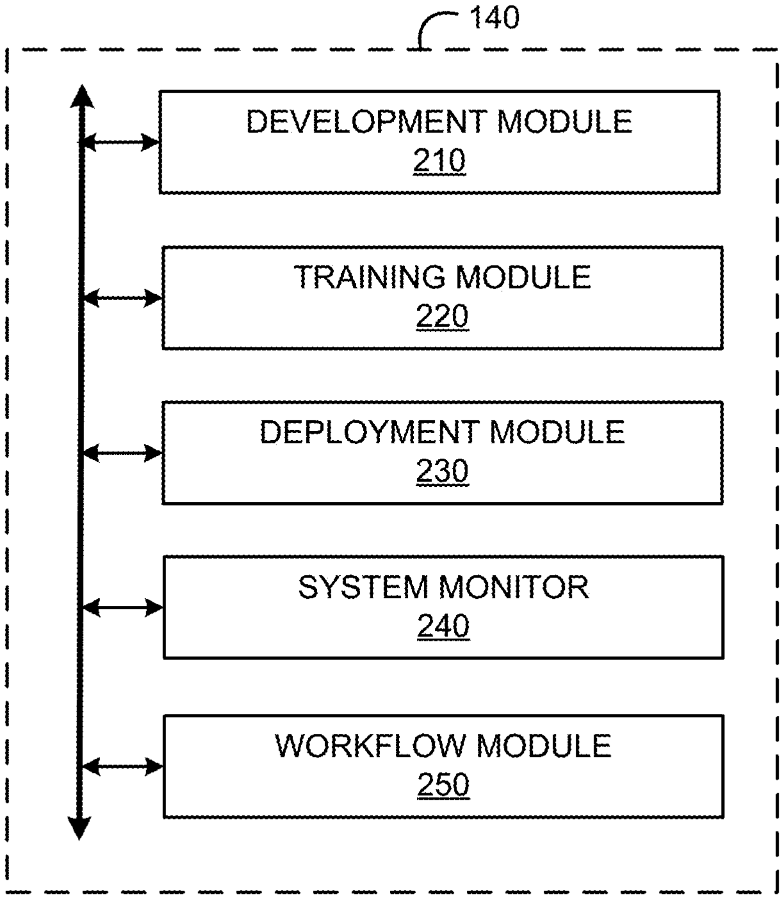
FIG. 2 is an example block diagram showing the core management system, in accordance with some embodiment.

Turning now to FIG. 2, greater detail is provided regarding the core management system 140. The core management system 140 may include a data science development module 210, a data harmonizer workflow creation module 250, a software deployment module 230, a federated master algorithm training module 220, a system monitoring module 240, and a data store comprising global join data 240.

The data science development module 210 may be configured to receive input data requirements from the one or more algorithm developers for the optimization and/or validation of the one or more models. The input data requirements define the objective for data curation, data transformation, and data harmonization workflows. The input data requirements also provide constraints for identifying data assets acceptable for use with the one or more models. The data harmonizer workflow creation module 250 may be configured to manage transformation, harmonization, and annotation protocol development and deployment. The software deployment module 230 may be configured along with the data science development module 210 and the data harmonizer workflow creation module 250 to assess data assets for use with one or more models. This process can be automated or can be an interactive search/query process. The software deployment module 230 may be further configured along with the data science development module 210 to integrate the models into a sequestered capsule computing framework, along with required libraries and resources.

In some embodiments, it is desired to develop a robust, superior algorithm/model that has learned from multiple disjoint private data sets (e.g., clinical and health data) collected by data hosts from sources (e.g., patients). The federated master algorithm training module may be configured to aggregate the learning from the disjoint data sets into a single master algorithm. In different embodiments, the algorithmic methodology for the federated training may be different. For example, sharing of model parameters, ensemble learning, parent-teacher learning on shared data and many other methods may be developed to allow for federated training. The privacy and security requirements, along with commercial considerations such as the determination of how much each data system might be paid for access to data, may determine which federated training methodology is used.

The system monitoring module 240 monitors activity in sequestered computing nodes. Monitored activity can range from operational tracking such as computing workload, error state, and connection status as examples to data science monitoring such as amount of data processed, algorithm convergence status, variations in data characteristics, data errors, algorithm/model performance metrics, and a host of additional metrics, as required by each use case and embodiment.

In some instances, it is desirable to augment private data sets with additional data located at the core management system (join data 150). For example, geolocation air quality data could be joined with geolocation data of patients to ascertain environmental exposures. In certain instances, join data may be transmitted to sequestered computing nodes to be joined with their proprietary datasets during data harmonization or computation.

The sequestered computing nodes may include a harmonizer workflow module, harmonized data, a runtime server, a system monitoring module, and a data management module (not shown). The transformation, harmonization, and annotation workflows managed by the data harmonizer workflow creation module may be deployed by and performed in the environment by harmonizer workflow module using transformations and harmonized data. In some instances, the join data may be transmitted to the harmonizer workflow module to be joined with data during data harmonization. The runtime server may be configured to run the private data sets through the algorithm/model.

The system monitoring module monitors activity in the sequestered computing node. Monitored activity may include operational tracking such as algorithm/model intake, workflow configuration, and data host onboarding, as required by each use case and embodiment. The data management module may be configured to import data assets such as private data sets while maintaining the data assets within the pre-exiting infrastructure of the data stewards.

Figure 3:
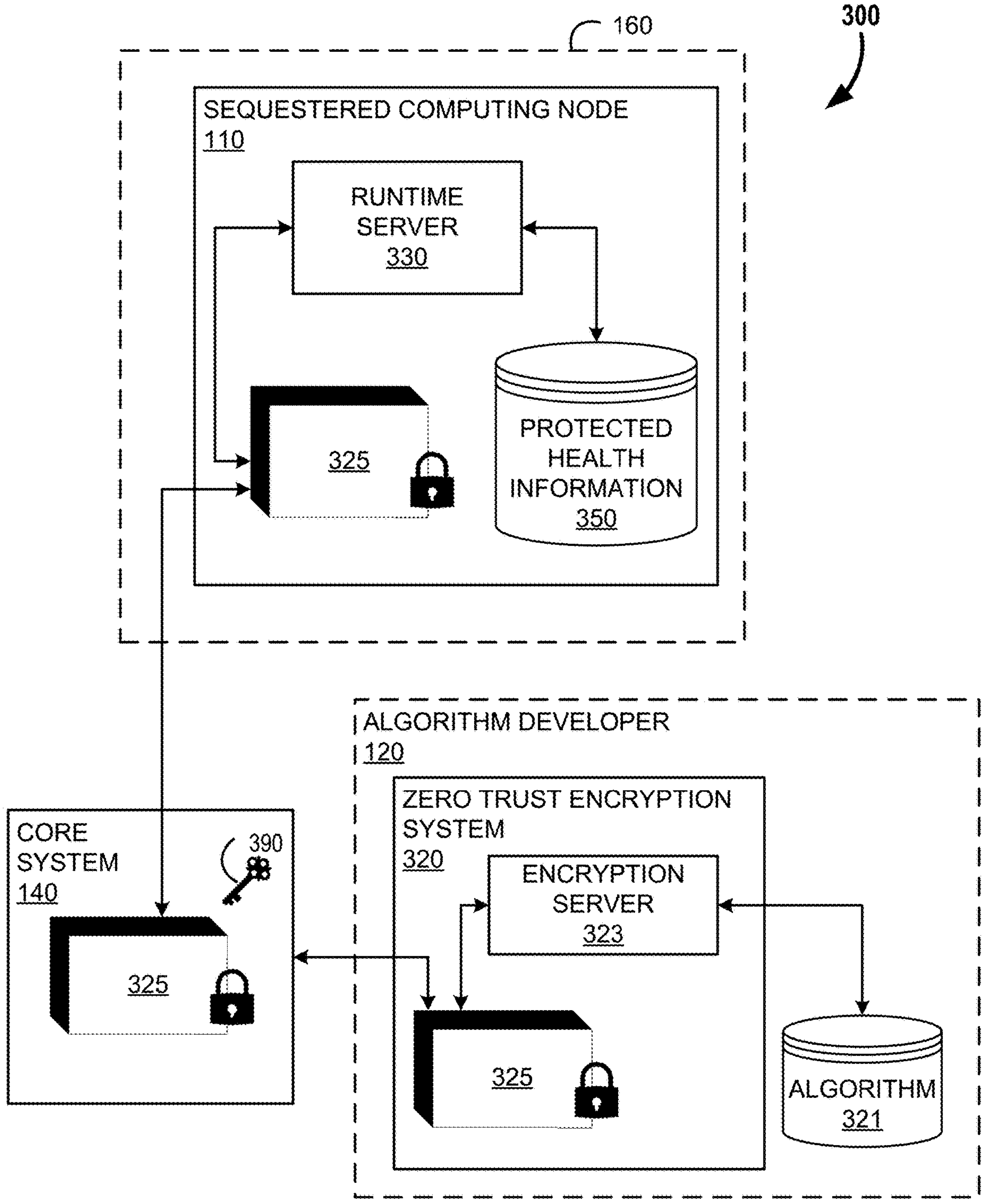
FIG. 3 is an example block diagram showing a first model for the zero-trust data flow, in accordance with some embodiment.

Turning now to FIG. 3, a first model of the flow of algorithms and data are provided, generally at 300. The Zero-Trust Encryption System 320 manages the encryption, by an encryption server 323, of all the algorithm developer's 120 software assets 321 in such a way as to prevent exposure of intellectual property (including source or object code) to any outside party, including the entity running the core management system 140 and any affiliates, during storage, transmission and runtime of said encrypted algorithms 325. In this embodiment, the algorithm developer is responsible for encrypting the entire payload 325 of the software using its own encryption keys. Decryption is only ever allowed at runtime in a sequestered capsule computing environment 110.

The core management system 140 receives the encrypted computing assets (algorithms) 325 from the algorithm developer 120. Decryption keys to these assets are not made available to the core management system 140 so that sensitive materials are never visible to it. The core management system 140 distributes these assets 325 to a multitude of data steward nodes 160 where they can be processed further, in combination with private datasets, such as protected health information (PHI) 350.

Each Data Steward Node 160 maintains a sequestered computing node 110 that is responsible for allowing the algorithm developer's encrypted software assets 325 to compute on a local private dataset 350 that is initially encrypted. Within data steward node 160, one or more local private datasets (not illustrated) is harmonized, transformed, and/or annotated and then this dataset is encrypted by the data steward, into a local dataset 350, for use inside the sequestered computing node 110.

The sequestered computing node 110 receives the encrypted software assets 325 and encrypted data steward dataset(s) 350 and manages their decryption in a way that prevents visibility to any data or code at runtime at the runtime server 330. In different embodiments this can be performed using a variety of secure computing enclave technologies, including but not limited to hardware-based and software-based isolation.

In this present embodiment, the entire algorithm developer software asset payload 325 is encrypted in a way that it can only be decrypted in an approved sequestered computing enclave/node 110. This approach works for sequestered enclave technologies that do not require modification of source code or runtime environments in order to secure the computing space (e.g., software-based secure computing enclaves).

Figure 4:
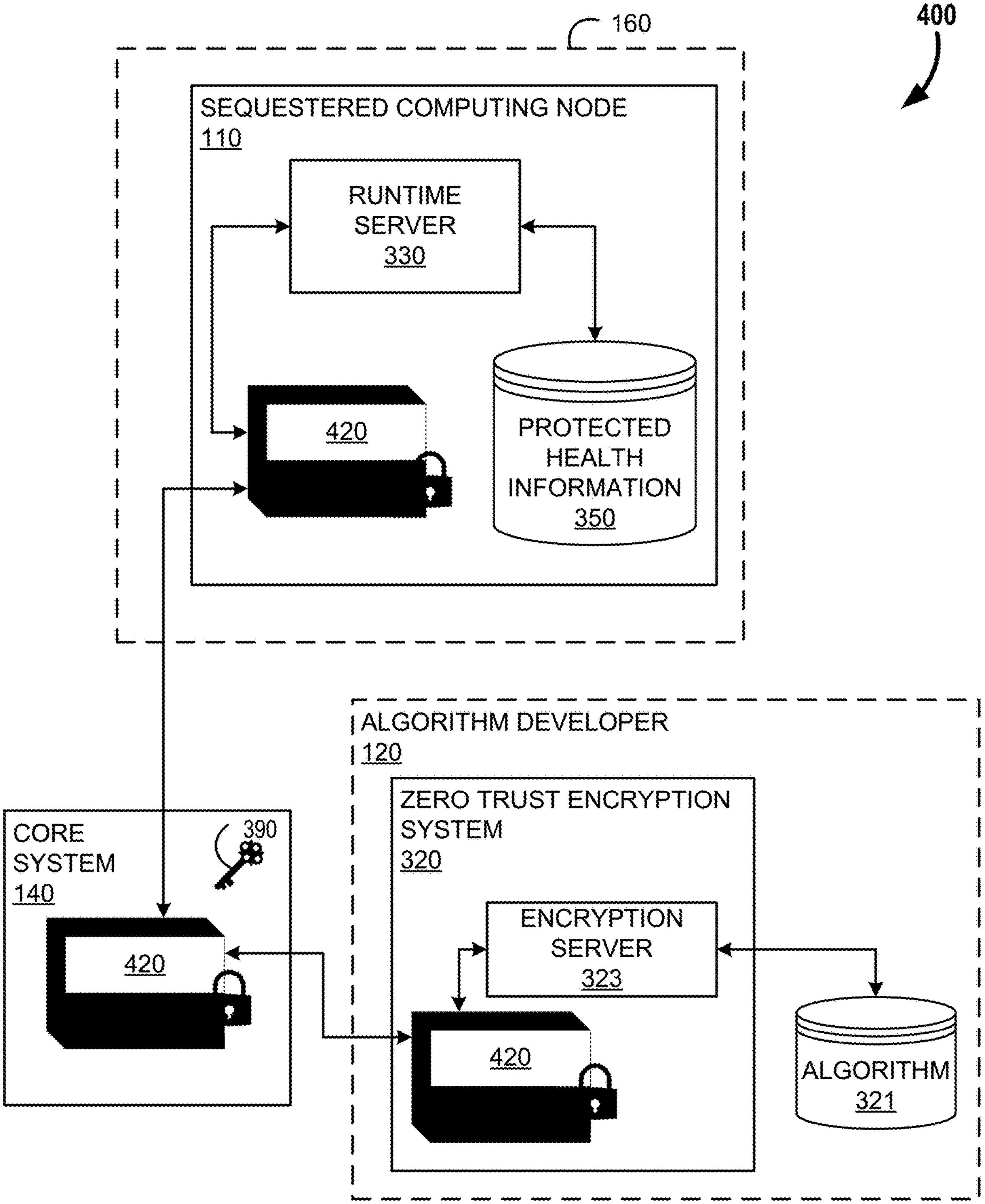
FIG. 4 is an example block diagram showing a second model for the zero-trust data flow, in accordance with some embodiment.

Turning to FIG. 4, the general environment is maintained, as seen generally at 400, however in this embodiment, the encryption server 323 takes the algorithm asset 321, and only encrypts a specific sensitive layer 425 (generally comprising the algorithm weights), while leaving remaining non-sensitive algorithm elements 420 (such as the container and base model minus weights) unencrypted. This embodiment has the advantage of allowing the unencrypted portion 420 of the payload to be transformed, or otherwise altered, by either the core management system 140, or by the data steward 160. An example would be the conversion of specific library dependencies from the original operating system to Enclave OS, a special operating system that runs code in an Intel SGX sequestered computing enclave.

Figure 5:
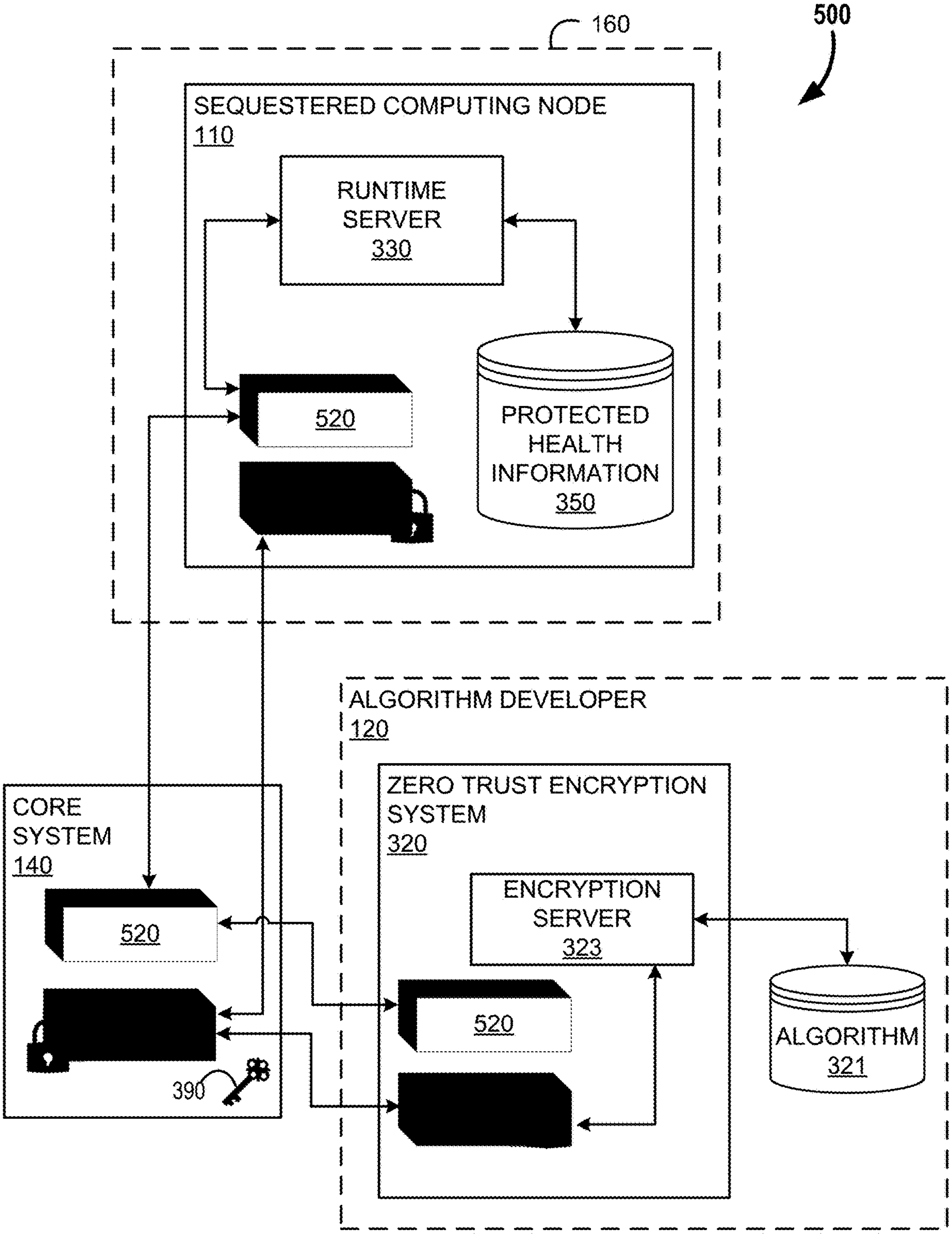
FIG. 5 is an example block diagram showing a third model for the zero-trust data flow, in accordance with some embodiment.

In a similar manner, FIG. 5 provides an example embodiment of a system whereby the sensitive and non-sensitive portions of the developer assets 321 are treated differently, seen generally at 500. In this example, however, rather than only encrypting a specific layer of the ultimate payload, the assets are separated into two portions: the sensitive elements 525 and the non-sensitive elements 520. The non-sensitive elements 520, are then transferred in the clear, while the sensitive elements 525 are encrypted before leaving the zero trust encryption system 320. As with the embodiment found in FIG. 4, this methodology of splitting the payload into two entirely separate elements allows the unencrypted non-sensitive payload 520 to be modified.

Figure 6:
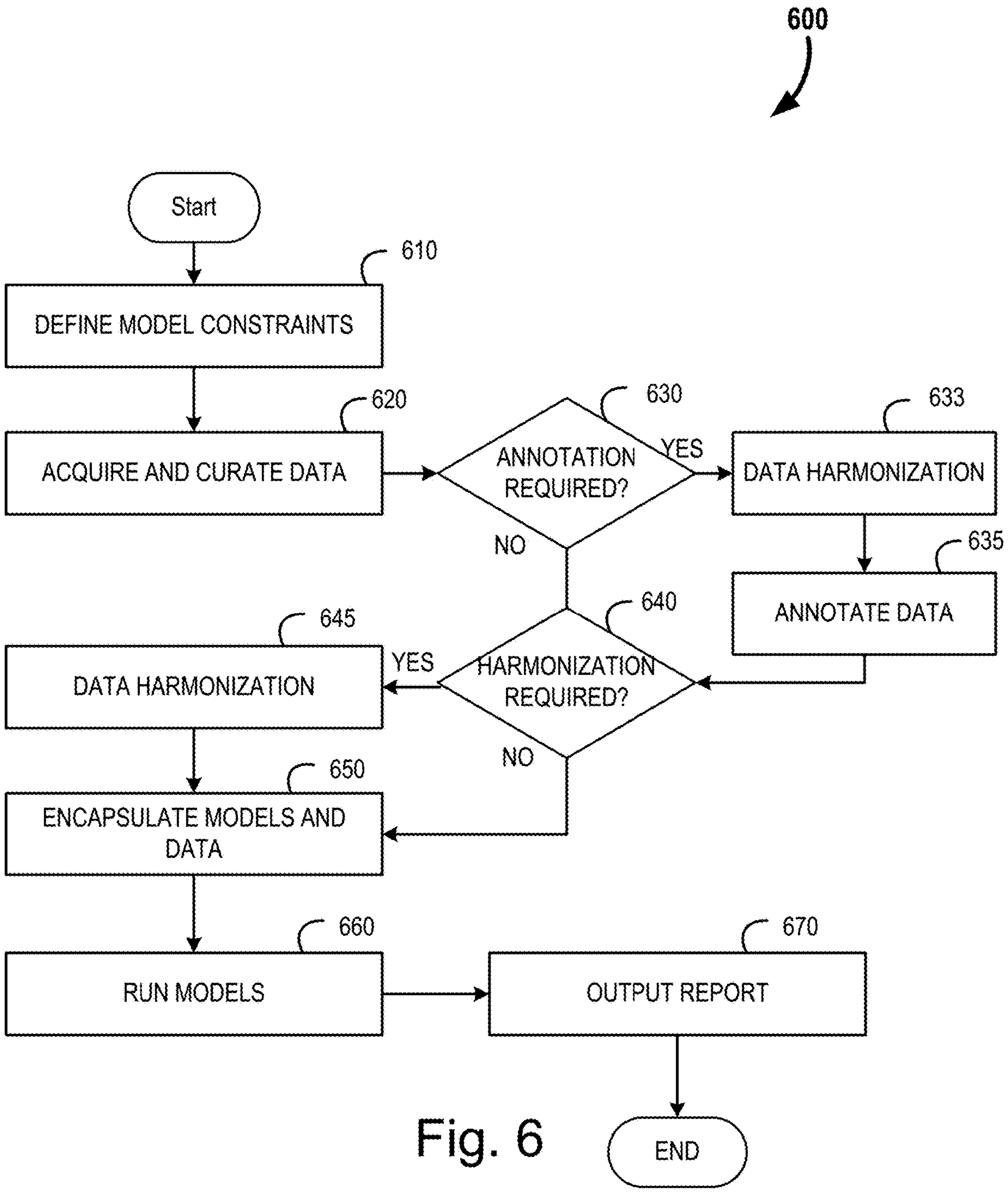
FIG. 6 is a flowchart for an example process for the operation of the zero-trust data processing system, in accordance with some embodiment.

Turning to FIG. 6, one embodiment of the process for deployment and running of algorithms within the sequestered computing nodes is illustrated, at 600. Initially the algorithm developer provides the algorithm to the system. The at least one algorithm/model is generated by the algorithm developer using their own development environment, tools, and seed data sets (e.g., training/testing data sets). In some embodiments, the algorithms may be trained on external datasets instead, as will be discussed further below. The algorithm developer provides constraints (at 610) for the optimization and/or validation of the algorithm(s). Constraints may include any of the following: (i) training constraints, (ii) data preparation constraints, and (iii) validation constraints. These constraints define objectives for the optimization and/or validation of the algorithm(s) including data preparation (e.g., data curation, data transformation, data harmonization, and data annotation), model training, model validation, and reporting.

In some embodiments, the training constraints may include, but are not limited to, at least one of the following: hyperparameters, regularization criteria, convergence criteria, algorithm termination criteria, training/validation/test data splits defined for use in algorithm(s), and training/testing report requirements. A model hyper parameter is a configuration that is external to the model, and which value cannot be estimated from data. The hyperparameters are settings that may be tuned or optimized to control the behavior of a ML or AI algorithm and help estimate or learn model parameters.

Regularization constrains the coefficient estimates towards zero. This discourages the learning of a more complex model in order to avoid the risk of overfitting. Regularization, significantly reduces the variance of the model, without a substantial increase in its bias. The convergence criterion is used to verify the convergence of a sequence (e.g., the convergence of one or more weights after a number of iterations). The algorithm termination criteria define parameters to determine whether a model has achieved sufficient training. Because algorithm training is an iterative optimization process, the training algorithm may perform the following steps multiple times. In general, termination criteria may include performance objectives for the algorithm, typically defined as a minimum amount of performance improvement per iteration or set of iterations.

The training/testing report may include criteria that the algorithm developer has an interest in observing from the training, optimization, and/or testing of the one or more models. In some instances, the constraints for the metrics and criteria are selected to illustrate the performance of the models. For example, the metrics and criteria such as mean percentage error may provide information on bias, variance, and other errors that may occur when finalizing a model such as vanishing or exploding gradients. Bias is an error in the learning algorithm. When there is high bias, the learning algorithm is unable to learn relevant details in the data. Variance is an error in the learning algorithm, when the learning algorithm tries to over-learn from the dataset or tries to fit the training data as closely as possible. Further, common error metrics such as mean percentage error and R2 score are not always indicative of accuracy of a model, and thus the algorithm developer may want to define additional metrics and criteria for a more in depth look at accuracy of the model.

Figure 7A:
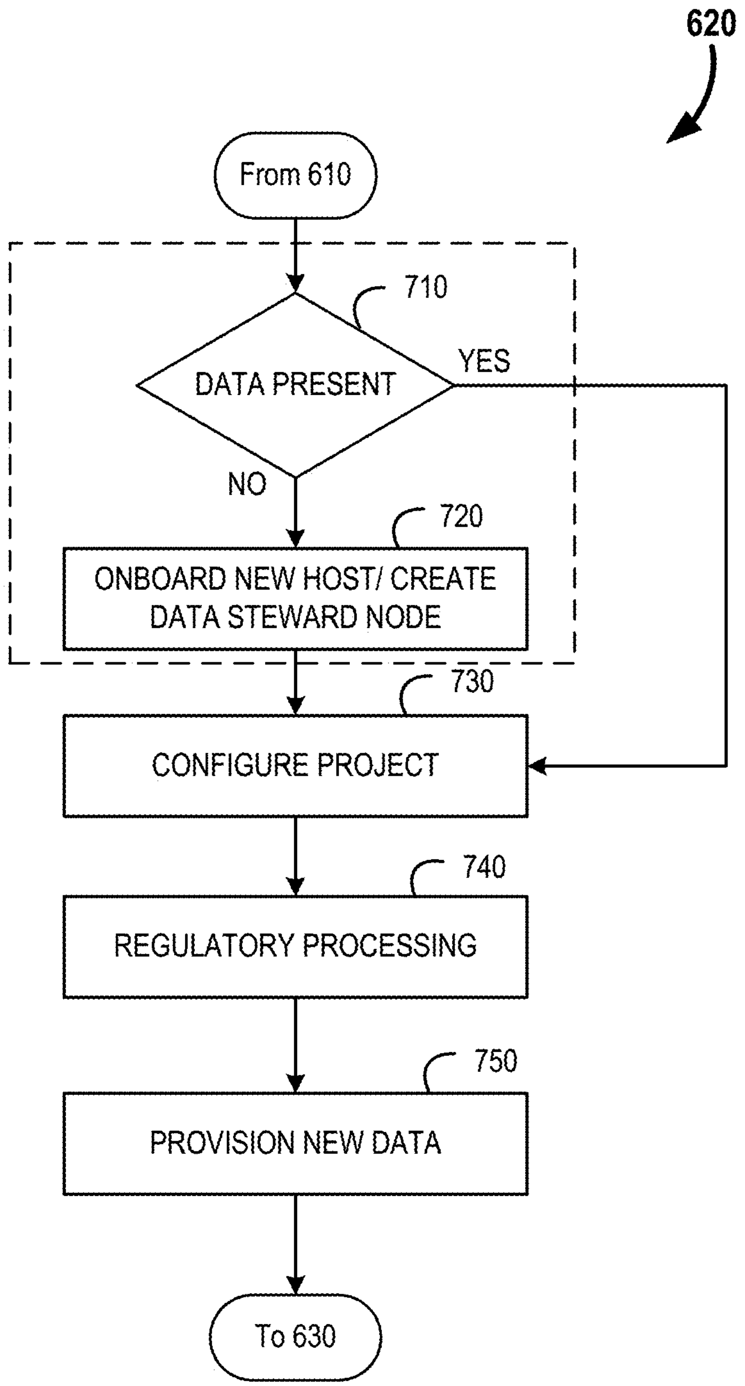
FIG. 7A a flowchart for an example process of acquiring and curating data, in accordance with some embodiment.

Next, data assets that will be subjected to the algorithm(s) are identified, acquired, and curated (at 620). FIG. 7A provides greater detail of this acquisition and curation of the data. Often, the data may include healthcare related data (PHI). Initially, there is a query if data is present (at 710). The identification process may be performed automatically by the platform running the queries for data assets (e.g., running queries on the provisioned data stores using the data indices) using the input data requirements as the search terms and/or filters. Alternatively, this process may be performed using an interactive process, for example, the algorithm developer may provide search terms and/or filters to the platform. The platform may formulate questions to obtain additional information, the algorithm developer may provide the additional information, and the platform may run queries for the data assets (e.g., running queries on databases of the one or more data hosts or web crawling to identify data hosts that may have data assets) using the search terms, filters, and/or additional information. In either instance, the identifying is performed using differential privacy for sharing information within the data assets by describing patterns of groups within the data assets while withholding private information about individuals in the data assets.

Figure 7B:
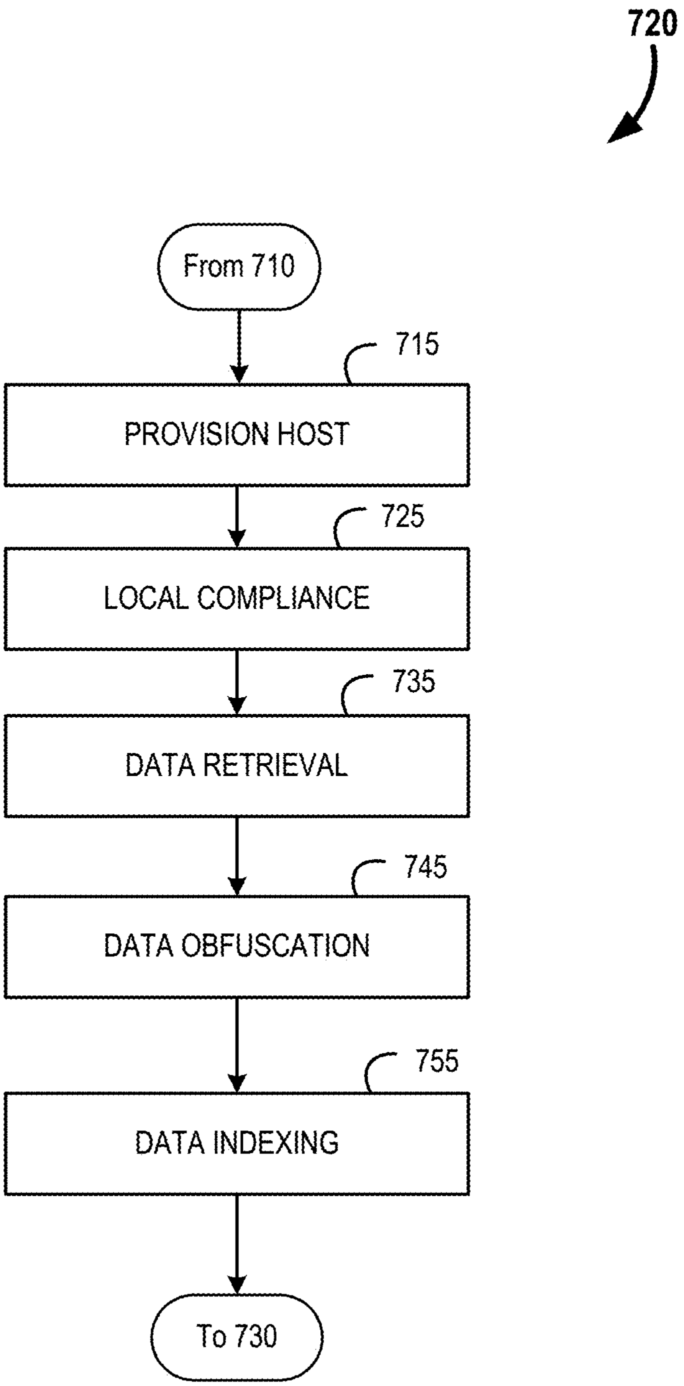
FIG. 7B a flowchart for an example process of onboarding a new host data steward, in accordance with some embodiment.

If the assets are not available, the process generates a new data steward node (at 720). The data query and onboarding activity (surrounded by a dotted line) is illustrated in this process flow of acquiring the data; however, it should be realized that these steps may be performed anytime prior to model and data encapsulation (step 650 in FIG. 6). Onboarding/creation of a new data steward node is shown in greater detail in relation to FIG. 7B. In this example process a data host compute and storage infrastructure (e.g., a sequestered computing node as described with respect to FIGS. 1A-5) is provisioned (at 715) within the infrastructure of the data steward. In some instances, the provisioning includes deployment of encapsulated algorithms in the infrastructure, deployment of a physical computing device with appropriately provisioned hardware and software in the infrastructure, deployment of storage (physical data stores or cloud-based storage), or deployment on public or private cloud infrastructure accessible via the infrastructure, etc.

Next, governance and compliance requirements are performed (at 725). In some instances, the governance and compliance requirements includes getting clearance from an institutional review board, and/or review and approval of compliance of any project being performed by the platform and/or the platform itself under governing law such as the Health Insurance Portability and Accountability Act (HIPAA). Subsequently, the data assets that the data steward desires to be made available for optimization and/or validation of algorithm(s) are retrieved (at 735). In some instances, the data assets may be transferred from existing storage locations and formats to provisioned storage (physical data stores or cloud-based storage) for use by the sequestered computing node (curated into one or more data stores). The data assets may then be obfuscated (at 745). Data obfuscation is a process that includes data encryption or tokenization, as discussed in much greater detail below. Lastly, the data assets may be indexed (at 755). Data indexing allows queries to retrieve data from a database in an efficient manner. The indexes may be related to specific tables and may be comprised of one or more keys or values to be looked up in the index (e.g., the keys may be based on a data table's columns or rows).

Returning to FIG. 7A, after the creation of the new data steward, the project may be configured (at 730). In some instances, the data steward computer and storage infrastructure is configured to handle a new project with the identified data assets. In some instances, the configuration is performed similarly to the process described of FIG. 7B. Next, regulatory approvals (e.g., IRB and other data governance processes) are completed and documented (at 740). Lastly, the new data is provisioned (at 750). In some instances, the data storage provisioning includes identification and provisioning of a new logical data storage location, along with creation of an appropriate data storage and query structure.

Returning now to FIG. 6, after the data is acquired and configured, a query is performed if there is a need for data annotation (at 630). If so, the data is initially harmonized (at 633) and then annotated (at 635). Data harmonization is the process of collecting data sets of differing file formats, naming conventions, and columns, and transforming it into a cohesive data set. The annotation is performed by the data steward in the sequestered computing node. A key principle to the transformation and annotation processes is that the platform facilitates a variety of processes to apply and refine data cleaning and transformation algorithms, while preserving the privacy of the data assets, all without requiring data to be moved outside of the technical purview of the data steward.

Figure 8:
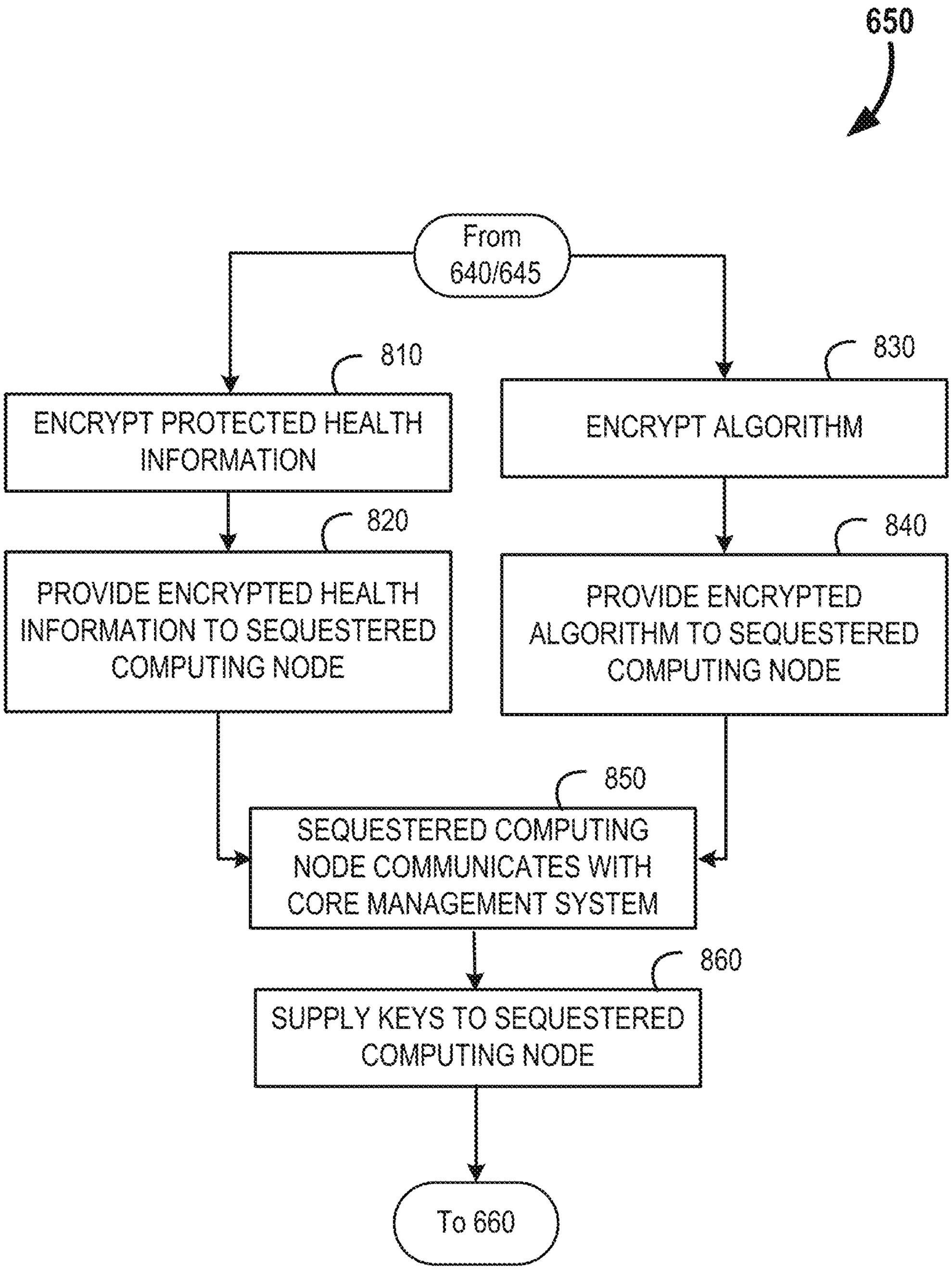
FIG. 8 is a flowchart for an example process of encapsulating the algorithm and data, in accordance with some embodiment.

After annotation, or if annotation was not required, another query determines if additional data harmonization is needed (at 640). If so, then there is another harmonization step (at 645) that occurs in a manner similar to that disclosed above. After harmonization, or if harmonization isn't needed, the models and data are encapsulated (at 650). Data and model encapsulation is described in greater detail in relation to FIG. 8. In the encapsulation process the protected data, and the algorithm are each encrypted (at 810 and 830 respectively). In some embodiments, the data is encrypted either using traditional encryption algorithms (e.g., RSA) or homomorphic encryption.

Next the encrypted data and encrypted algorithm are provided to the sequestered computing node (at 820 and 840 respectively). There processes of encryption and providing the encrypted payloads to the sequestered computing nodes may be performed asynchronously, or in parallel. Subsequently, the sequestered computing node may phone home to the core management node (at 850) requesting the keys needed. These keys are then also supplied to the sequestered computing node (at 860), thereby allowing the decryption of the assets.

Returning again to FIG. 6, once the assets are all within the sequestered computing node, they may be decrypted and the algorithm may run against the dataset (at 660). The results from such runtime may be outputted as a report (at 670) for downstream consumption.

Figure 9:
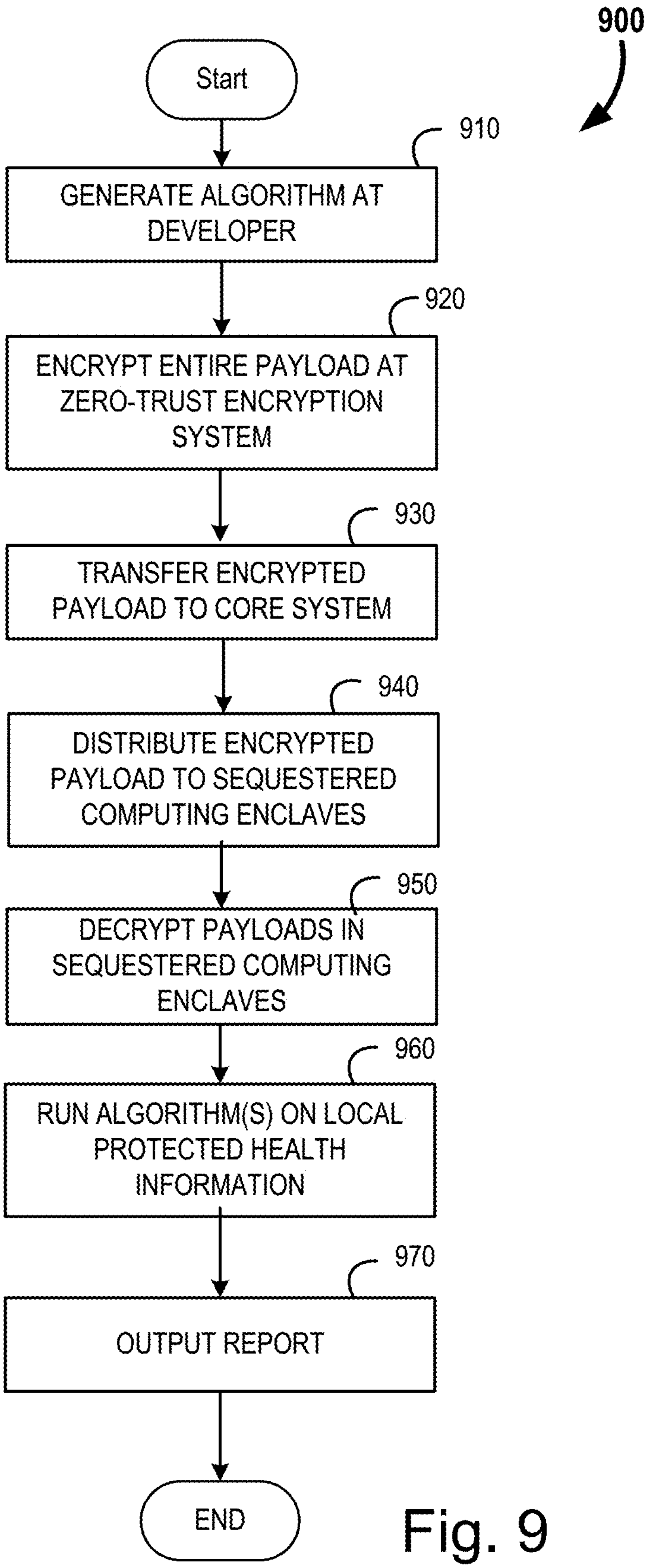
FIG. 9 is a flowchart for an example process of a first model of algorithm encryption and handling, in accordance with some embodiment.

Turning now to FIG. 9, a first embodiment of the system for zero-trust processing of the data assets by the algorithm is provided, at 900. In this example process, the algorithm is initially generated by the algorithm developer (at 910) in a manner similar to that described previously. The entire algorithm, including its container, is then encrypted (at 920), using a public key, by the encryption server within the zero-trust system of the algorithm developer's infrastructure. The entire encrypted payload is provided to the core management system (at 930). The core management system then distributes the encrypted payload to the sequestered computing enclaves (at 940).

Likewise, the data steward collects the data assets desired for processing by the algorithm. This data is also provided to the sequestered computing node. In some embodiments, this data may also be encrypted. The sequestered computing node then contacts the core management system for the keys. The system relies upon public-private key methodologies for the decryption of the algorithm, and possibly the data (at 950).

After decryption within the sequestered computing node, the algorithm(s) are run (at 960) against the protected health information (or other sensitive information based upon the given use case). The results are then output (at 970) to the appropriate downstream audience (generally the data steward, but may include public health agencies or other interested parties).

Figure 10:
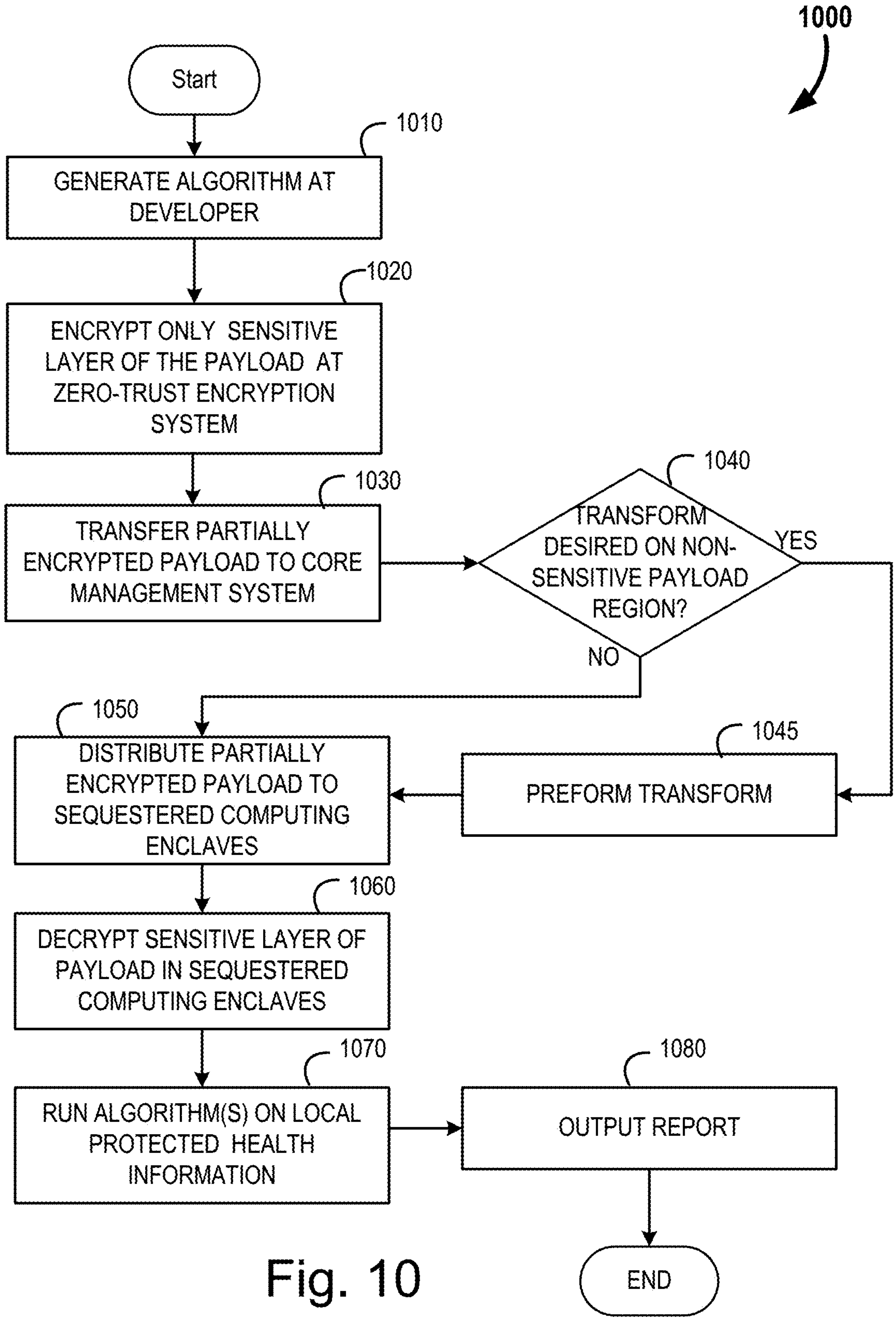
FIG. 10 is a flowchart for an example process of a second model of algorithm encryption and handling, in accordance with some embodiments.

FIG. 10, on the other hand, provides another methodology of zero-trust computation that has the advantage of allowing some transformation of the algorithm data by either the core management system or the data steward themselves, shown generally at 1000. As with the prior embodiment, the algorithm is initially generated by the algorithm developer (at 1010). However, at this point the two methodologies diverge. Rather than encrypt the entire algorithm payload, it differentiates between the sensitive portions of the algorithm (generally the algorithm weights), and non-sensitive portions of the algorithm (including the container, for example). The process then encrypts only layers of the payload that have been flagged as sensitive (at 1020).

The partially encrypted payload is then transferred to the core management system (at 1030). At this stage a determination is made whether a modification is desired to the non-sensitive, non-encrypted portion of the payload (at 1040). If a modification is desired, then it may be performed in a similar manner as discussed previously (at 1045).

If no modification is desired, or after the modification is performed, the payload may be transferred (at 1050) to the sequestered computing node located within the data steward infrastructure (or a third party). Although not illustrated, there is again an opportunity at this stage to modify any non-encrypted portions of the payload when the algorithm payload is in the data steward's possession.

Next, the keys unique to the sequestered computing node are employed to decrypt the sensitive layer of the payload (at 1060), and the algorithms are run against the locally available protected health information (at 1070). In the use case where a third party is hosting the sequestered computing node, the protected health information may be encrypted at the data steward before being transferred to the sequestered computing node at said third party. Regardless of sequestered computing node location, after runtime, the resulting report is outputted to the data steward and/or other interested party (at 1080).

Figure 11:
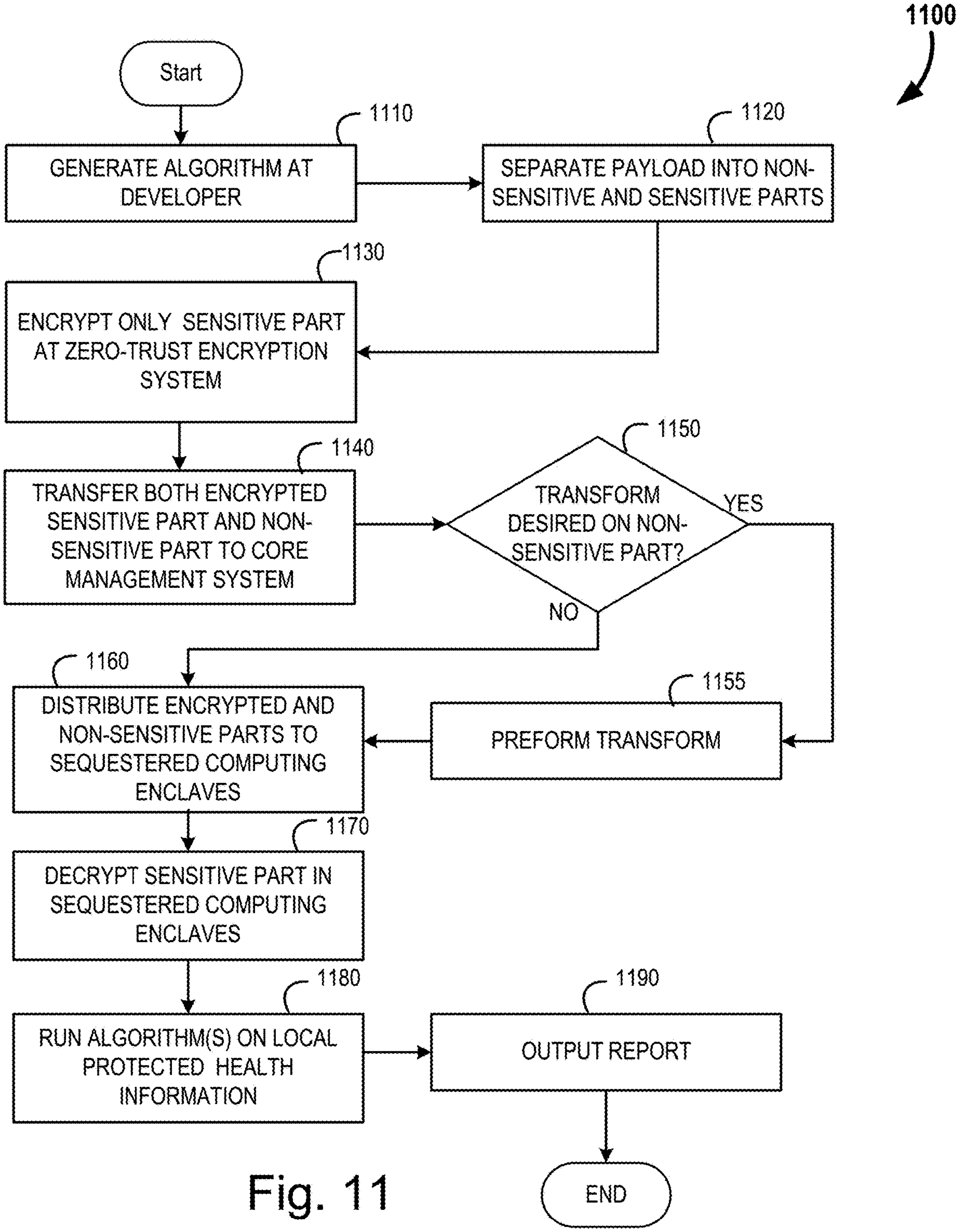
FIG. 11 is a flowchart for an example process of a third model of algorithm encryption and handling, in accordance with some embodiments.

FIG. 11, as seen at 1100, is similar to the prior two figures in many regards. The algorithm is similarly generated at the algorithm developer (at 1110); however, rather than being subject to an encryption step immediately, the algorithm payload may be logically separated into a sensitive portion and a non-sensitive portion (at 1120). To ensure that the algorithm runs properly when it is ultimately decrypted in the (sequestered) sequestered computing enclave, instructions about the order in which computation steps are carried out may be added to the unencrypted portion of the payload.

Subsequently, the sensitive portion is encrypted at the zero-trust encryption system (at 1130), leaving the non-sensitive portion in the clear. Both the encrypted portion and the non-encrypted portion of the payload are transferred to the core management system (at 1140). This transfer may be performed as a single payload, or may be done asynchronously. Again, there is an opportunity at the core management system to perform a modification of the non-sensitive portion of the payload. A query is made if such a modification is desired (at 1150), and if so it is performed (at 1155). Transformations may be similar to those detailed above.

Subsequently, the payload is provided to the sequestered computing node(s) by the core management system (at 1160). Again, as the payload enters the data steward node(s), it is possible to perform modifications to the non-encrypted portion(s). Once in the sequestered computing node, the sensitive portion is decrypted (at 1170), the entire algorithm payload is run (at 1180) against the data that has been provided to the sequestered computing node (either locally or supplied as an encrypted data package). Lastly, the resulting report is outputted to the relevant entities (at 1190).

Any of the above modalities of operation provide the instant zero-trust architecture with the ability to process a data source with an algorithm without the ability for the algorithm developer to have access to the data being processed, the data steward being unable to view the algorithm being used, or the core management system from having access to either the data or the algorithm. This uniquely provides each party the peace of mind that their respective valuable assets are not at risk, and facilitates the ability to easily, and securely, process datasets.

Figure 12:
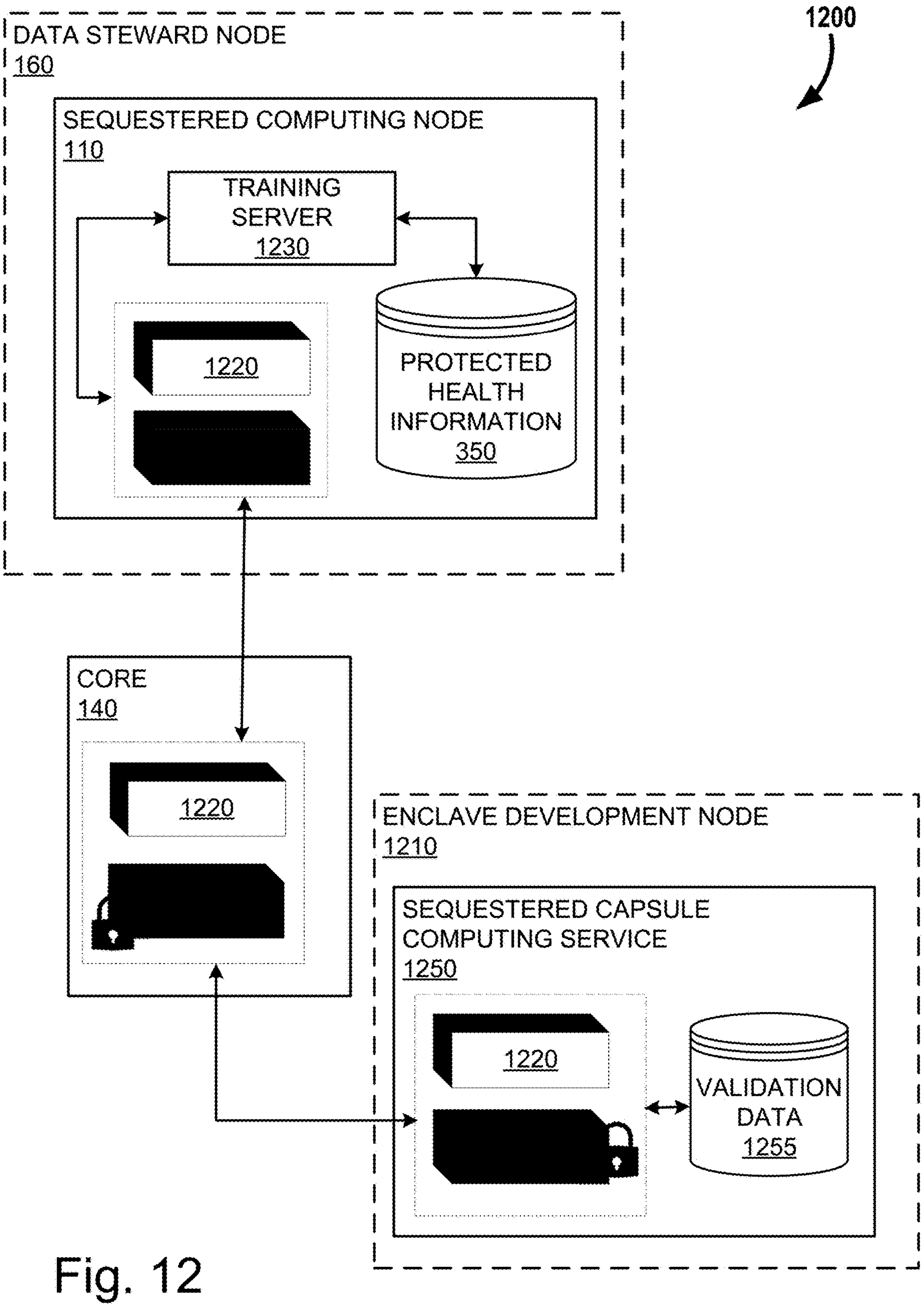
FIG. 12 is an example block diagram showing the training of the model within a zero-trust environment, in accordance with some embodiments.

Turning now to FIG. 12, a system for zero-trust training of algorithms is presented, generally at 1200. Traditionally, algorithm developers require training data to develop and refine their algorithms. Such data is generally not readily available to the algorithm developer due to the nature of how such data is collected, and due to regulatory hurdles. As such, the algorithm developers often need to rely upon other parties (data stewards) to train their algorithms. As with running an algorithm, training the algorithm introduces the potential to expose the algorithm and/or the datasets being used to train it.

In this example system, the nascent algorithm is provided to the sequestered computing node 110 in the data steward node 160. This new, untrained algorithm may be prepared by the algorithm developer (not shown) and provided in the clear to the sequestered computing node 110 as it does not yet contain any sensitive data. The sequestered computing node leverages the locally available protected health information 350, using a training server 1230, to train the algorithm. This generates a sensitive portion of the algorithm 1225 (generally the weights and coefficients of the algorithm), and a non-sensitive portion of the algorithm 1220. As the training is performed within the sequestered computing node 110, the data steward 160 does not have access to the algorithm that is being trained. Once the algorithm is trained, the sensitive portion 1225 of the algorithm is encrypted prior to being released from the sequestered computing enclave 110. This partially encrypted payload is then transferred to the data management core 140, and distributed to a sequestered capsule computing service 1250, operating within an enclave development node 1210. The enclave development node is generally hosted by one or more data stewards.

The sequestered capsule computing node 1250 operates in a similar manner as the sequestered computing node 110 in that once it is "locked" there is no visibility into the inner workings of the sequestered capsule computing node 1250. As such, once the algorithm payload is received, the sequestered capsule computing node 1250 may decrypt the sensitive portion of the algorithm 1225 using a public-private key methodology. The sequestered capsule computing node 1250 also has access to validation data 1255. The algorithm is run against the validation data, and the output is compared against a set of expected results. If the results substantially match, it indicates that the algorithm is properly trained, if the results do not match, then additional training may be required.

Figure 13:
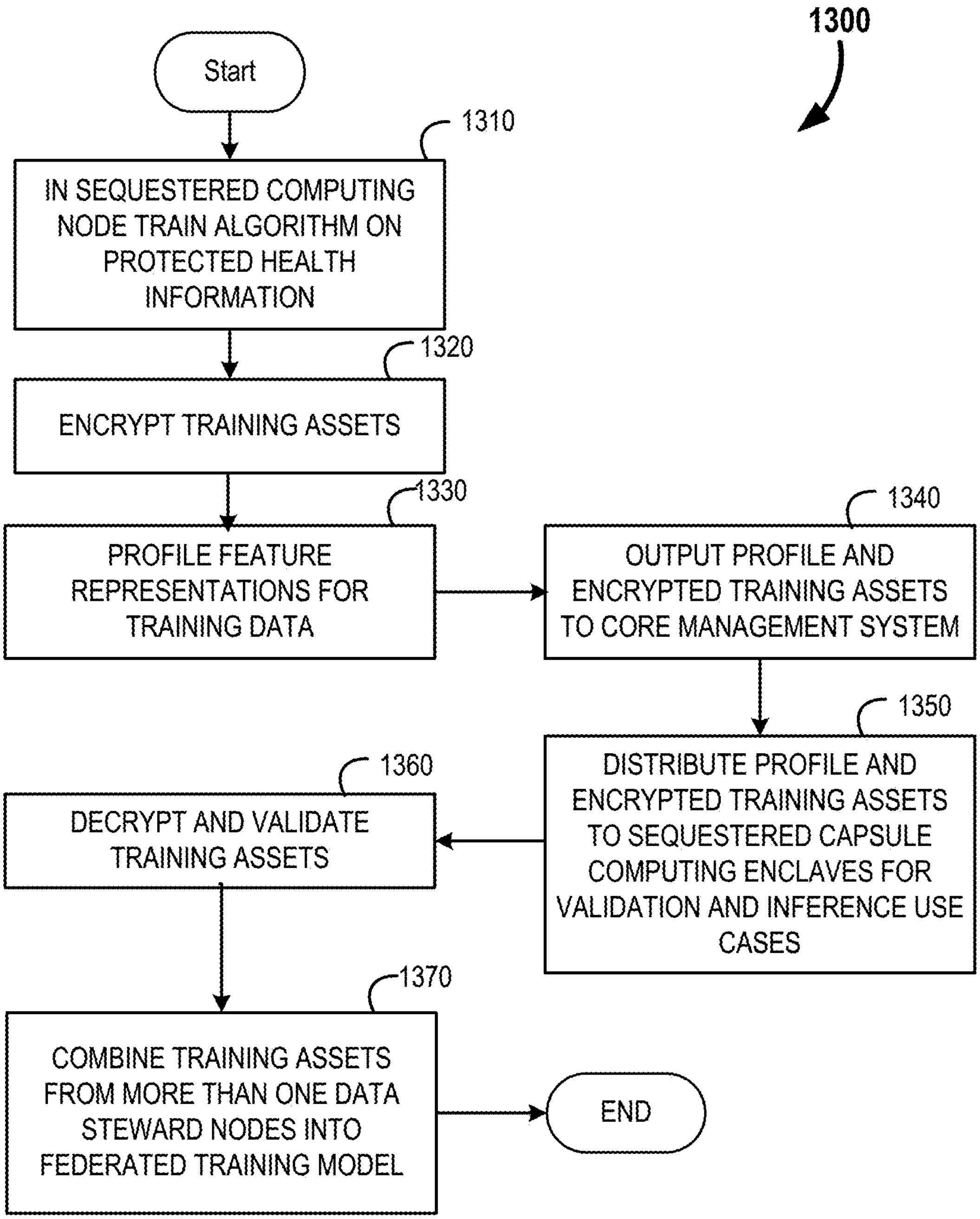
FIG. 13 is a flowchart for an example process of training of the model within a zero-trust environment, in accordance with some embodiments.

FIG. 13 provides the process flow, at 1300, for this training methodology. In the sequestered computing node, the algorithm is initially trained (at 1310). The training assets (sensitive portions of the algorithm) are encrypted within the sequestered computing node (at 1320). Subsequently the feature representations for the training data are profiled (at 1330). One example of a profiling methodology would be to take the activations of the certain AI model layers for samples in both the training and test set, and see if another model can be trained to recognize which activations came from which dataset. These feature representations are non-sensitive, and are thus not encrypted. The profile and the encrypted data assets are then output to the core management system (at 1340) and are distributed to one or more sequestered capsule computing enclaves (at 1350). At the sequestered capsule computing node, the training assets are decrypted and validated (at 1360). After validation the training assets from more than one data steward node are combined into a single featured training model (at 1370). This is known as federated training.

Figure 14:
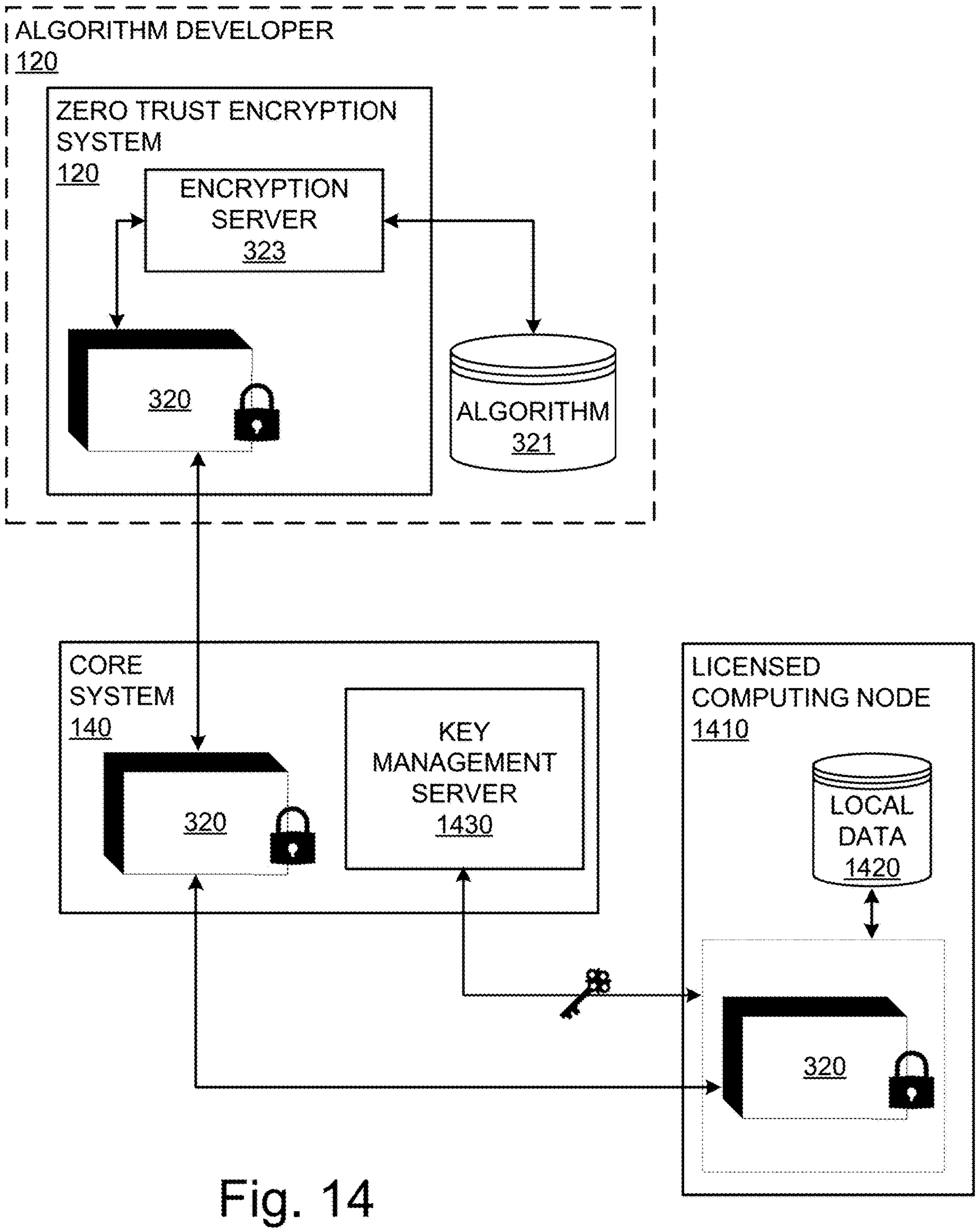
FIG. 14 is an example block diagram showing the key management for the running of an algorithm on a computing capsule within a semi-trust environment, in accordance with some embodiments.

Turning now to FIG. 14, a semi-trust computing architecture is provided, shown generally at 1300. Unlike a zero-trust system, in this example the core management system 140 operates not only as the distributer of the algorithm payloads, but also acts as a key management system. Thus, theoretically, the core management system 140 could decrypt the algorithm as it is provided. Thus, a certain level of trust is required between the algorithm developer 120 and the core management system 140. As such, it may be advantageous, in some particular embodiments, to have the core management system be hosted by the algorithm developer, or have the algorithm developer act as the key management system directly.

Regardless, in the instant embodiment, the algorithm developer's algorithm 321 is provided to the encryption server 323 to generate an encrypted payload 320. Here the entire payload is encrypted, however, as previously discussed, in alternate embodiments only a certain layer of the payload needs to be encrypted, or the payload may be separated into sensitive and non-sensitive portions and only specific portions are therefore encrypted. Regardless of method employed, the payload is provided to the core management system 140, which distributes the payload to licensed computing nodes 1410. These local nodes may include low processing powered devices that contain only local data sets. Examples of these local computing nodes may include devices such as EKG machines, dialysis machines, and other peripheral medical devices. Outside of the medical field, devices may include ATMs, smart home appliances, autonomous vehicles, or any other networked device that includes local datasets that need processing.

In addition to receiving the encrypted packet, the core management system includes a key management server 1430, which provides a key to the licensed computing node 1410 to decrypt the algorithm 320 and process local data 1420. In some embodiments, certain devices may be pre-provisioned with a key, thereby allowing the algorithm payload to be distributed without the need for a key management server by the core management system 140. This allows for deployment of the payload even when the core management system 140 cannot be contacted directly to obtain decryption keys or to confirm license validity, for example if the local environment does not have a reliable Internet connection. In some embodiments, license data may be stored on the blockchain to allow additional computing models.

Figure 15:
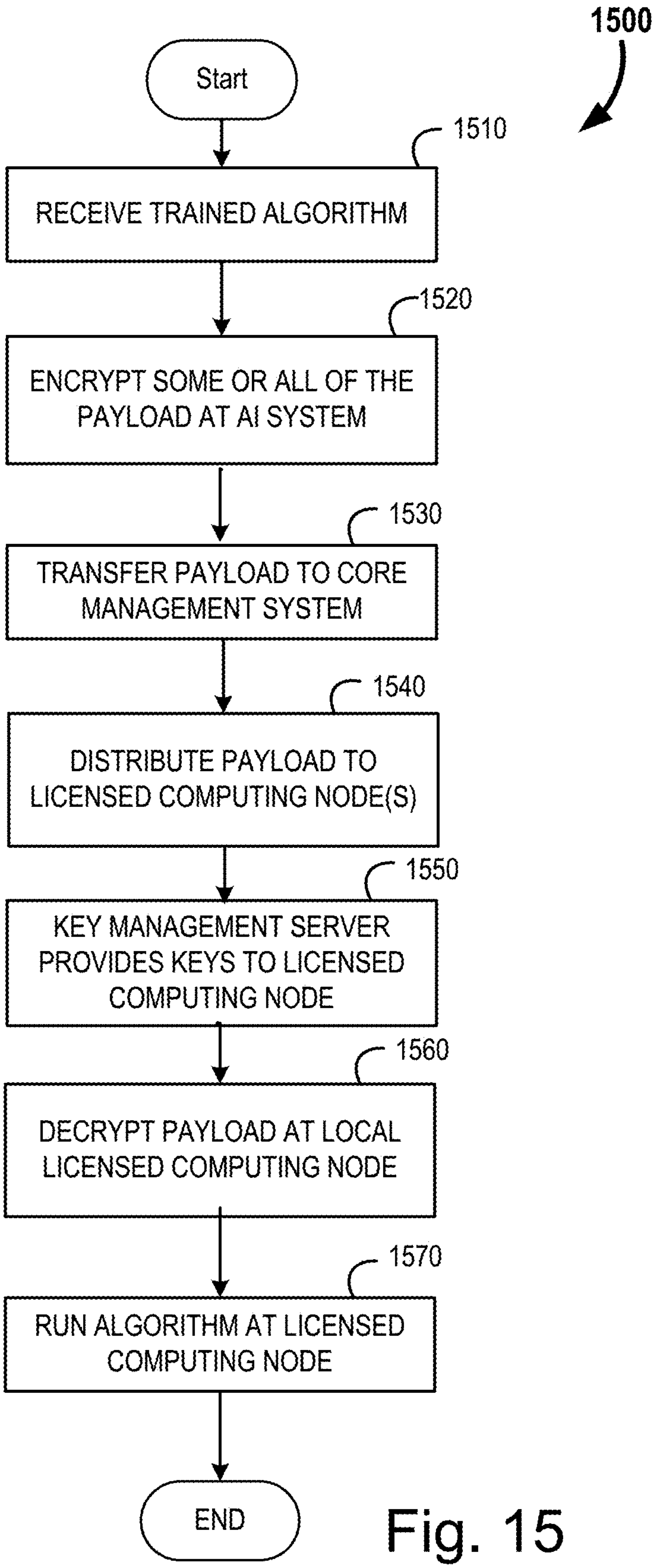
FIG. 15 is a flowchart for an example process of key management for the running of an algorithm on a computing capsule within a semi-trust environment, in accordance with some embodiments.

FIG. 15, in turn, provides an example process for deploying and running algorithms on licensed computing nodes, shown generally at 1500. In this example process, the trained algorithm is first received/generated by the algorithm developer (at 1510). This algorithm is encrypted in whole or in part (at 1520) in the zero-trust encryption node. The payload is provided to the core management system (at 1530), which then distributes it to one or more licensed computing nodes (at 1540). The key management server within the core management system provides the necessary keys to the appropriate licensed computing node(s) (at 1550). The licensed computing node(s) leverage the keys to decrypt the payload (at 1560), and run the algorithm on locally available data (at 1570).

Figure 16:
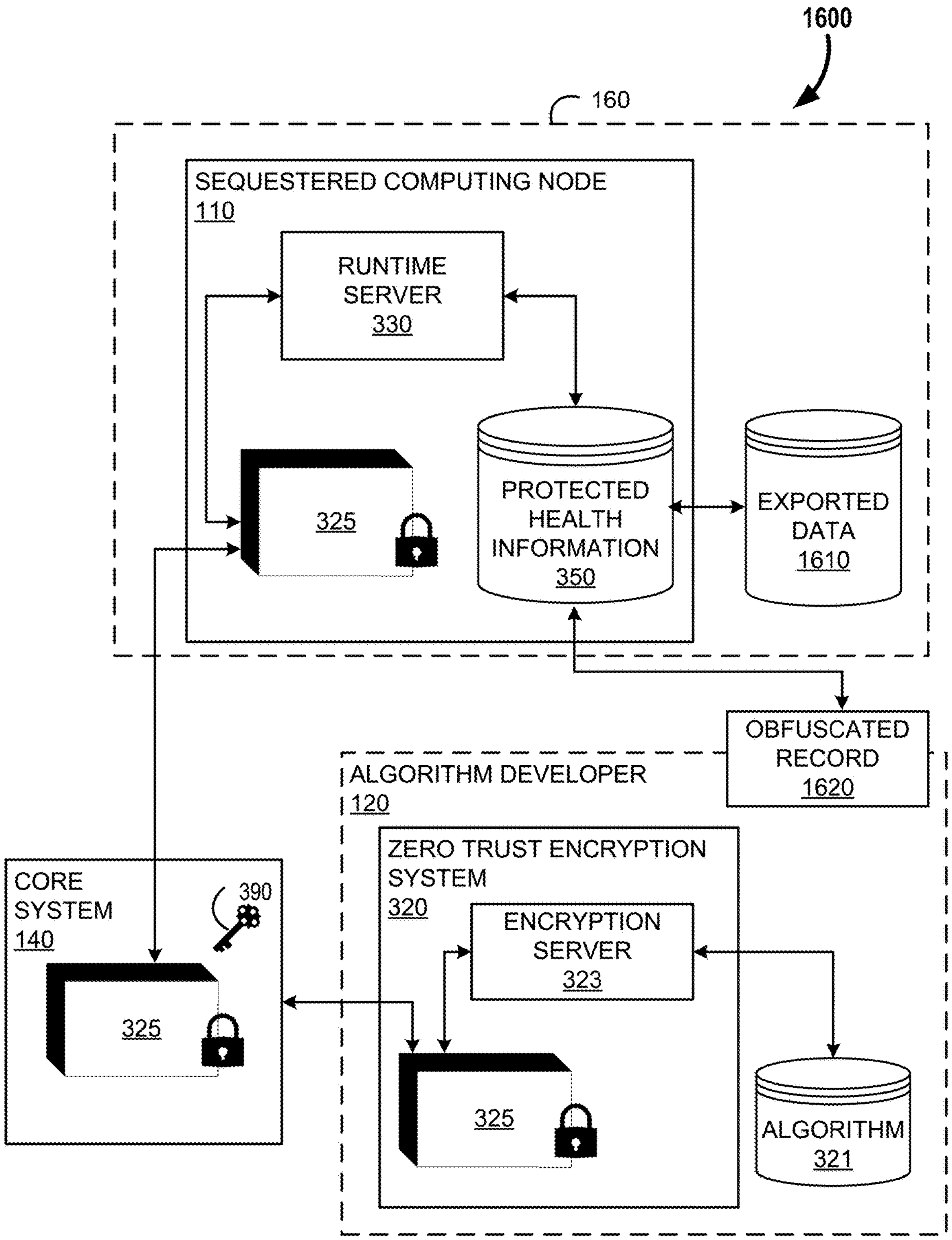
FIG. 16 is an example block diagram showing the running of an algorithm within a zero-trust environment with data reporting obfuscation, in accordance with some embodiments.

FIG. 16 provides an example diagram for the outputting of differential reports based upon audience privileges is provided, shown generally at 1600. In this example diagram, in a manner consistent with the previously described processing of datasets in a zero-trust environment, the algorithm developer 120 provides their algorithm 321 to an encryption server 323 within the zero-trust encryption system 320. This results in an encrypted payload 325. While the entire payload is illustrated as being encrypted, consistent with the various described it is possible that only portions of the algorithm may be encrypted. However, for the sake of brevity and clarity, only embodiments where the entire algorithm payloads are encrypted are illustrated.

The encrypted payload 325 is provided to the core management system 140, which also manages keys 390. The core management system 140 is unable to access and decrypt the payload 325. The core management system 140 manages the deployment of the payload to a proper data steward 160 for processing on their protected health information 350. The payload is provided to a sequestered computing node 110 within the data steward. Only when the payload is within the sequestered computing node 110 is it able to be decrypted. The data steward 160 is unable to access assets within the sequestered computing node 110, therefore the algorithm can be decrypted and used to process the protected information, for example PHI, without the data steward being able to access the algorithm.

The runtime server 330 processes the protected health information 350 using the decrypted algorithm, which is then purged from the sequestered computing node 110 after completed. The result of the processing of the protected information is output as exported data 1610, which is fully identifiable results. Additionally, obfuscated records 1620, which have the identifying information, and any other protected in formation, hashed is provided back to the algorithm developer 120. These obfuscated records 1620 are leveraged by the algorithm developer to validate the algorithm operation. A mapping between original record ID and the obfuscated ID may be held by the data steward or other permitted stakeholder (e.g. a regulatory agency) so that significant results that have been reported to the algorithm developer can be matched to actual records, enabling further action or inquiry to be undertaken.

Figure 17:
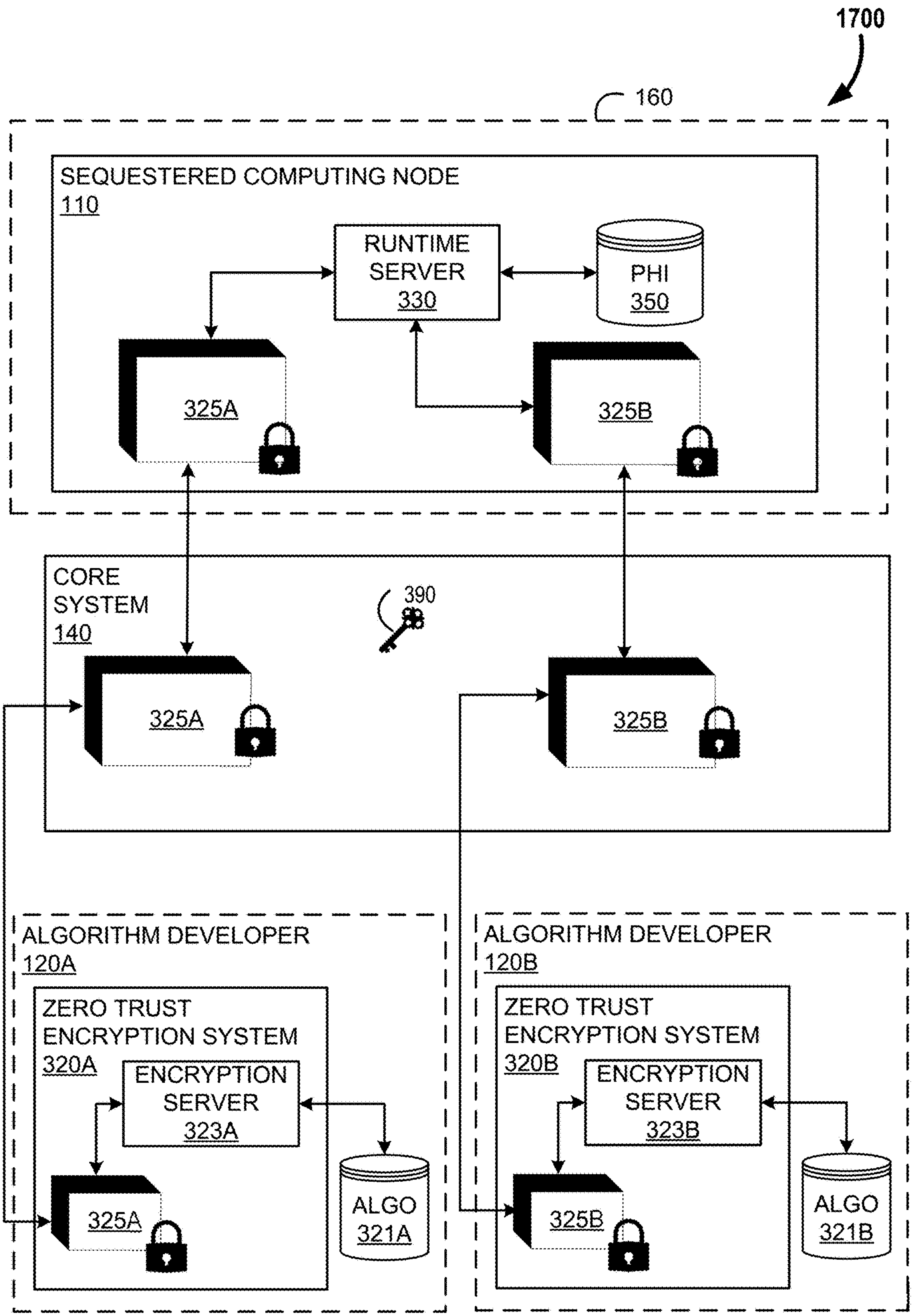
FIG. 17 is an example block diagram showing the dual algorithm operation on a single dataset within a zero-trust environment, in accordance with some embodiments.

Turning to FIG. 17, the processing of datasets with multiple algorithms is provided, shown generally at 1700.

Similar to other disclosed systems, the algorithms 321A and 321B are encrypted by their respective encryption servers 323A and 323B within their respective algorithm developer's 120A and 120B zero-encryption systems 320A and 320B, respectively. Again, in this example diagram the entire algorithms 321A and 321B are shown as being encrypted 325A and 325B, respectively. However, it is within the scope of the disclosure that the alternate encryption techniques (portion encryption and bifurcation and segment encryption) are considered.

The core management system 140 received the multiple encrypted algorithms 235A and 325B. These algorithm packets are provided (again, in an encrypted and inaccessible format) to the data steward 160. When in the sequestered computing node 110, these algorithms may be decrypted and used by the runtime server 330 to process the protected health information 350. In some embodiments, the protected information, for example PHI, may be processed by the first algorithm 325A and in parallel by the second algorithm 325B. The results from these parallel processing may be compared to one another to validate findings, or otherwise achieve some computational advantage. For example, in many situations the outputs of multiple algorithms can be combined to create a stronger statistical signal (and therefore more accurate or useful results) than any single algorithm. For example, the first algorithm may process the protected information to yield a first result, and a second model renders a second result. These results may be combined to classify the results (e.g., a weighted sum of the algorithm results, or combining classification results independently). From a privacy and security perspective, the ability to combine signals within a secure encapsulated computing environment allows the creation of such ensemble results without the requirement to publish the individual intermediate results.

In alternate systems, the protected information may be processed by the first algorithm 325A, and the output of this processing may be a new dataset for processing by the second algorithm 325B. This is a particularly powerful technique in that the ability to share datasets between the two algorithm developers, which is required in traditional processing, requires a significant degree of trust between the parties (including significant contractual arrangements). This is particularly problematic in that the algorithm developers 120A and 120B are potentially direct competitors.

The output of this serial processing of protected information allows for the creation of advanced analytics pipelines on private data while protecting the intellectual property (IP) of all pipeline algorithmic components. For cases in which the output of any of the component algorithms is restricted for reasons of IP protection or privacy, a serial pipeline computed entirely within an encapsulated computing environment is advantageous. For example, a first algorithm might identify individuals, objects, or activities within image data and a second could compute on a combination of these outputs and other data within the enclave. It is easy to see that if the identities of individuals within these images needed to be protected, it would be preferable to run this serial pipeline entirely within an enclave.

Figure 18:
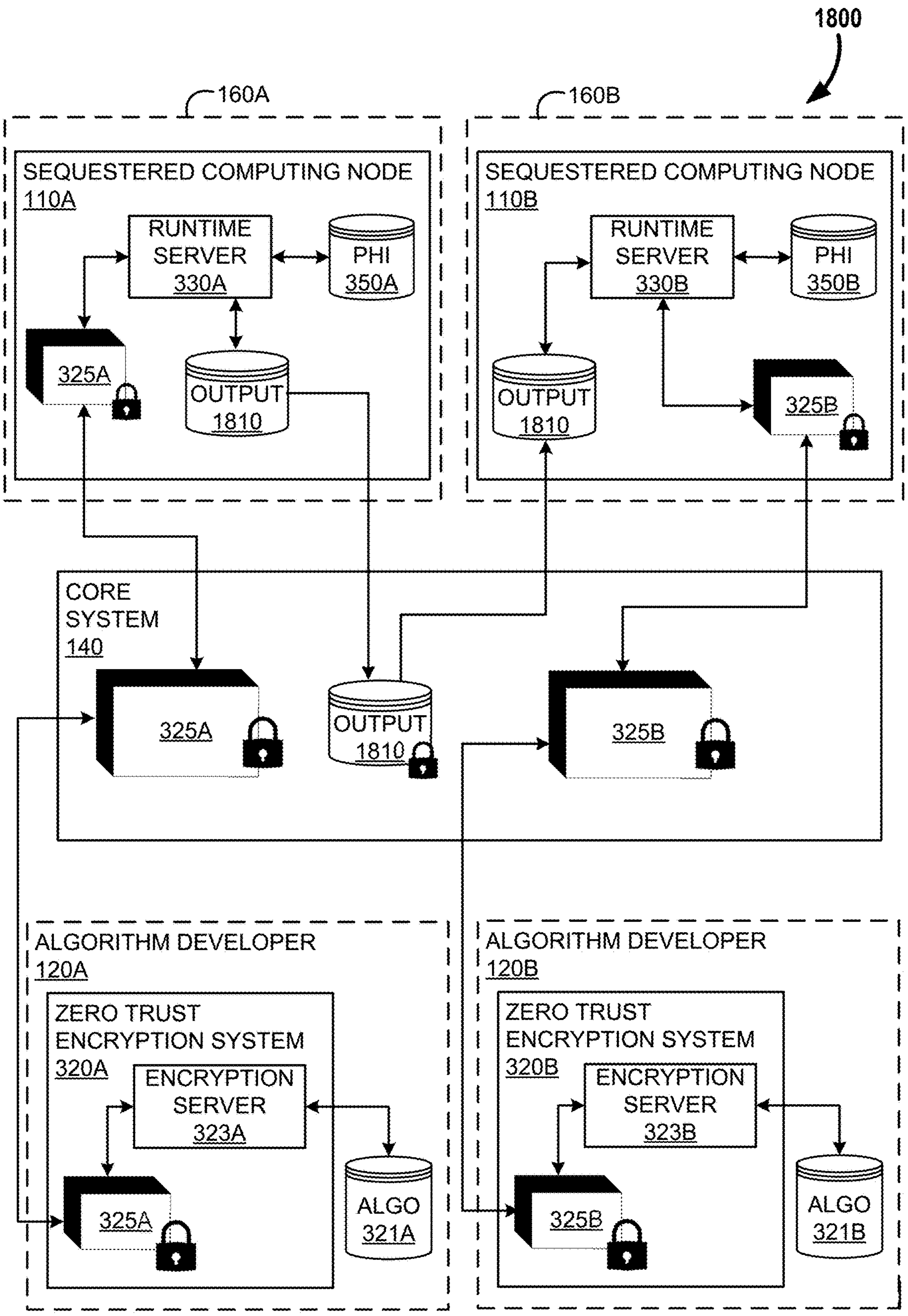
FIG. 18 is an example block diagram showing the chained running of algorithms on sets of data within multiple zero-trust environments, in accordance with some embodiments.

Turning now to FIG. 18, another example process for complex processing of different protected information, for example PHI, datasets by various algorithms is provided, shown generally at 1800. As with FIG. 17, the algorithms 321A and 321B are encrypted by their respective encryption servers 323A and 323B within their respective algorithm developers' 120A and 120B zero-encryption systems 320A and 320B, respectively. Again, in this example diagram the entire algorithms 321A and 321B are shown as being encrypted 325A and 325B, respectively.

These encrypted algorithms 325A and 325B are sent to the core management system 140 for routing to the proper data stewards. In this example system, the first algorithm 325A is provided to a first data steward 160A. The encrypted packet 325A is encapsulated in the sequestered computing node 110A, which is then decrypted and used by the runtime server 330A to process the protected health information 350A belonging to this first data steward 160A. This processing generates an output 1810. The output is encrypted within the data steward 160A environment and is then sent to the core management system 140 for routing. As with the algorithm payloads, these encrypted output reports 1810 are inaccessible to the core management system 140, therefore ensuring end-to-end protection of all sensitive data. This output data is then provided to the sequestered computing node 110B of a second data steward 160B. The output data is able to be decrypted only within the sequestered computing node 110B thereby ensuring the content of the output 1810 is not accessible by the second data steward 160B.

Within the sequestered computing node 110B, the output data 1810 may be processed along with protected information 350B of the second data steward 160B, using the runtime server 330B by the second algorithm 325B. In some embodiment, the output data may alter the second set of protected information 350B (or vice versa), and this modified dataset is used by the algorithm 325B for generating a final output. In alternate embodiments, the second algorithm 325B may consume the output dataset 1810 and the second set of protected health information 350B independently in order to generate a final output. The first methodology could be used to extract features from unstructured data in a dataset and then combine those features with other data in the data set to generate an output (for example a prediction or class determination). This type of pipeline is used often in healthcare applications in which the source data, such as clinical notes, are not necessarily represented in an ideal format for the second algorithm to operate on them. The second methodology could be used to create an ensemble classifier from multiple other algorithms, thus increasing the statistical strength of the output. This approach could also be used to simply compare the outputs of two algorithms that are designed to answer the same question.

Figure 19:
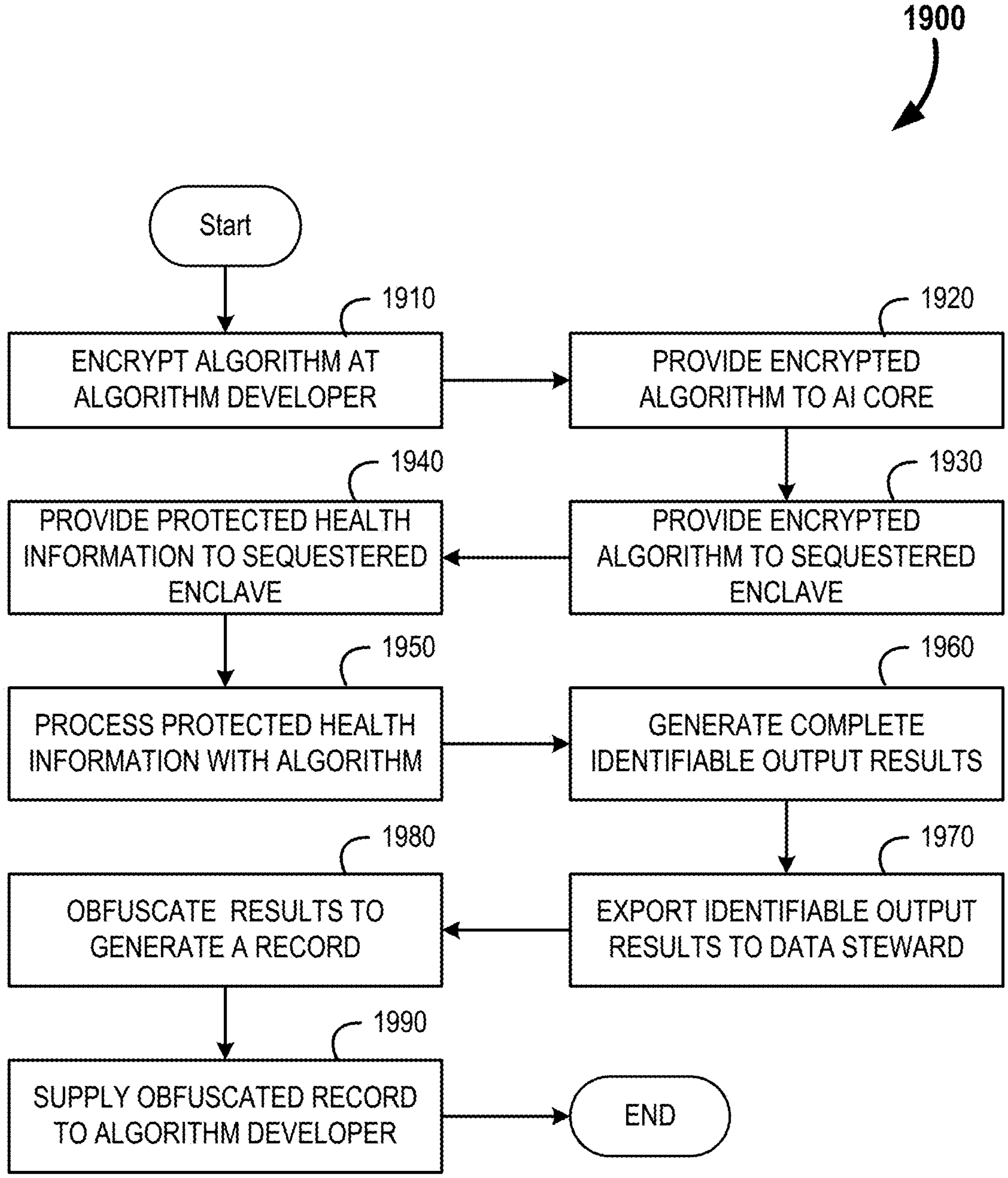
FIG. 19 is a flow diagram for the example process of running of an algorithm within a zero-trust environment with data reporting obfuscation, in accordance with some embodiments.

Turning now to FIG. 19, the process of generating obfuscated records for algorithm validation is provided, shown generally at 1900. In this example process an algorithm is encrypted at the location of the algorithm developer (at 1910). Again, this encryption may be for the entire payload, or may only be for sensitive algorithm elements (weights for example). The encrypted payload is provided to the core management system (at 1920), which then provides it to a sequestered enclave at a data steward (at 1930). Within the sequestered computing node, the encrypted payload is able to be decrypted, allowing the algorithm to be leveraged. The data steward also provides protected information to the sequestered enclave (at 1940).

The protected information is then processed by a runtime server using the algorithm (at 1950). This results in a new dataset being created (at 1960). The dataset includes identifying information (and possibly other sensitive patient information). This identifiable dataset is then exported, in its raw form, to the data steward (at 1970). However, the dataset may be additionally processed to generate an obfuscated record (at 1980). In this dataset, the identifying information is first hashed. Subsequently the entire record is encrypted for transfer of the obfuscated record back to the algorithm developer (at 1990). This record can be decrypted at the algorithm developer, however, the hashed identification information is unable to be accessed by the algorithm developer. The obfuscated record may be used by the algorithm developer to validate the algorithm, or for other analytics.

Figure 20:
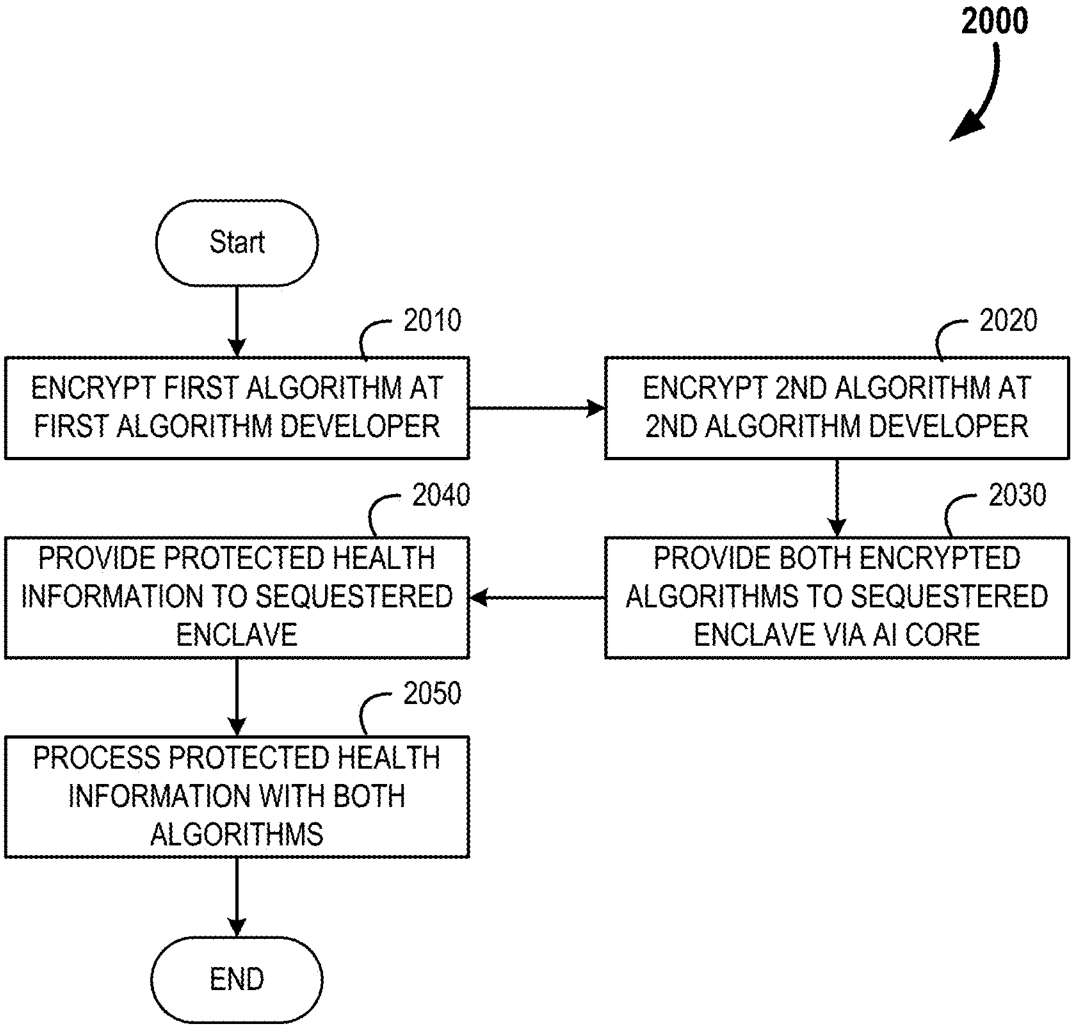
FIG. 20 is a flow diagram for the example process of dual algorithm operation on a single dataset within a zero-trust environment, in accordance with some embodiments.

FIG. 20 illustrates an example process for multi-algorithm processing of protected information within a single data steward, shown generally at 2000. As with other embodiments, the first steps of this process includes the encryption of algorithms at the first and second algorithm developers (at 2010 and 2020, respectively). These encrypted algorithms are provided to the core management system, which then provides both algorithms to a single data steward, and in particular to the sequestered computing node where the encrypted algorithms are able to be decrypted (at 2030).

The data steward also provides the protected information in their care to the sequestered enclave (at 2040). This protected information is then processed (at 2050) by both algorithms, either individually in parallel, or as a serial processing, where the output of one algorithm's processing is the input into the second algorithm.

Figure 21:
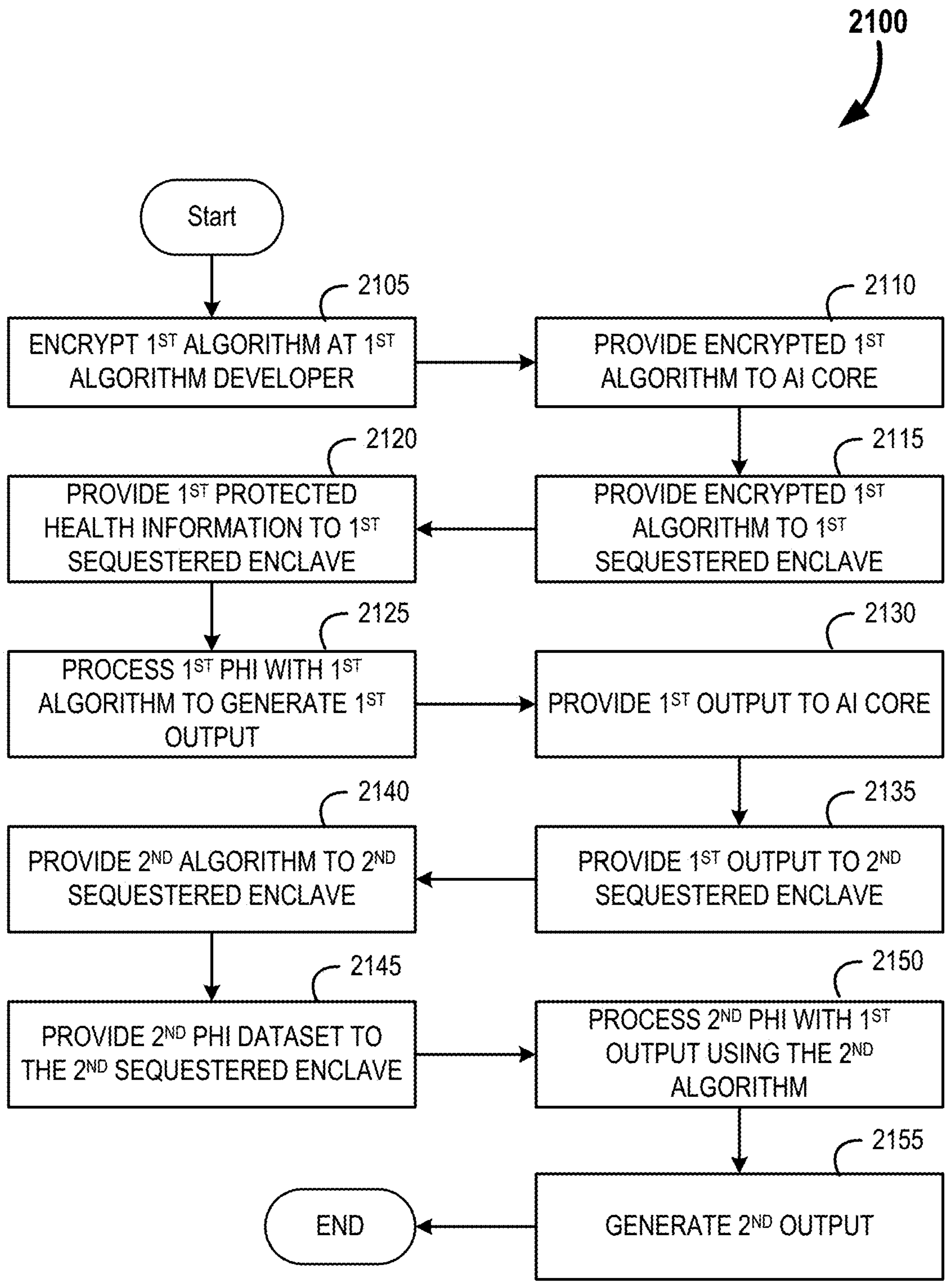
FIG. 21 is a flow diagram for the example process of chained running of algorithms on sets of data within multiple zero-trust environments, in accordance with some embodiments.

Turning to FIG. 21, an example process for multi algorithm on multiple datasets are provided, shown generally at 2100. In this example process a first algorithm is initially developed and then encrypted by an algorithm developer (at 2105). The encrypted algorithm is provided to the AI core management system (at 2110), which is then provided to a first data steward's sequestered enclave (at 2115).

The data steward provides their protected information to the sequestered computing node as well (at 2120). Once the algorithm is decrypted, the algorithms may process the protected information that is made available from the data steward (at 2125). This processing results in the generation of a first output. This output has identifiable information as well as report results. The identifiable information may be hashed, and subsequently the entire output is encrypted. The encrypted output is sent to the core management system (at 2130) and then subsequently routed to a second sequestered enclave that is present at a second data steward (at 2135).

A second algorithm, generated by a second algorithm developer and encrypted, is then transferred to this second sequestered enclave via the core management system (at 2140). Protected health information of this second data steward is also provided to the secured enclave (at 2145). At this stage, the sequestered computing node has access to the second algorithm, protected information from the second data steward, and the output of the first algorithm working upon the protected information from the first data steward. This second algorithm is then decrypted, and used to process both the output and the second set of protected information (at 2150). This results in the generation of a second output (at 2155) which may provide new insights that are unavailable from any one set of protected information.

Figure 22:
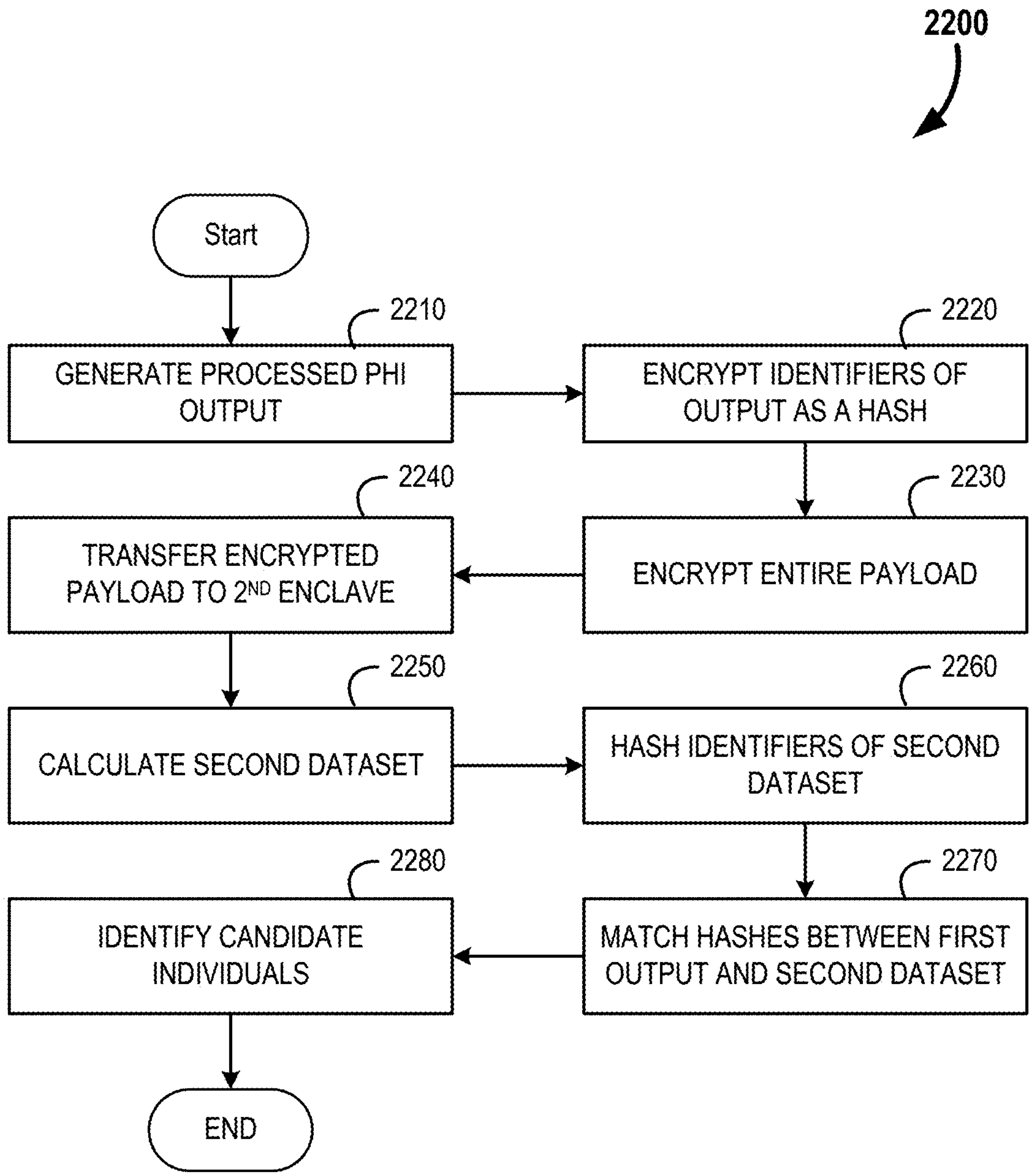
FIG. 22 is a flow diagram for the example process of linking of multiple processed datasets within multiple zero-trust environments, in accordance with some embodiments.

Turning now to FIG. 22, a system for matching outputs between differing processed protected information is disclosed, shown generally at 2200. In this example process, an algorithm is used to process the protected information of a first data steward in any manner previously disclosed (at 2210). The identifying N-fields of the processed dataset are then normalized, and then hashed (at 2220). The identifying information is generally a set of fields, each field containing a different identifier. For example, there may be fields for birthdate, name, social security number, weight, height, Medical Record Number (MRN), patient ID, and the like. Normalization may depend upon the field. For example, birthdate may be placed in a specific format, such as MM/DD/YYYY. Likewise, MRN may have all characters lowercased, and all spaces removed from the token string, for example.

Once all the fields are normalized, the hash is generated by encrypting these identifying fields, and then the entire payload is also encrypted (at 2230) so that anyone intercepting the output is unable to access the data contained therein. The encrypted payload is then transferred, via the core management system, to a second sequestered computing node (at 2250). A second dataset is calculated within the second enclave (at 2250). This may include the same algorithm operating on a different protected information (for example PHI) dataset, or an entirely different algorithm operating on the same or different protected information dataset. Regardless, the output from this second operation may also have the identifier fields hashed (at 2260) to prevent others from having access to the sensitive identification data.

The next step is to match records by individual between the first outputted dataset and the second outputted dataset (at 2270). There are at least two methods disclosed herein to enable matching of dataset hashes, as will be discussed in relation to FIGS. 23A and 23B, respectively. After the hashes are matched, the individual candidates can be identified (at 2280). This method allows the serial application of complementary algorithms on distinct, private datasets, neither of which is visible to the one or more algorithm owners, applied at to the matched records. The applications of this are numerous: For example, an insurance company's data might be processed by a first algorithm to create a vector of features for each patient in the data set (diagnoses, history of procedures, costs, etc.). This data set might be indexed by a patient ID (ID-A) that is unique to the payor and can't be directly matched with patient IDs in other datasets. This ID-A would be encrypted (distance preserving hash, homomorphic encrypted, etc.) along with the output vector. A second algorithm would operate on a second data set, for example from a healthcare provider system, combining the first results with the second data set to generate a new result set. In some embodiments, the hashes might be matched before the second computation is performed. In other embodiments, the two sets of data vectors are combined as an outer product (possible reduced in size by partial matching). All possible results are tabulated and the reduction to correctly matched patient records is performed outside the enclave. (It is recognized that an outer multiplication might result in a large resultant dataset, but there are many applications in which this would not be a significant constraint). This pattern would also apply to a banking use case in which features from one or more transactions in one or more banks are extracted by a first algorithm, and combined with a regulator's, or other central watchdog's, data to compute with a second algorithm to detect fraudulent or suspicious transactions.

Figure 23A:
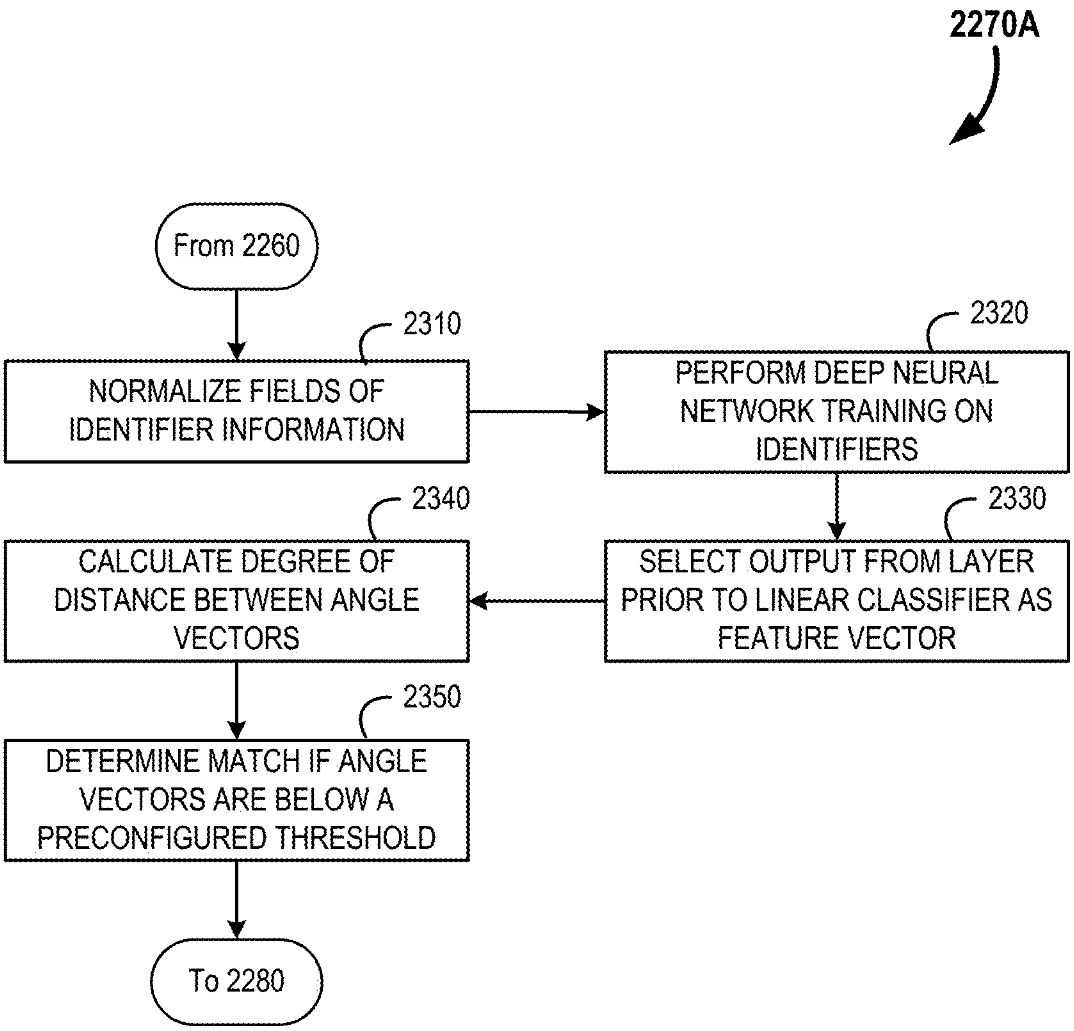
FIGS. 23A and 23B are flow diagrams showing two alternate example processes of matching identifying information between datasets, in accordance with some embodiments.
Figure 23B:
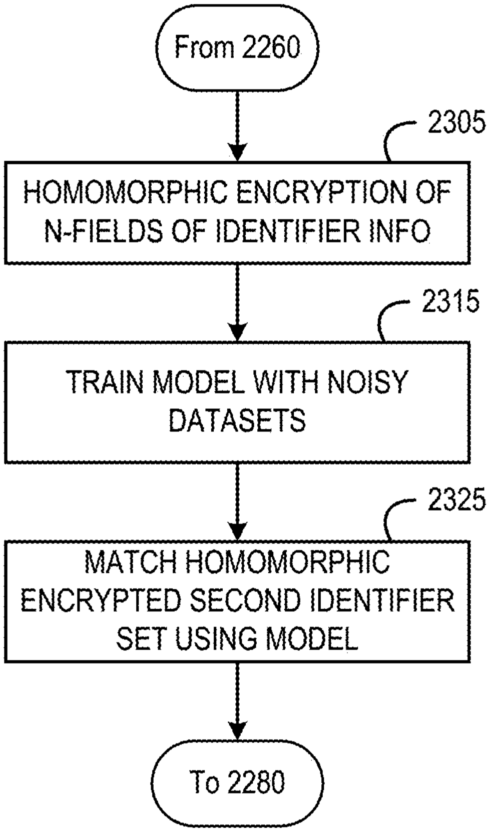

Turning now to FIGS. 23A and 23B, two methods for matching individual identifying hashes are provided, shown generally at 2270A and 2270B respectively. As the identifying information is hashed by each data steward, the other party cannot disambiguate the data in order to link up output results contained in the report with any given patient. As such, data can be more readily transferred without the need for extensive confidentiality agreements and protections. However, there is great value in being able to link up records, as exemplified above.

In FIG. 23A, the identifier information fields on a training set of data are normalized (at 2310), in the same manner as previously described. This allows for training of a deep neural network AI model (at 2320). This model generally provides a binary output on if two normalized sets of hashed data are the same or not. In such a model the last layer is generally a linear classifier. The output from the layer just before the linear classifier may be leveraged in this process. This output is a set of feature vectors. These feature vectors generated from the model operating on a hash of identifiers is selected for each output dataset (at 2330). Any two-feature vector sets from one dataset compared to the other dataset are then compared, and the degree of distance between the angle of the vectors is calculated (at 2340). This degree of angle distance indicates how closely the two hashes are toward one another. Therefore, if the cosine angle distance between the two vectors is below a preconfigured threshold, the system may determine there is a match between the two given hashes (at 2350). The preconfigured threshold may be modified or computed based on the desired properties of the output (for example, an application intended to find the most complete list of candidates for a therapy might tolerate more false positives and therefore use a lower threshold, while a public health screening strategy would desire to minimize costs by using a higher threshold with fewer false positives, but potentially missing some true positives).

In contrast, the method of FIG. 23B relies upon homomorphic encryption. In this example process, the N identification fields of the given record are homomorphically encrypted (at 2305). A machine learning model is then trained using a noisy dataset (e.g., a dataset with erroneous and missing fields of data) to compare and identify matching homomorphically encrypted hashes (at 2315). After being fully trained, the model may be used to match the hashes of one dataset to those of a second dataset (at 2325).

Regardless of method employed, the ability to match individual patients within two datasets allows different data stewards to combine, compare and contrast their processed data without revealing to any other party the identity of their patients. This allows compliance with regulations, such as HIPAA, while allowing for unprecedented analytics with disparate parties.

Moving forward, all of the above systems and methods of zero-trust computing are only as useful as the data sets and algorithms being employed. In this kind of data processing, the old adage of "garbage-in, garbage-out" is entirely accurate. As such, there is a strong need for the ability to verify and validate both the data being employed, and the algorithm operation. To this end, the core management system may generate a host of tools that address these very concerns. The core management system may then disseminate these tools to the data stewards 160 for employing. Technically, by introducing tooling from another party into the data steward's system, there is a level of trust required between the core management system and the data steward. As such, when these tools are employed, the system isn't technically "zero-trust" but rather an extremely limited trust system. However, for the functionalities these tools provide a data steward, this level of trust is typically warranted. After all, and software that touches the data sets (such as the database management software) is a potential risk (albeit minimal).

Figure 24A:
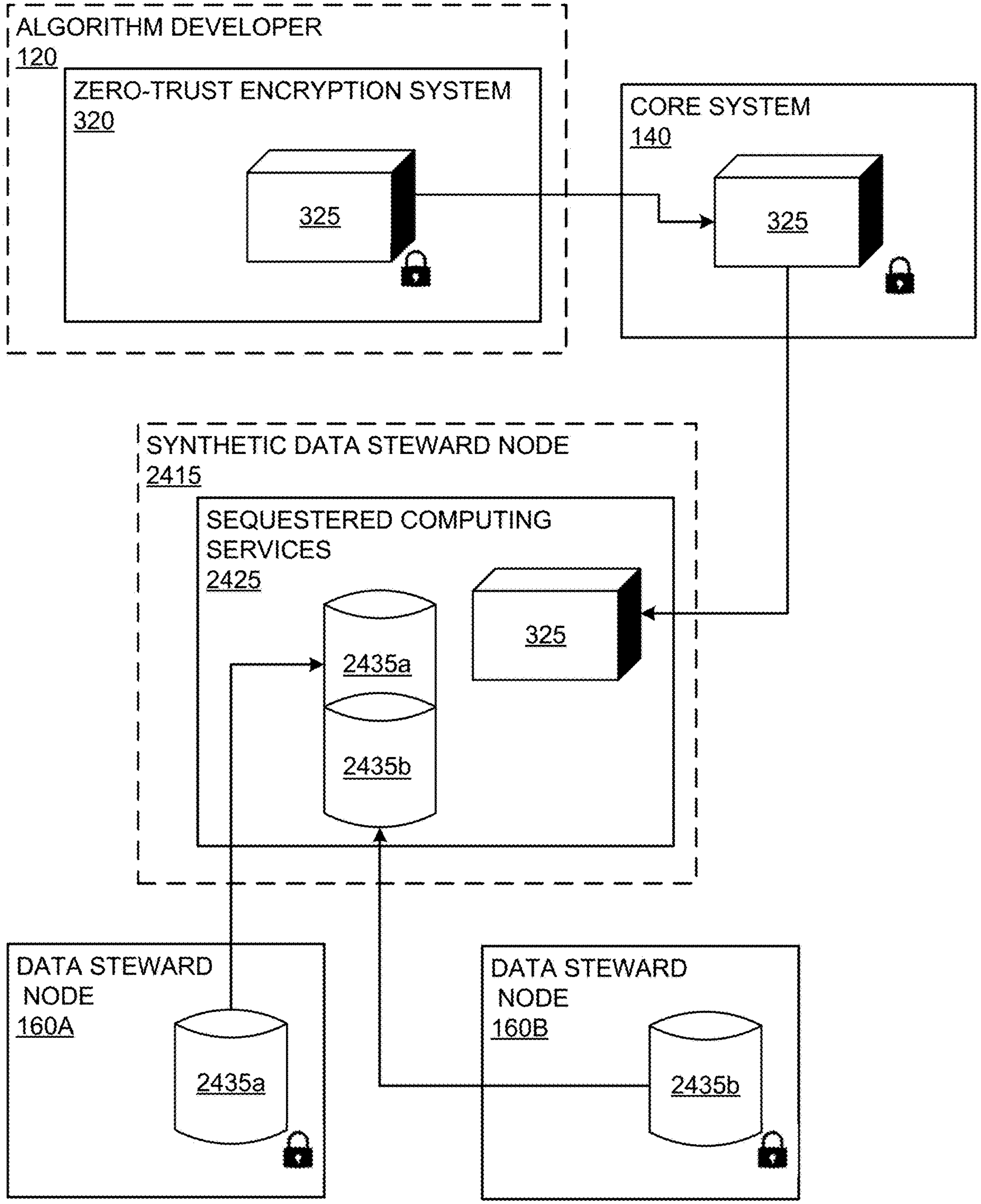
FIGS. 24A and 24B are block diagrams for the environment for consolidated data processing leveraging a synthetic data steward node, in accordance with some embodiments.

FIG. 24A provides a block diagram for the system for creation of a "synthetic data steward" with the ability to combine data from different sources longitudinally (e.g., a single record in the computation by the algorithm being constructed from data originating from multiple data sources) as a final data set. Unlike other systems disclosed already, this example system relaxes the constraint that the sensitive data 2435*a-b* never leaves the infrastructure of a given data steward 160A-B. However, all other security constraints remain intact. This includes the fact that the sensitive data 2435*a-b* is never 'seen' by any counterparty, that the algorithm 325 is never 'seen' by any other counterparty, and that the sensitive data 2435*a-b* does not need to be de-identified or otherwise modified before computations are performed on it. By 'seen' it means that any of the underlying data/code is available to the party in-the-clear as opposed to in an encrypted state.

In this example system, the algorithm developer 120 generates an algorithm 325 which is then encrypted and shared with the core management system 140. This package remains encrypted and is provided to the synthetic data steward node 2415. Each data steward node 160A-B contributes a different portion of the sensitive data required by the algorithm developer's 120 data specification. This specification outlines the kinds/quality/amount of data required for the algorithm 325 to operate successfully. The union of the data from the various data stewards 160A-B satisfies this specification requirement, thereby allowing the algorithm 325 to successfully operate on the amalgamated data set (seen as the conjoined 2435*a* and 2435*b* dataset within the sequestered computing service 2425) located in the synthetic data steward node 2415. It should be noted that two data stewards 160A and 160B are illustrated in this example figure. In reality, any number of data stewards 160A-B may be providing sensitive data 2435*a-b* to the synthetic data steward node 2415 for generating an amalgamated final data set.

Sensitive data 2435*a-b* that is shared with the synthetic data steward node 2415 may be subject to any manner of transforms in order to get the data into a standardized format prior to operation with the algorithm 325. A secure computing enclave known as the sequestered computing service 2425 operating within the synthetic data steward node 2415 is able to decrypt the algorithm 325, and the individual data sets 2435*a-b*, and allows the operation of the algorithm 325 on this amalgamated final data set 2435*a-b*' to generate a consolidated output. This output may then be encrypted, when desired, and shared with any number of stakeholders. These stakeholders may include the algorithm developer 120, the data steward(s) 160A-B, regulatory bodies, researchers, and the like.

Figure 24B:
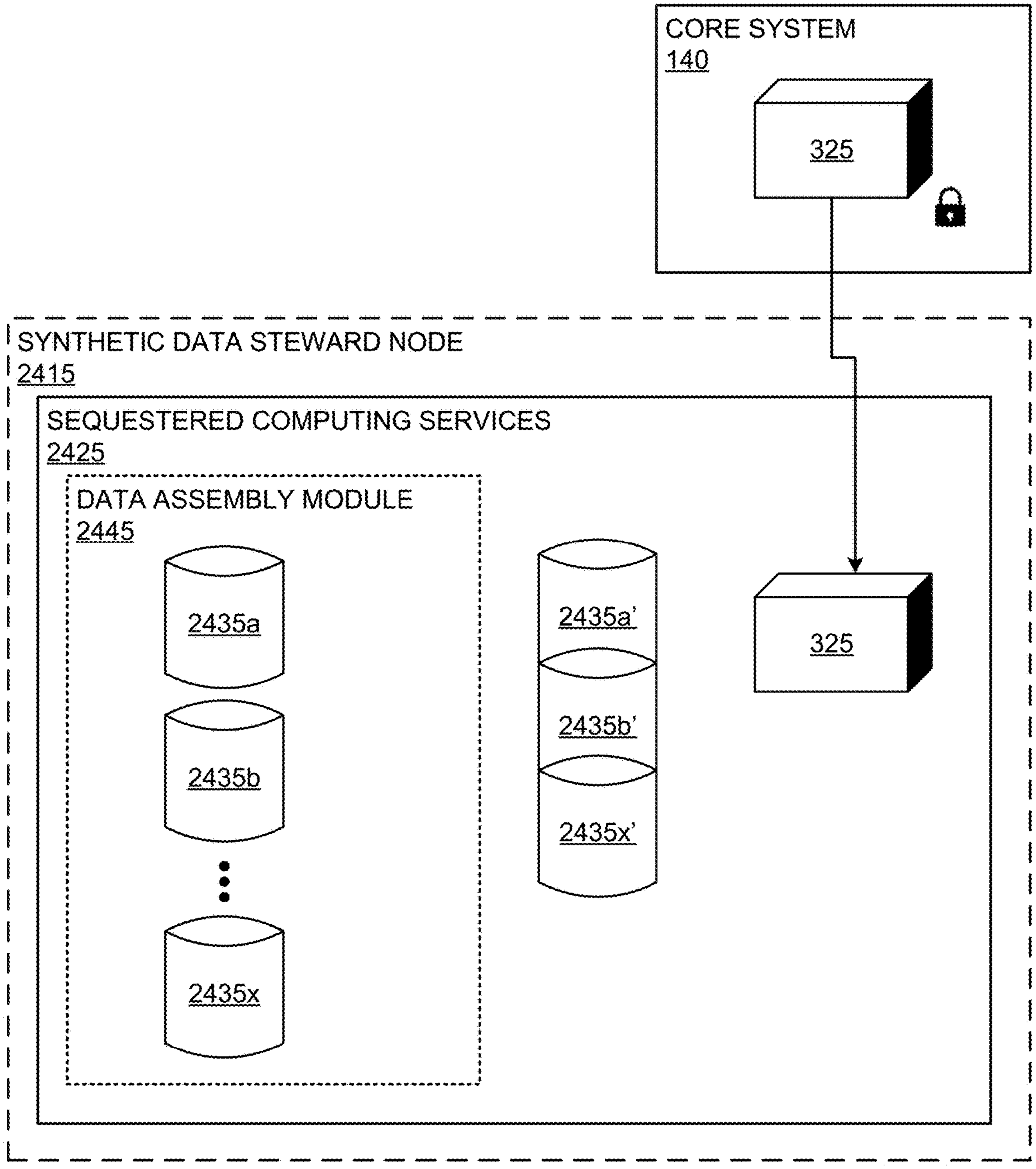

Turning to FIG. 24B, a more detailed illustration of the operation of the synthetic data steward node 2415. The synthetic data steward node 2415 orchestrates the assembly of input data from the multiple data steward nodes 160A-B using a data assembly module 2445. The data assembly module 2445 assembles/combines the data 2435*a-x* from the multiple data steward nodes 160A-B using any number of matching methodologies into the amalgamated data set 2435*a*'-x'. In some embodiments when one or more keys can be used to match records from different sources, the matching methodology is to create a single final data set (seen as the consolidated data stack in the sequestered computing service 2425) for all of the keys for which a complete record is available. In some cases, records from one data steward (e.g., data steward 160A) may not be present in another (e.g., data steward 160B). Such records will not be included in the final data set, but statistics about their presence or absence in each source data set may be noted for quality purposes (for example to ensure that record mismatches do not cause bias in the final data set).

In other embodiments, when unique keys are not available, then a record matching algorithm may be employed by the data assembly module 2445. For example, depending upon the type of data being computed upon, matching might be performed using demographic data for individuals represented in each record of a healthcare data set, or transaction types and counterparty characteristics might be used for matching related financial transactions in a banking or regulatory application. There is an unlimited number of potential matching methodologies which could be employed at data assembly module 2445. As in the case when keys are available, statistics about the presence or absence of records in each source may be noted. When record matching is required, information about the strength or confidence of the match within each record may also be included in the data to allow different types of inference on the data, depending on how likely a matching error may have occurred.

Figure 24C:
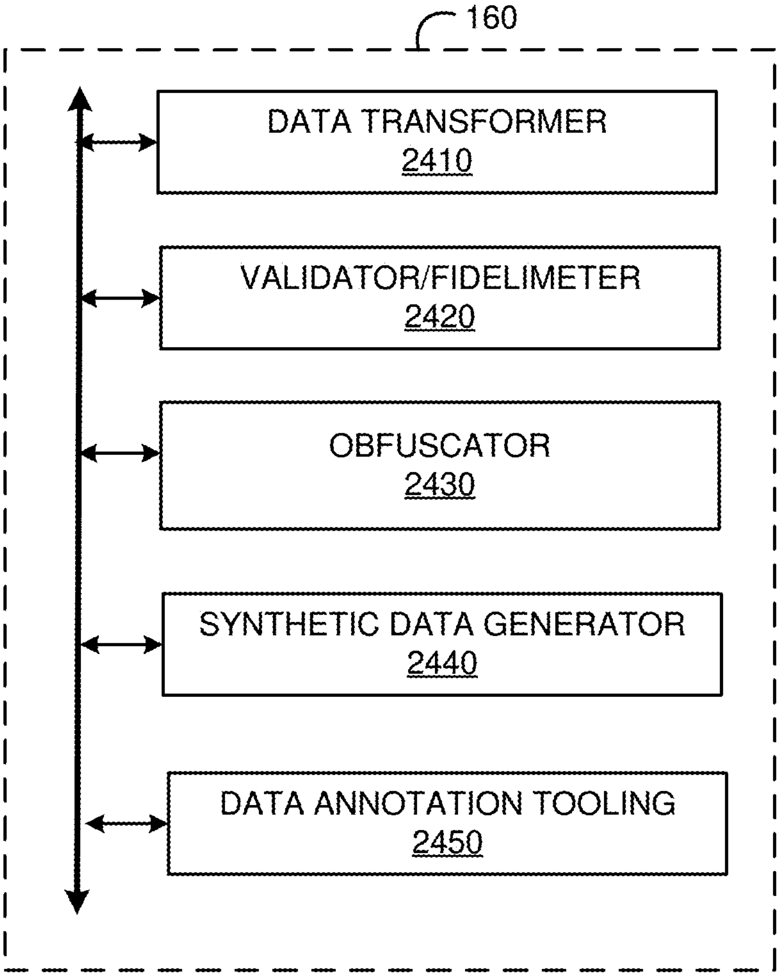
FIG. 24C is a block diagram of the various toolsets available to the data steward, in accordance with some embodiments.

FIG. 24C provides an example block diagram of the tooling that is present within the data steward 160. This tooling falls into five main categories of functional operation. These systems work in concert to 1) validate the data being used, 2) when needed, transform the data into a usable dataset, 3) obscure the algorithm inputs to protect the algorithm, 4) generate synthetic data to verify algorithm operability, and lastly 5) downstream analysis of the annotations of the data to ensure that the outputs are being utilized correctly and consistently.

To this end, a data transformer 2410 provides the function of altering the datasets when errors are identified. The validator (or fidelimeter) 2420 is leveraged to determine when said errors in the data are present, and when the data is sufficiently curated for consumption by the algorithm.

The obfuscator 2430 obscures the required inputs to the algorithm. This prevents the data steward from processing very large amounts of data, and using the outputs in conjunction with the known inputs to reverse engineer the algorithm itself. The synthetic data generator 2440 makes new datasets that allows the various parties to independently process the datasets, without violating any HIPPA regulations. By having a common input to work with, the outputs of the algorithm should match regardless of which party is processing the data. This ensures the data steward that the algorithm deployed in their enclave is operating as intended. Lastly, the output of any analysis is often provided to downstream annotators. These annotations are used to identify the pathologies, verify study results, and for other clinically significant operations. The accuracy, and consistency of these annotations is of critical importance. The data annotation tooling 2450 ensures that the annotation process is operating as desired.

Figure 25:
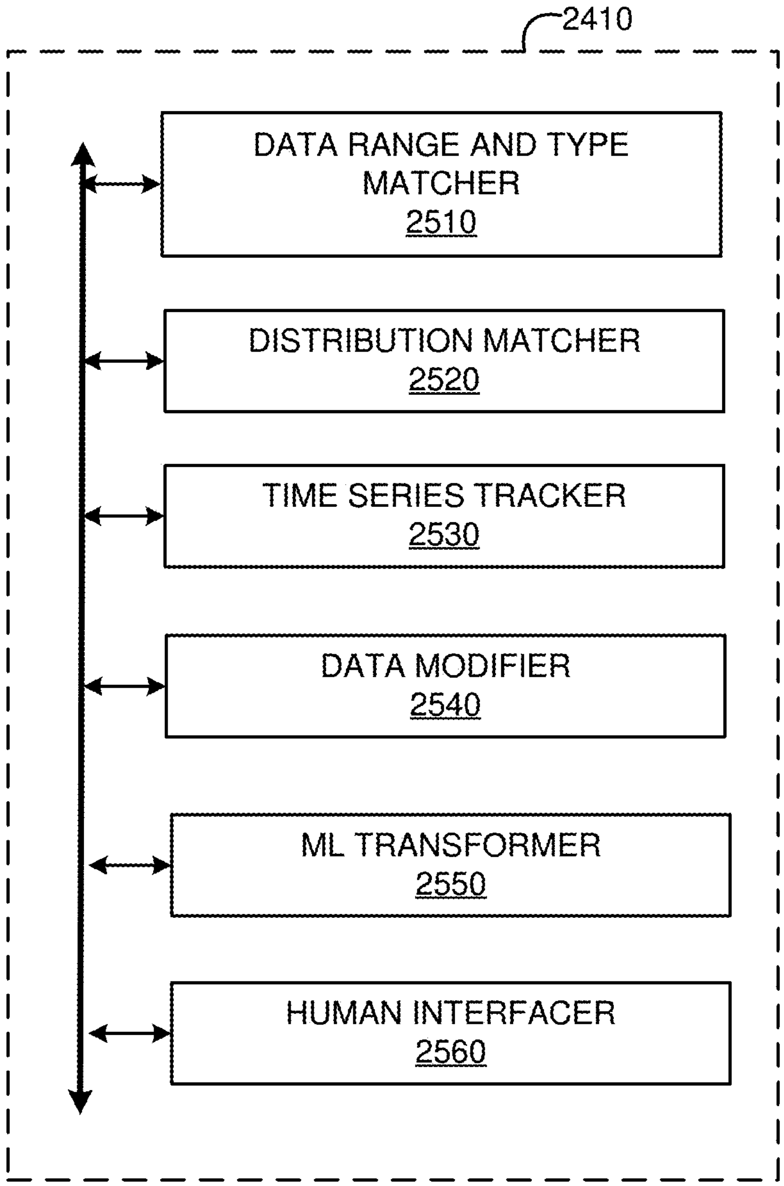
FIG. 25 is a block diagram of the validation and transformation tooling, in accordance with some embodiments.

FIG. 25 provides a more detailed illustration of one of the more complex tools: the data transformer 2410. The data transformer 2410 includes a data range and type matcher 2510, which determines what type of data is being analyzed, and applies domain specific analysis of outliers, range expectations and cleaning tools. A distribution matcher 2520 is similar to the data range and type matcher in that it is a domain specific analysis of the data distribution as compared to expected distributions. A time series tracker 2530 identifies data that is collected over a timeline and identifies trends and expectations in the data series. Although not shown, a data cross referencer identifies data fields that are correlated and determines if the data reflects these correlations. For example, a blood neutrophil count should be correlated with total white blood cell counts. A neutrophil count larger than the total count would signify an error in the data, and a ratio outside an expected boundary would either indicate a pathology or may signify corrupt data.

After the different analysis has been performed, a set of suggested transforms may be identified. A data modifier 2540 may serially apply the identified transforms, starting with the most basic. Alternatively, the data modifier may apply all transforms in parallel, generating multiple outputs (one from each transform). These outputs may be each validated, and if a given output passes the validation, this transform is selected for usage.

Rather than these methods of traditional transform identification and application, a machine learned algorithm may be applied upon the data set. A ML transformer 2550 may then apply the transform identified by the ML algorithm. To achieve this, a machine learning algorithm would be trained on large sets of healthcare or other domain-specific data that have been transformed with known transformations. This training process would result in an algorithm that infers what transformation could be applied to make source data match an exemplar. This effectively automates the process of transforming data from original data steward data to the format expected by the algorithm, as defined by the data profile.

In some embodiments the traditional transform identification may run in parallel with the machine learning based identification, and when commonality of transforms are identified then the transform may be automatically applied. In most cases however, any transform may be provided to a human for approval (or at least review). A human interfacer 2560 may be employed to present the input data, describe the appropriate transform, and illustrate the output results.

Figure 26:
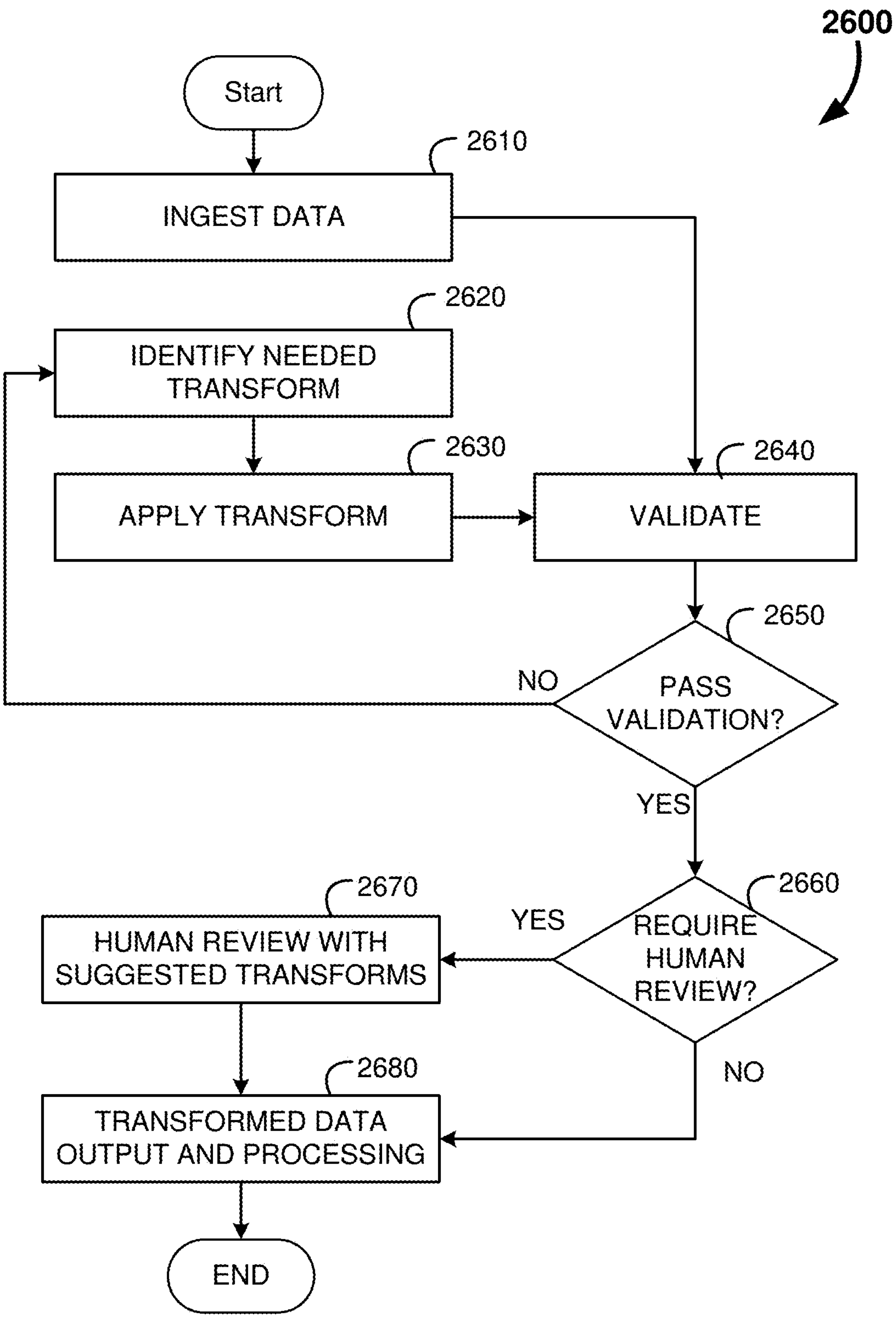
FIG. 26 is a flow diagram for the example process of validating and transforming datasets within zero-trust environments, in accordance with some embodiments.

Now that the basic system modules have been described, the processes for the transform of data, data obfuscation, synthetic data generation for algorithm validation, and annotation validations will all be described in greater detail. The first process to be discussed is the transform of input data, as seen in FIG. 26 at 2600. The process starts by taking in the data (at 2610). Generally, data injection may include some pre-processing steps, such as rotation and cropping of images, separation of data fields, and the like. Data injection may also include the normalization of data and cleansing of basic errors (such as negative numbers).

The ingested data is then subjected to a validation (at 2640). Validation includes identification of the type of data being validated. For example, a column (field) of data typically includes a header identifying the data type. The validation may utilize a dictionary of keywords and abbreviations in the detection of the data types, in some embodiments. After the data type is identified, a lookup of the type of data against expected values is performed. The expected values include a range of possible values, and a distribution element. The data to be validated is compared against the range values, and if the data includes a statistically appreciable number of entries that are outside the range, the validation may fail. Under a statistically relevant number of data points outside the range values may be attributed to dirty data (errors in the data) or extreme outliers. These values should be flagged for manual review, or deleted from the dataset. Over the statistically appreciable level of data points outside the range limits indicates that the data set is erroneous as a whole, and requires transformation. The term “statistically relevant” or “statistically appreciable” may be a configurable value, but typically ranges from between 1-10% of the data points. Most commonly the value ranges from 1-5%.

A good example of this validation failure is for a temperature field. Temperature of the data set should be in degrees Celsius. Allowable ranges of temperature measurements for humans is between 35 and 38 degrees. At these temperatures the person can exhibit hypothermia or conversely a fever, but these are “acceptable” temperatures. Temperatures outside these ranges suggest extreme outliers, and generally would indicate the person is in mortal danger.

Thus, if a data set includes numbers like 98.6, for example, the data would fail the validation.

Similarly, the distribution of the data may be compared against the values expected for the data type. For normal patients, a temperature distribution would be a narrow bell curve shape. For a dataset of patients with a known pathology, the curve may be skewed to reflect a fever state in many patients. These expected curves are compared against the actual data set, and distributions that are not a good match may be flagged as suspect and cause a validation failure. Comparison of the curves may be performed by least means squared, Procrustes distance, or Frechet distance methodologies. A configurable threshold for the distance between the curves may be employed to determine when the curve is "not a good match" and therefore fails the validation.

Figure 27A:
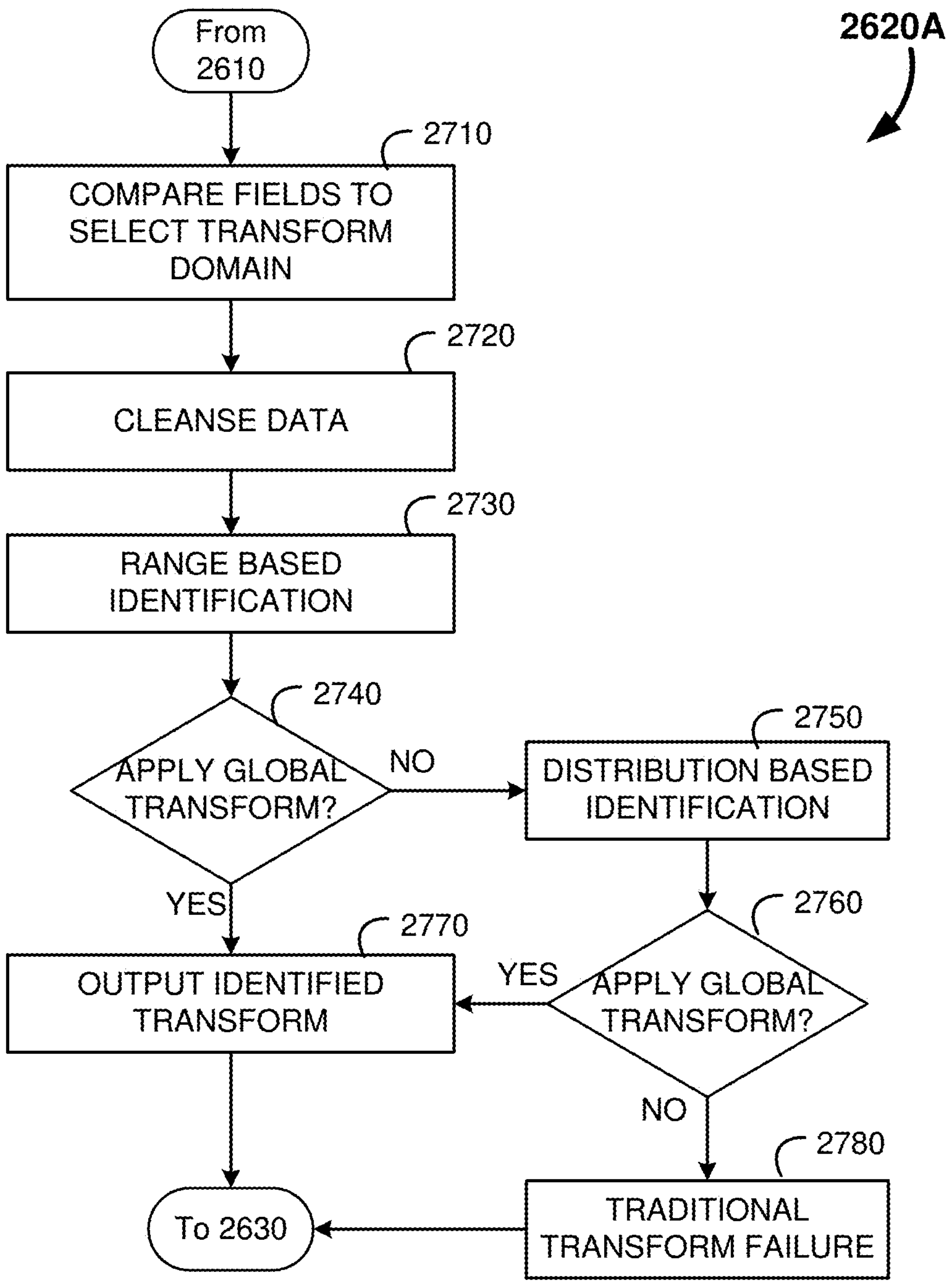
FIGS. 27A and 27B are flow diagrams for alternate example processes of identifying needed transforms of a dataset, in accordance with some embodiments.
Figure 27B:
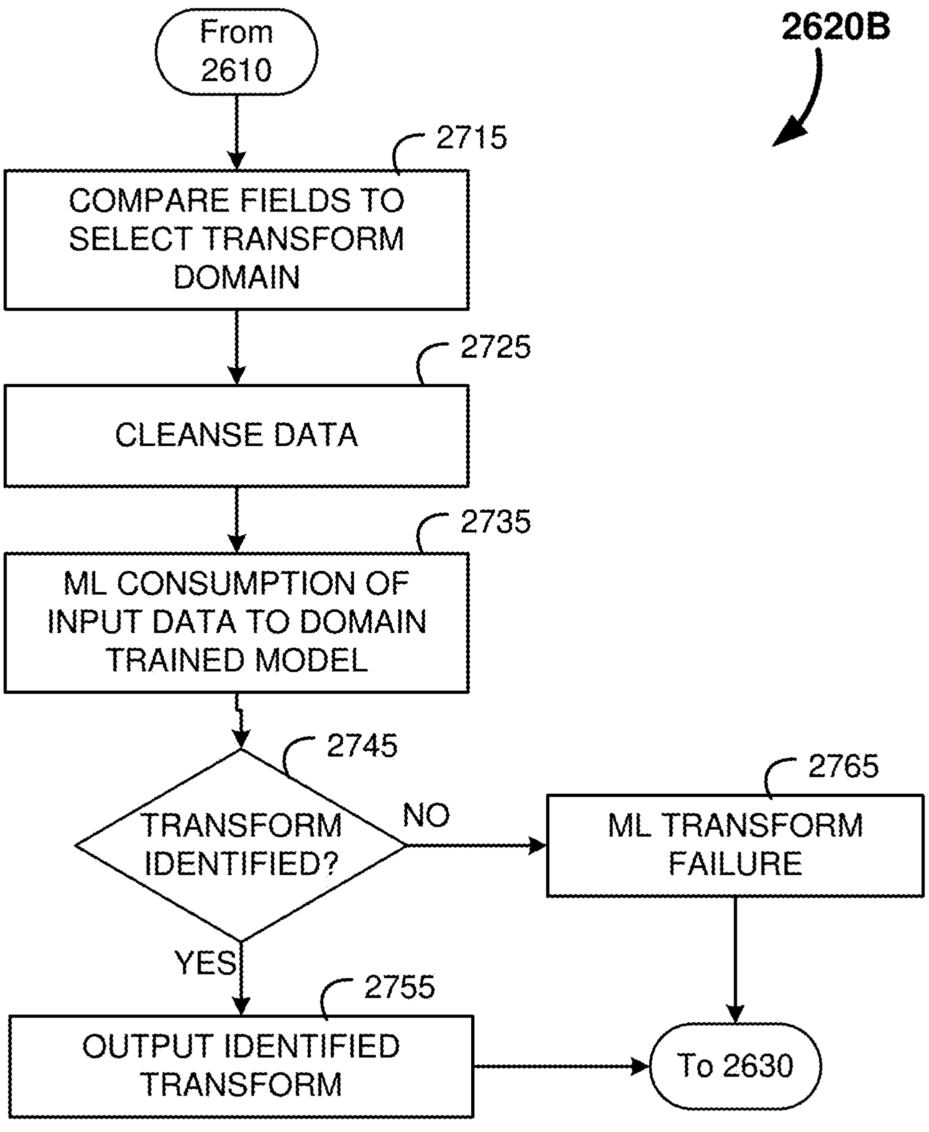

If the data does not pass validation (at 2650) the transforms required to modify the data are next identified (at 2620). There are multiple ways to perform this identification step, as illustrated in FIGS. 27A and 27B respectively. In FIG. 27A, ta 2620A, the fields to be transformed are compared to the domains (at 2710) very much like when performing the validation step. Domain is generally determined by comparing headers, metadata, or other signifiers to the kind of data employed. The data is then cleansed (at 2720) if it has not already been performed during the data ingestion stage. Data cleansing may include removal of data fields that are blank, or impossible, for example. Next, a range based identification (at 2730) may be employed to identify appropriate transforms. Going back to the body temperature example, one of the known transforms for this domain is the conversion of Fahrenheit to Celsius. If the range of the input data is between 90-110, for example, this transform is identified and employed. Another example could be the dosing units for medication administration: A source dataset might represent the amount of a drug administered to a patient in milliliters, grams, or IU, etc. while the data expected by the algorithm is in mg, for example. The range of values in a medication administration field can be used to infer which units are being used in each data set, and how to transform (translate) between them.

If a transform is thus identified for application (at 2740) the transform may be identified and output for downstream processing. If no range based transform is found, a distribution based identification may alternatively be employed (at 2750). Again, the distribution based transform identification is domain specific—there are known transforms existing for the given domain (type of data being processed). If such transforms causes the actual data's distribution to come in line with the expected distribution, then is can be identified for application (at 2760) and output for downstream processing. However, if no transforms are identified by the range or the distribution methods, there is a failure (at 2780) of the traditional transform identification, and other methods must be utilized.

FIG. 27B is one such alternative means of transform identification, shown generally at 2620B. Again the transforms contemplated by the ML model are best identified when taken in light of the domain in which that data is operating (based upon data type/kind). As such the data fields are compared to a dictionary of known field types, and the kind of data is determined. This is used to select from all known transforms only the ones which are generally applicable to the given domain (at 2715). The data is again cleansed (at 2725) if it has not already been performed. A machine learning algorithm then consumes the input data (at 2735). Different ML algorithms are utilized, each algorithm trained upon data within the specific domain contemplated. The ML model identifies if a transform exists (at 2745) which would convert the input data into a format/set of values that will pass validation. If so, the identified transform is output for downstream analysis (at 2755). Otherwise, there is a failure of the ML transform identification methodology (at 2765).

In some embodiments, the traditional transform identification is first applied, and if there is a failure, then the ML based transform identification is attempted. This is because the ML identification requires significantly more processing power to complete. However, when there is ample processing power, these two methodologies may be employed in parallel, and the results compared to further validate the correct transform. In yet other embodiments, only one transform identification technique may be employed. For example, a system where the transform tool has recently been deployed may not have had sufficient data processed in order to properly train the ML models. In such a situation, traditional transform identification and human inputted transforms may be employed exclusively. However, for very sophisticated parties, which have exhaustively trained their models, a ML based transform identification may be sufficient (or even preferred over dual identification).

Returning to FIG. 26, regardless of the methodology/ies employed to identify the transform, after said identification the transform may actually be applied (at 2630), and the process returns to a validation stage. In this manner the process is iterative, with each cycle the data is improved until it passes validation. Although not shown, it is possible, however, for the transform identification to become exhausted without the data being able to pass the validation stage. In such instances, a human operator is usually tasked with manual review of the data to determine if there is a solution, or if the data is so corrupted as to be unusable.

If the data passes validation (at 2650) the process next determines if human review is required (at 2660). Generally, if there is a transform performed, human review will be desired. If so, human review with the transforms that have been applied/suggested are highlighted to the user (at 2670). The human can accept or reject the proposed transforms. Alternately, the human can provide input into other transforms to be applied. Regardless of if a human is involved or not, the final step of the process is to output (at 2680) the validated data for analysis by the algorithm(s).

Figure 28A:
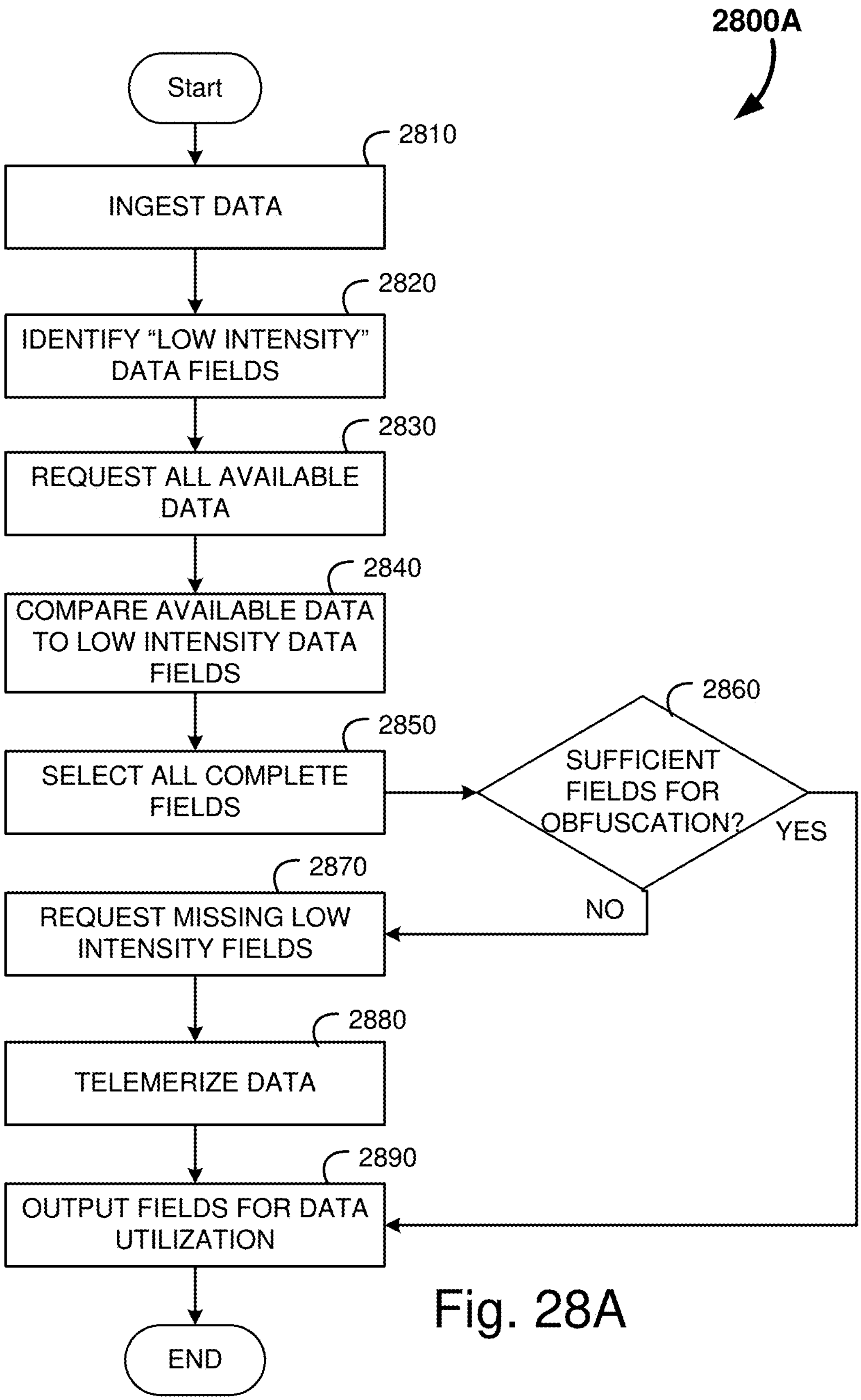
FIGS. 28A and 28B are a flow diagrams for the example process of data obfuscation, in accordance with some embodiments.
Figure 28B:
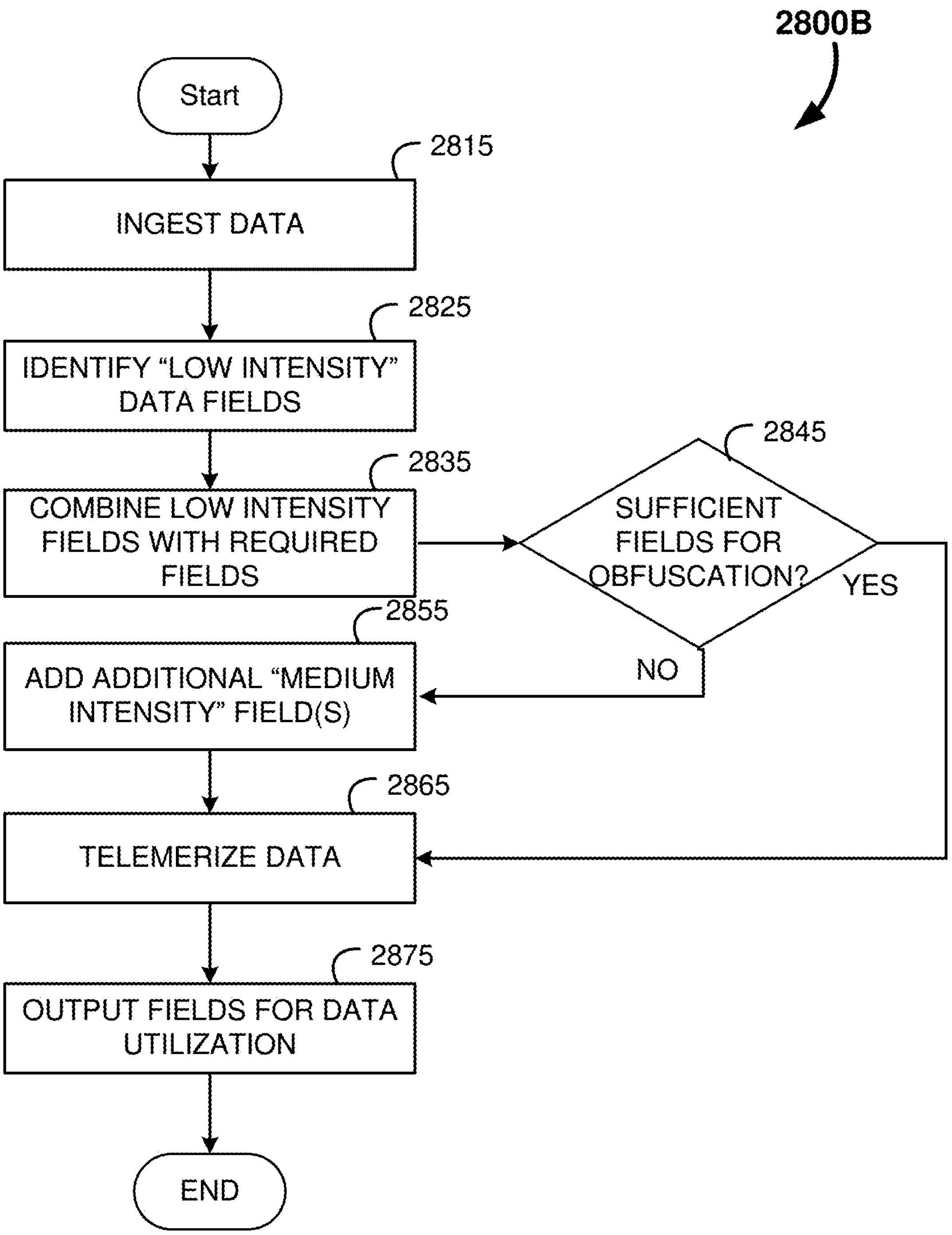

FIGS. 28A and 28B, in contrast, provides an example method for data obfuscation for the protection of algorithm developers. In the first method, shown generally at 2800A, data is obfuscated by requesting additional data fields as they are available. The need for obfuscation is due to the fact that an algorithm can be reverse engineered. When the input data is known, and sufficient quantities of it have been consumed by the algorithm, the output data may be utilized to determine how the algorithm works. As many data stewards are processing vast quantities of input data, an algorithm developer's concerns of the data steward's ability to reverse engineer their algorithm are very real. And as previously mentioned, the IP involved in the algorithm may constitute the vast majority of the value for the algorithm developer. One manner of protecting the algorithm from reverse engineering is to either obfuscate the input or the output of the algorithm. However, obfuscating the output is undesirable, as it defeats the purpose of running the algorithm in the first place. As such, data obfuscation of the input data is the best option to protect the algorithm developer.

The data available to the data steward is first ingested (at 2810). What is known as "low intensity" fields of data are identified by the algorithm developer (at 2820). Low intensity fields are those that are either 1) routinely collected anyway, or 2) can be collected with minimal effort. Blood pressure, for example, would constitute a "low intensity" field. The algorithm developer also requests the data steward to provide a listing of all available data types (at 2830). This request isn't for actual data; no PHI ever leaves the data steward. Instead, the algorithm developer gets a listing of available data types. The available data is compared against the low intensity data types (at 2840). This identifies which fields are low intensity, but not readily available. All fields with complete data are selected (at 2850) and a determination is made if these fields are enough to obfuscate the inputs (at 2860). Sufficiency of fields for obfuscation may be determined by number of fields beyond the necessary fields. For example, assume an algorithm requires 6 data inputs to perform its analysis. In order to be properly obfuscated it may be determined that 10 fields of data should be requested. If the available data includes 11 fields, there may be sufficient number of fields for obfuscation. However, if there are only 8 fields available, there may be a need to collect further information. The exact number of fields needed to properly obfuscate the input data may be a configurable number above the needed field number (in the above example there was a need for 4 fields above the number of "real" fields required by the algorithm). Alternatively, the required number of fields may be dependent upon the needed fields (such as some proportion of the actual number of fields consumed by the algorithm).

If a sufficient number of fields do already exist, the algorithm libraries may be fashioned to require the available fields as inputs. However, if there is insufficient fields already available, the algorithm developer may request (at 2870) the data steward to collect low intensity fields (not already found in the available data). The reason 'low intensity' fields are requested is that this places an additional burden upon the data steward. Too much additional data, or data that is difficult to collect, may deter the data steward from wanting to utilize the algorithm entirely. As such, to balance the need for algorithm protection, with the additional hurdle for the data steward to use the algorithm, the easiest data types that can be collected (or even better, that have already been collected but not supplied earlier) are requested. The data for these added 'low intensity' fields are then added by the data steward to telmerize the available data (at 2880). Again, the data steward uses the fields that have been selected/output (at 2890) to build their algorithm libraries to consume. Thus, when the data stewards run the algorithm, the fields of data requested include the 'real' fields needed by the algorithm, as well as 'dummy' fields that prevent reverse engineering of the algorithm.

In FIG. 28B, an alternate means for data obscuration is provided, at 2800B. Initially the data is digested (at 2815) in a similar manner as discussed above. Then low intensity data fields are again identified (at 2825). The low intensity fields are combined with the required fields (at 2835) to yield a set of fields that, if requested, may obfuscate the algorithm developer's IP. A check is made to determine if the number of fields that exist between the required and low intensity fields is sufficient to obfuscate the algorithm (at 2845). If not, additional "medium intensity" fields are identified and requested (at 2855). Medium intensity fields are also routinely collected and/or are relatively easily collected information yet are less easily accessible than the "low intensity" fields. An example of a low intensity field is blood pressure, for example. A medium intensity field would be blood glucose levels (which are collected on a less frequent basis).

Regardless of if medium intensity fields are incorporated or not, the data requested is appended to include the extra data fields, known as data telemerization (at 2865) and the set of fields is requested from the data steward. The collected data fields are then output for the algorithm to consume, and therefore obscures the algorithm's inputs.

Figure 29:
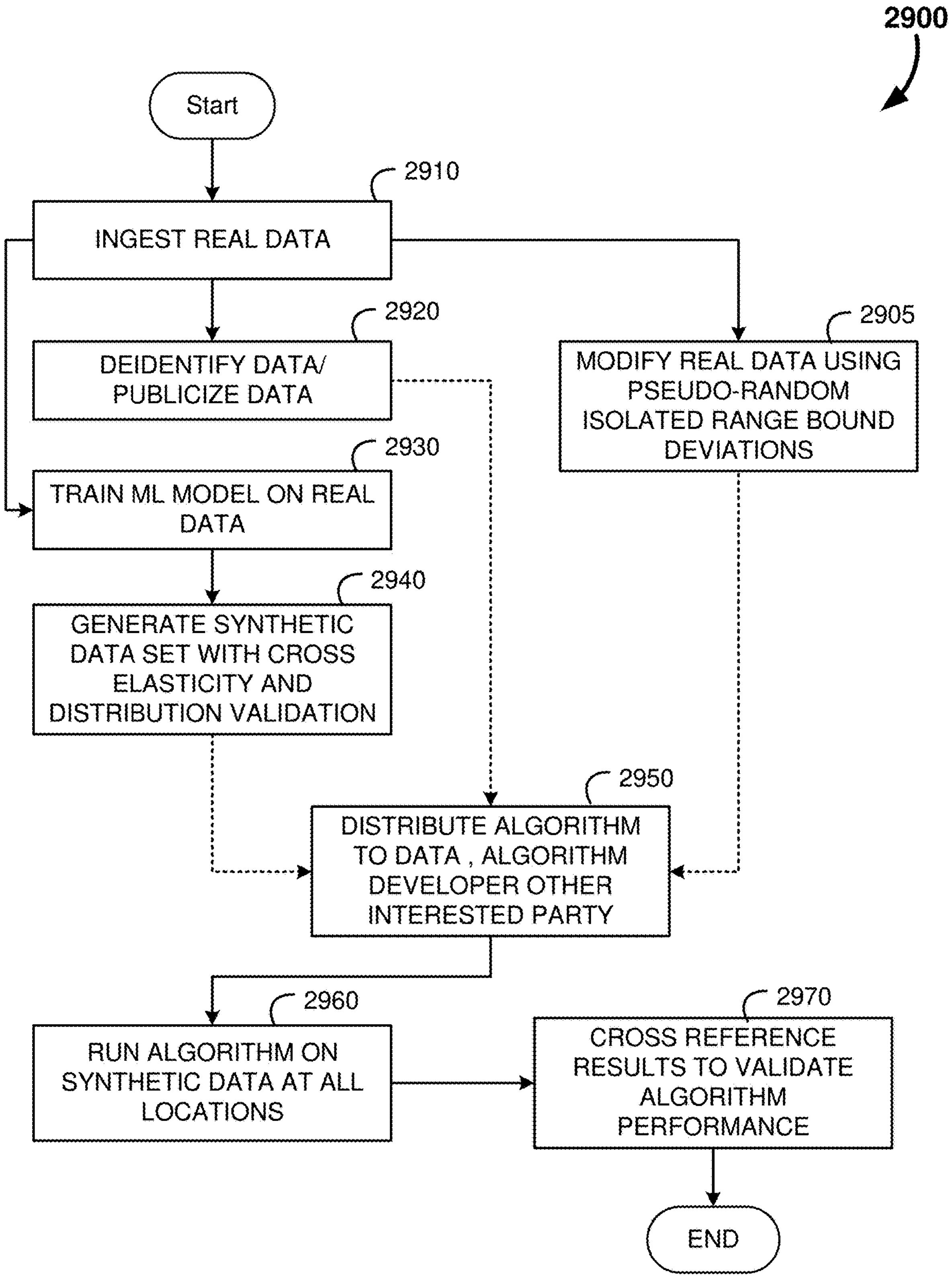
FIG. 29 is a flow diagram for the example process of algorithm validation, in accordance with some embodiments.

Turning now to FIG. 29, a process for algorithm validation, leveraging synthetic data, is provided at 2900. There are three main methodologies for the generation of the synthetic data, which may be performed individually or together. The first requires the ingestion of actual data (at 2910). Data may be cleaned of obvious errors, and if needed the data validation and transformation of FIG. 26 may be employed to get the data in condition for utilization. The data may then be deidentified and/or determined to be publicly consumable (at 2920). This data is not technically "synthetic", but is a gold standard for utilization when available.

However, most often the PHI is not able to be 'deidentified' and is protected in a way that it cannot be made available to the public. In order to address this situation, a ML model may be trained upon the real data, within the protected enclave (at 2930). To generate synthetic data the ML model, once sufficiently trained can generate synthetic data (at 2940). There are a number of mathematical techniques that can be used to generate synthetic data. For example, it is possible to model data using generative AI algorithms (e.g. GANs), traditional statistical distribution estimation, multivariate gaussian distribution estimation, Bayes networks, and many other data modeling techniques. The distributions of the data are validated after generation, and when necessary the synthetic data is modified to pass these validations, resulting in knowledge about how the original data must be transformed to work with the algorithm.

The third manner of generating synthetic data is to take the ingested data and modify it using pseudo-random deviations (at 2905). The pseudo-random deviations must all stay within an acceptable range based upon the domain (type) of data being processed. For example, for blood pressure, deviations of up to 10 may be entirely acceptable, but for temperature, deviations of half a degree may be utilized. Regardless, the deviations must, in aggregate, form a distribution that mirrors the distribution curve of the actual data. This ensures that the final synthetic data mimics actual data very closely.

Regardless of the three ways the data may be generated, it is then distributed to all parties interested in the algorithm validation (at 2950). At a minimum this generally includes the data steward and the algorithm developer, but may include other entities, such as other data stewards, researcher, pharmaceutical or biotechnology companies, or any party with an interest in the algorithm's performance. The algorithm may then be run, on the identical synthetic data, across each individual parties' platforms (at 2960). The resulting output may then be compared across each of the parties (at 2970). The outputs should be identical, thereby validating the algorithm performance. If there is a deviation in the outputs, there is an error that needs be addressed.

Figure 30:
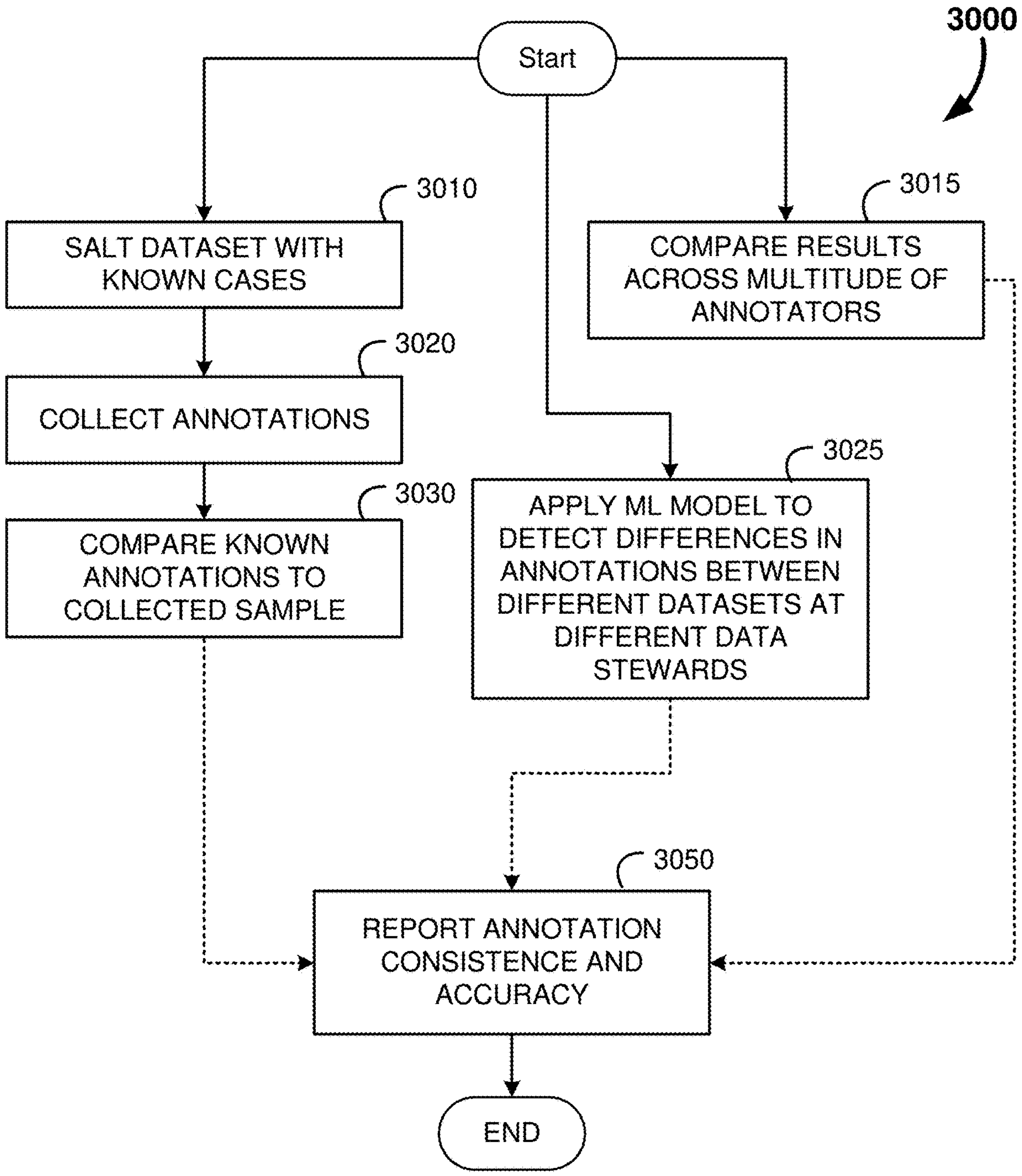
FIG. 30 is a flow diagram for the example process of annotation validation, in accordance with some embodiments.

Lastly, FIG. 30 provides an example process diagram for the validation of annotations, shown generally at 3000. There are three main methodologies for validating the annotation accuracy and consistency. These include salting datasets with known cases (at 3010). The annotations from these salted datasets are then collected (at 3020) and compared to the known correct annotations (at 3030). This method, already utilized extensively, is a very good indicator of the accuracy and consistency of individual annotators. However, this method requires extensive redundancy in annotations, which is costly.

The second method employed is to apply a ML model that detects differences between annotation in different datasets and data stewards (at 3025) This method does not reveal detailed accuracy measurements for specific annotators, but rather identifies trends in the datasets and data stewards. For example, an algorithm trained to predict the annotations in one data set can used on a dataset annotated in a different site to identify deviations in annotation from site to site (or annotator group to annotator group), as higher than expected differences between actual and predicted annotations can indicate variations in annotation quality or differences in how an annotation protocol is being applied. Other modeling techniques that compute characteristics of the annotations (statistical moments and other quantitative features) can also be used to detect systematic differences in annotation performance from site to site.

Lastly, the results between annotators may be directly compared (at 3015). When the annotators each have redundancy in their annotations, the differences can be noted, and with sufficient redundancy, the correct annotation can be ascertained, and the accuracy for the individual annotators can likewise be determined. Again, however, this technique requires more extensive resources, and is prohibitively expensive in many cases.

Regardless of method employed to characterize the annotations, the consistency and accuracy may be reported out (at 3050), and if needed corrective actions may be employed. This could include additional training for the annotators, cross training of annotators at different data stewards, or even the addition of ML annotation tools to assist in the annotation process.

Figure 31A:
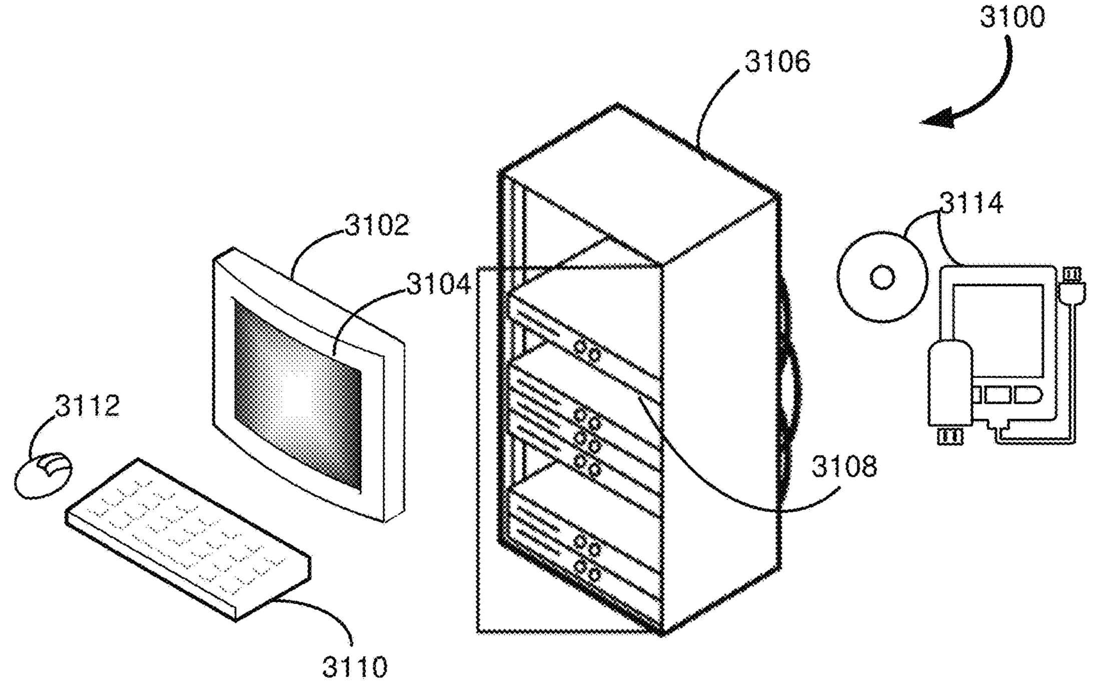
FIGS. 31A and 31B are illustrations of computer systems capable of implementing the zero-trust computing, in accordance with some embodiments.
Figure 31B:
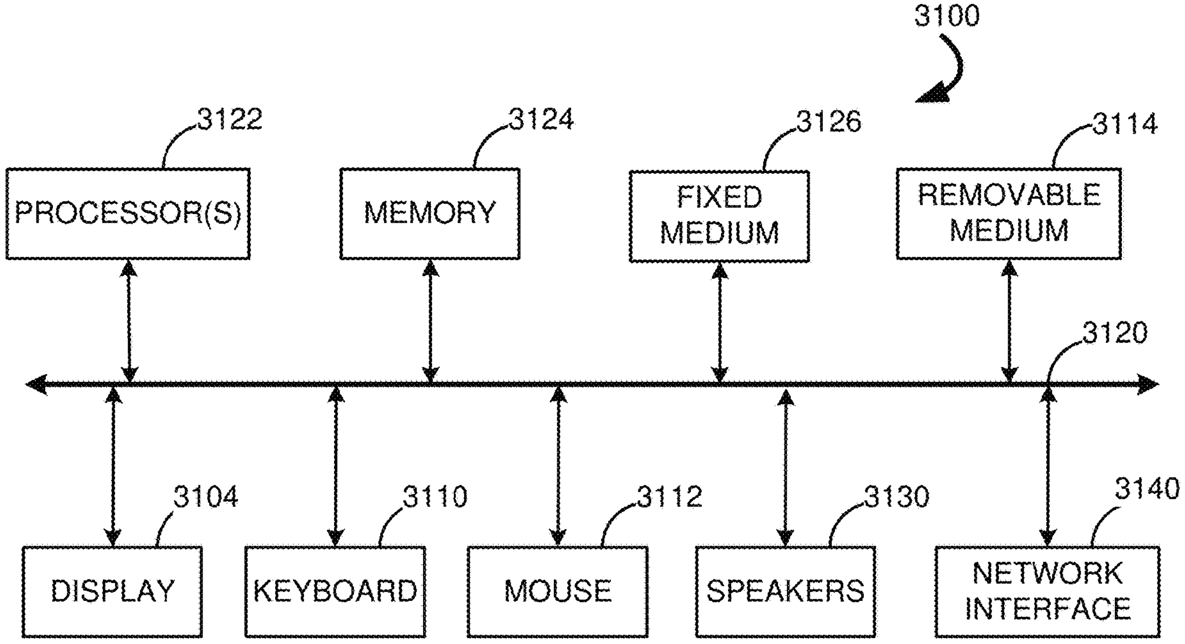

Now that the systems and methods for zero-trust computing, data validation and transform, data obfuscation, algorithm validation and annotator characterization have been provided, attention shall now be focused upon apparatuses capable of executing the above functions in real-time. To facilitate this discussion, FIGS. 31A and 31B illustrate a Computer System 3100, which is suitable for implementing embodiments of the present invention. FIG. 31A shows one possible physical form of the Computer System 3100. Of course, the Computer System 3100 may have many physical forms ranging from a printed circuit board, an integrated circuit, and a small handheld device up to a huge supercomputer. Computer system 3100 may include a Monitor 3102, a Display 3104, a Housing 3106, server blades including one or more storage Drives 3108, a Keyboard 3110, and a Mouse 3112. Medium 3114 is a computer-readable medium used to transfer data to and from Computer System 3100.

FIG. 31B is an example of a block diagram for Computer System 3100. Attached to System Bus 3120 are a wide variety of subsystems. Processor(s) 3122 (also referred to as central processing units, or CPUs) are coupled to storage devices, including Memory 3124. Memory 3124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 3126 may also be coupled bi-directionally to the Processor 3122; it provides additional data storage capacity and may also include any of the computer-readable media described below. Fixed Medium 3126 may be used to store programs, data, and the like and is typically a secondary storage medium (such as a hard disk) that is slower than primary storage. It will be appreciated that the information retained within Fixed Medium 3126 may, in appropriate cases, be incorporated in standard fashion as virtual memory in Memory 3124. Removable Medium 3114 may take the form of any of the computer-readable media described below.

Processor 3122 is also coupled to a variety of input/output devices, such as Display 3104, Keyboard 3110, Mouse 3112 and Speakers 3130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 3122 optionally may be coupled to another computer or telecommunications network using Network Interface 3140. With such a Network Interface 3140, it is contemplated that the Processor 3122 might receive information from the network, or might output information to the network in the course of performing the above-described zero-trust processing of protected information, for example PHI. Furthermore, method embodiments of the present invention may execute solely upon Processor 3122 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 3100 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for algorithm validation in a trusted computed environment comprising:

regularizing coefficient estimates towards zero to reduce variance in the algorithm, thereby improving algorithm performance;

generating synthetic data for a particular domain, wherein the synthetic data is altered domain specific data, and wherein the altered domain specific data is altered by a pseudorandom deviation which maintains overall distribution profile of the new data within an accepted range based upon the domain of the data, and further wherein the synthetic data reflects correlations between different data fields associated with a single medical record which maintain expected cross referenced values;

generating a series of transforms for the synthetic data, wherein the transforms convert the synthetic data from a starting type into an expected type based on application;

applying the transforms to the synthetic data starting with range-based transforms before distribution-based transforms;

distributing the transformed synthetic data to validating locations, wherein the validating locations include at least two of a data steward, a university, a research organization, and an algorithm developer;

processing the transformed synthetic data on each system running the same algorithm located at the validating locations; and validating the algorithms and transforms based upon the results of the processing, wherein a successful validation is where results from the processing are identical between the validating locations.

2. The method of claim 1, wherein the synthetic data is deidentified data for the domain.

3. The method of claim 1, wherein the data is generated by a machine learning model.

4. The method of claim 3, wherein the machine learning model is trained upon actual domain specific data sets.

5. The method of claim 1, wherein validating occurs when the results of the processing are identical between the validating locations.

6. A computerized system for algorithm validation comprising:

a training server for regularizing coefficient estimates towards zero to reduce variance in the algorithm, thereby improving algorithm performance;

a synthetic data computer system for generating synthetic data for a particular domain, wherein the synthetic data is altered domain specific data, and wherein the altered domain specific data is altered by a pseudorandom deviation which maintains overall distribution profile of the new data within an accepted range based upon the domain of the data, and further wherein the synthetic data reflects correlations between different data fields associated with a single medical record which maintain expected cross referenced values;

generating a series of transforms for the synthetic data, wherein the transforms convert the synthetic data from a starting type into an expected type based on application;

applying the transforms to the synthetic data starting with range-based transforms before distribution-based transforms;

a network device for distributing the transformed synthetic data to validating locations, wherein the validating locations include at least two of a data steward, a university, a research organization, and an algorithm developer;

a distributed computing system for processing the transformed synthetic data on each system running the same algorithm located at the validating locations; and a server for validating the algorithms and the transforms based upon the results of the processing, wherein a successful validation is where results from the processing are identical between the validating locations.

7. The system of claim 6, wherein the synthetic data is deidentified data for the domain.

8. The system of claim 6, wherein the data is generated by a machine learning model.

9. The system of claim 8, wherein the machine learning model is trained upon actual domain specific data sets.

10. The system of claim 6, wherein validating occurs when the results of the processing are identical between the validating locations.

11. A non-transitory computer readable medium which when executed by a computer system performs the steps of:

regularizing coefficient estimates towards zero to reduce variance in the algorithm, thereby improving algorithm performance;

generating synthetic data for a particular domain, wherein the synthetic data is altered domain specific data, and wherein the altered domain specific data is altered by a pseudorandom deviation which maintains overall distribution profile of the new data within an accepted range based upon the domain of the data, and further wherein the synthetic data reflects correlations between different data fields associated with a single medical record which maintain expected cross referenced values;

generating a series of transforms for the synthetic data, wherein the transforms convert the synthetic data from a starting type into an expected type based on application;

applying the transforms to the synthetic data starting with range-based transforms before distribution-based transforms;

distributing the transformed synthetic data to validating locations, wherein the validating locations include at least two of a data steward, a university, a research organization, and an algorithm developer;

processing the transformed synthetic data on each system running the same algorithm located at the validating locations; and validating the algorithms and transforms based upon the results of the processing, wherein a successful validation is where results from the processing are identical between the validating locations.

12. The non-transitory computer readable medium of claim 11, wherein the synthetic data is deidentified data for the domain.

13. The non-transitory computer readable medium of claim 11, wherein the data is generated by a machine learning model.

14. The non-transitory computer readable medium of claim 13, wherein the machine learning model is trained upon actual domain specific data sets.

* * * * *